(12) United States Patent
Kawasaki

(10) Patent No.: US 10,447,514 B2
(45) Date of Patent: *Oct. 15, 2019

(54) WIRELESS TRANSMISSION SYSTEM, WIRELESS COMMUNICATION DEVICE, AND WIRELESS COMMUNICATION METHOD

(71) Applicant: Sony Corporation, Tokyo (JP)

(72) Inventor: Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,454

(22) Filed: Jan. 30, 2018

(65) Prior Publication Data

US 2018/0176054 A1 Jun. 21, 2018

Related U.S. Application Data

(63) Continuation of application No. 15/381,409, filed on Dec. 16, 2016, now Pat. No. 9,912,502, which is a (Continued)

(30) Foreign Application Priority Data

| Aug. 31, 2009 | (JP) | 2009-199403 |
| Aug. 31, 2009 | (JP) | 2009-199404 |
| Aug. 31, 2009 | (JP) | 2009-200118 |

(51) Int. Cl.
*H04L 27/04* (2006.01)
*H04B 1/40* (2015.01)
(Continued)

(52) U.S. Cl.
CPC .............. *H04L 27/04* (2013.01); *H04B 1/40* (2013.01); *H04L 27/122* (2013.01); *H04L 27/20* (2013.01); *H04L 27/365* (2013.01)

(58) Field of Classification Search
CPC .......... H04B 1/40; H04B 5/00; H04L 27/2601
(Continued)

(56) References Cited

U.S. PATENT DOCUMENTS 5,463,357 A 10/1995 Hobden
5,493,698 A 2/1996 Suzuki et al.
(Continued)

FOREIGN PATENT DOCUMENTS

CN 1815921 A 8/2006
EP 1 484 843 A1 12/2004
(Continued)

OTHER PUBLICATIONS

Chinese Office Action dated Nov. 8, 2016 for corresponding Chinese Application No. 201410017451.6.
(Continued)

*Primary Examiner* — Emmanuel Bayard
(74) *Attorney, Agent, or Firm* — Michael Best & Friedrich LLP

(57) ABSTRACT

A wireless transmission system includes: a communication unit for transmission; and a communication unit for reception. The communication units for transmission and reception are housed in a housing of the same electronic apparatus, or the communication unit for transmission is housed in a housing of first electronic apparatus and the communication unit for reception is housed in a housing of second electronic apparatus and a wireless signal transmission path enabling wireless information transmission between the communication units is formed between the communication units when the first and the second electronic apparatus are disposed at given positions to be integrated with each other. The communication unit for transmission includes a first carrier signal generating unit and a first frequency converter, and the communication unit for reception includes a second carrier signal generating unit, and a second frequency converter.

18 Claims, 33 Drawing Sheets

Related U.S. Application Data continuation of application No. 15/010,197, filed on Jan. 29, 2016, now Pat. No. 9,544,007, which is a continuation of application No. 14/453,325, filed on Aug. 6, 2014, now Pat. No. 9,281,860, which is a continuation of application No. 12/805,552, filed on Aug. 5, 2010, now Pat. No. 8,831,073.

(51) Int. Cl.
*H04L 27/12* (2006.01)
*H04L 27/20* (2006.01)
*H04L 27/36* (2006.01)

(58) Field of Classification Search
USPC .................................. 375/219–222, 354–359
See application file for complete search history.

(56) References Cited

U.S. PATENT DOCUMENTS

| | | | |
|---|---|---|---|
| 5,555,016 A | 9/1996 | Rhodes et al. | |
| 5,559,377 A | 9/1996 | Abraham | |
| 5,617,410 A | 4/1997 | Matsumoto | |
| 5,727,019 A | 3/1998 | Tatsumi | |
| 5,794,119 A * | 8/1998 | Evans | H04N 7/173 348/E5.096 |
| 5,812,594 A | 9/1998 | Rakib | |
| 5,845,196 A | 12/1998 | Nawata | |
| 6,021,110 A | 2/2000 | McGibney | |
| 6,041,088 A | 3/2000 | McCallister | |
| 6,240,556 B1 | 5/2001 | Evans et al. | |
| 6,456,256 B1 * | 9/2002 | Amundson | A61N 1/37229 128/903 |
| 6,608,875 B1 | 8/2003 | Wolaver | |
| 6,963,249 B2 | 11/2005 | Devries et al. | |
| 6,973,328 B1 | 12/2005 | Suematsu | |
| 6,990,256 B2 | 1/2006 | Geary | |
| 7,192,387 B2 | 3/2007 | Mendel | |
| 7,196,838 B2 | 3/2007 | Adams | |
| 7,233,137 B2 | 6/2007 | Nakamura et al. | |
| 7,333,423 B2 | 2/2008 | Palaskas et al. | |
| 7,483,676 B2 | 1/2009 | Mizukami et al. | |
| 7,525,398 B2 | 4/2009 | Nishimura | |
| 7,773,568 B2 | 8/2010 | Yamasaki et al. | |
| 7,826,519 B1 * | 11/2010 | Tsai | H03L 7/18 327/147 |
| 7,953,326 B2 | 5/2011 | Farr et al. | |
| 7,970,345 B2 | 6/2011 | Cummiskey et al. | |
| 7,990,937 B2 | 8/2011 | Chang et al. | |
| 8,135,360 B2 | 3/2012 | Taki et al. | |
| 8,352,040 B2 | 1/2013 | Von Arx et al. | |
| 8,538,481 B2 | 9/2013 | Meindl et al. | |
| 8,831,073 B2 * | 9/2014 | Kawasaki | H04B 1/40 375/219 |
| 9,281,860 B2 | 3/2016 | Kawasaki | |
| 9,544,007 B2 | 1/2017 | Kawasaki | |
| 2002/0054627 A1 | 5/2002 | Asikainen | |
| 2002/0080897 A1 | 6/2002 | Main et al. | |
| 2002/0114038 A1 | 8/2002 | Arnon et al. | |
| 2003/0078022 A1 | 4/2003 | Cai | |
| 2003/0118081 A1 | 6/2003 | Philips et al. | |
| 2004/0002364 A1 | 1/2004 | Trikkonen et al. | |
| 2004/0017864 A1 | 1/2004 | Chen | |
| 2004/0114556 A1 | 6/2004 | Miller et al. | |
| 2005/0141631 A1 | 6/2005 | Takano | |
| 2005/0176377 A1 | 8/2005 | Shoji et al. | |
| 2005/0226355 A1 | 10/2005 | Kibune et al. | |
| 2006/0023811 A1 * | 2/2006 | Yoon | H04L 27/2273 375/326 |
| 2006/0121933 A1 | 6/2006 | Ikeda | |
| 2006/0214842 A1 | 9/2006 | Takenoshita et al. | |
| 2006/0276702 A1 | 12/2006 | McGinnis | |
| 2007/0019767 A1 | 1/2007 | Buda et al. | |
| 2007/0132521 A1 | 6/2007 | Lee et al. | |
| 2007/0183392 A1 | 8/2007 | Tandai et al. | |
| 2007/0213019 A1 | 9/2007 | Devries et al. | |
| 2008/0169928 A1 * | 7/2008 | Mickle | G06K 19/0723 340/572.4 |
| 2008/0175421 A1 | 7/2008 | Chizari | |
| 2009/0067402 A1 | 3/2009 | Forenza et al. | |
| 2009/0129450 A1 | 5/2009 | Eum et al. | |
| 2009/0156149 A1 * | 6/2009 | Plevridis | H03L 7/23 455/260 |
| 2009/0257529 A1 | 10/2009 | Popplewell et al. | |
| 2010/0020757 A1 | 1/2010 | Walton et al. | |
| 2010/0166124 A1 | 7/2010 | Behrens et al. | |
| 2010/0182211 A1 | 7/2010 | Peters | |
| 2010/0295663 A1 | 11/2010 | Shoarinejad et al. | |
| 2010/0303184 A1 | 12/2010 | Komori | |
| 2011/0064036 A1 | 3/2011 | Tsai et al. | |
| 2011/0120558 A1 | 5/2011 | Facchetti | |
| 2011/0194591 A1 | 8/2011 | Agee et al. | |
| 2011/0229141 A1 | 9/2011 | Chave et al. | |
| 2011/0249519 A1 | 10/2011 | Tamura | |
| 2011/0291907 A1 | 12/2011 | Puzella et al. | |
| 2012/0155517 A1 | 6/2012 | Oga | |
| 2012/0207195 A1 * | 8/2012 | Kawasaki | H04B 1/04 375/219 |
| 2012/0295539 A1 | 11/2012 | McCormack | |
| 2013/0217336 A1 | 8/2013 | McCormack | |
| 2014/0024314 A1 | 1/2014 | McCormack | |

FOREIGN PATENT DOCUMENTS

| | | |
|---|---|---|
| EP | 1 821 418 A2 | 8/2007 |
| JP | 06-338809 A | 12/1994 |
| JP | 10-256478 A | 9/1998 |
| JP | 11-098103 A | 4/1999 |
| JP | 2003-179516 A | 6/2003 |
| JP | 2003-244016 A | 8/2003 |
| JP | 2003-264483 A | 9/2003 |
| JP | 2005-204221 A | 7/2005 |
| JP | 2005-223411 A | 8/2005 |
| JP | 2005-303607 A | 10/2005 |
| JP | 2007-150256 A | 6/2007 |
| JP | 2007-228499 A | 9/2007 |
| JP | 2007-318730 A | 12/2007 |
| JP | 2008-535272 A | 8/2008 |
| JP | 2008-252566 A | 10/2008 |
| JP | 2008-271188 A | 11/2008 |
| JP | 2008-541639 A | 11/2008 |
| JP | 2009-182894 A | 8/2009 |
| JP | 2009-246764 A | 10/2009 |
| JP | 2009-272822 A | 11/2009 |
| JP | 2010-141679 A | 6/2010 |
| JP | 2010-283813 A | 12/2010 |
| JP | 4708241 B2 | 6/2011 |
| WO | WO-01/58018 A2 | 8/2001 |
| WO | WO-2005/093982 A1 | 10/2005 |
| WO | WO-2009/017230 A1 | 2/2009 |
| WO | WO-2009/026400 A1 | 2/2009 |
| WO | WO-2009/069532 A1 | 6/2009 |
| WO | WO-2009/089354 A2 | 7/2009 |

OTHER PUBLICATIONS

Extended European Search Report dated Mar. 16, 2012 for corresponding European Application No. 10 17 3823.
Japanese Office Action dated Aug. 13, 2013 for corresponding Japanese Application No. 2009-200118.
Japanese Office Action dated Oct. 22, 2013 for corresponding Japanese Applcation No. 2010-011360.
Japanese Office Action dated Nov. 26, 2013 for corresponding Japanese Application No. 2009-200118.
Chinese Office Action dated Dec. 4, 2013 for corresponding Chinese Application No. 201080048039.0.
Japanese Office Action dated Jul. 8, 2014 for application No. 2010-130276.
Japanese Office Action dated Jul. 8, 2014 for application No. 2010-183805.
Japanese Office Action dated Aug. 12, 2014 for application No. 2009-223682.

(56) References Cited

OTHER PUBLICATIONS

Nishimoto et al., "Performance Comparison of MIMO-SDM Depending on Array Configurations Based on Indoor Measurements", Graduate School of Engineering, the Institute of Electronics, Information and Communication Engineers, Hokkaido University, pp. 123-129.

Kashiwagi et al., "A Study on Path Shadowing Model due to Human Activities in Indoor Radio Environments", Department of Information, The Institute of Electronics, Kwansei Gakuin University, 85-91.

Chinese Office Action dated Dec. 28, 2016 for corresponding Chinese Application No. 201410430705.7.

\* cited by examiner

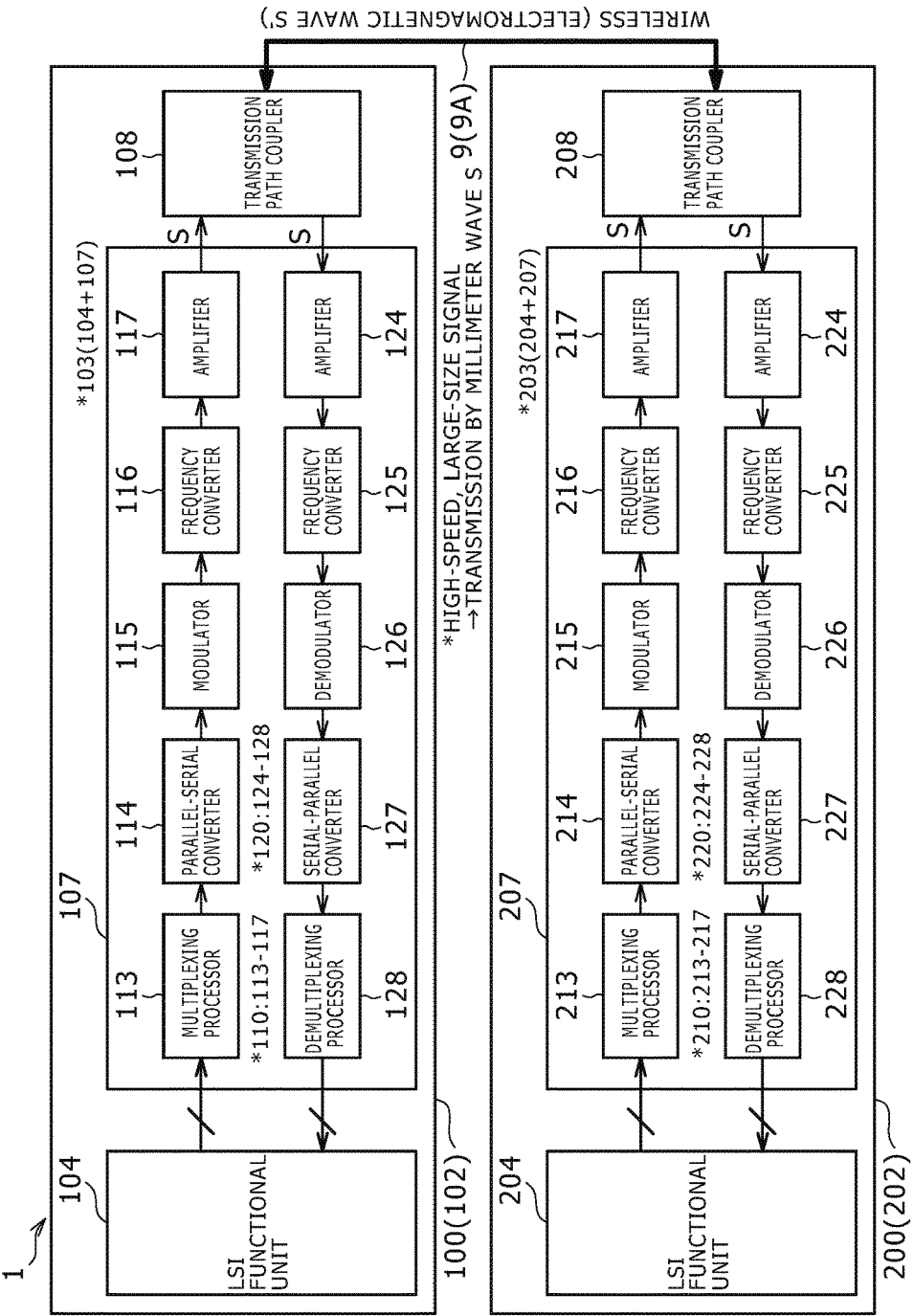

FIG.1B1 FULL-DUPLEX SYSTEM TO WHICH FDM IS APPLIED
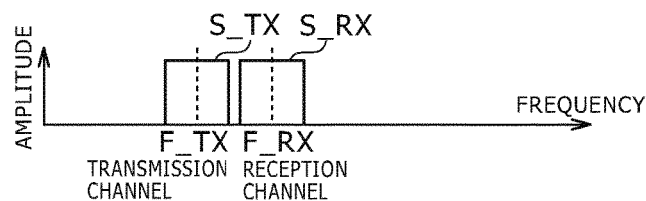
FIG.1B2 SIGNAL TRANSMISSION EMPLOYING FDM
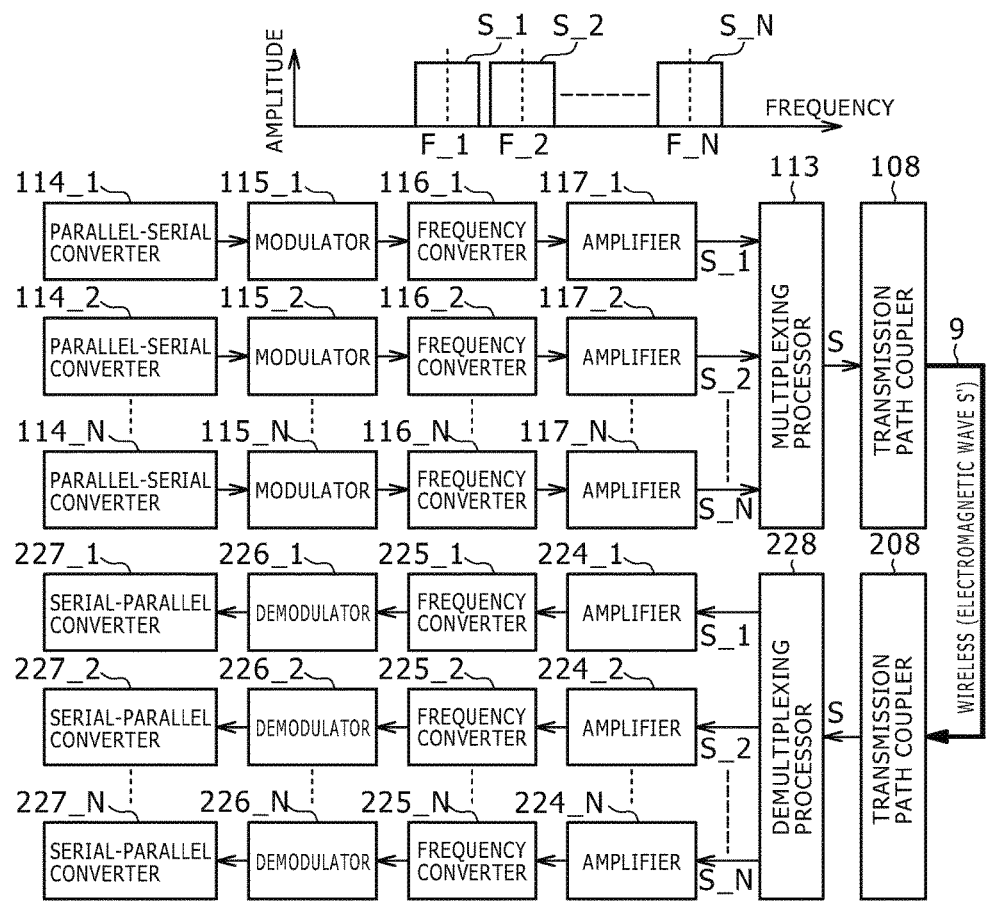
FIG.1B3 FDM + FULL-DUPLEX SYSTEM + MULTI-CHANNEL TRANSMISSION (N1=N2)
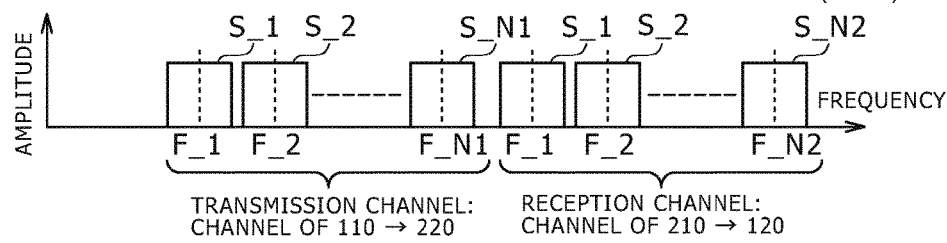

FIG. 4A1
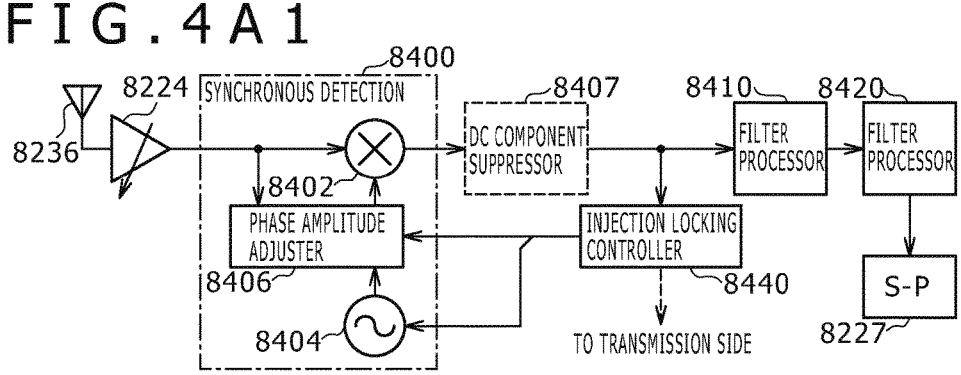
FIG. 4A2
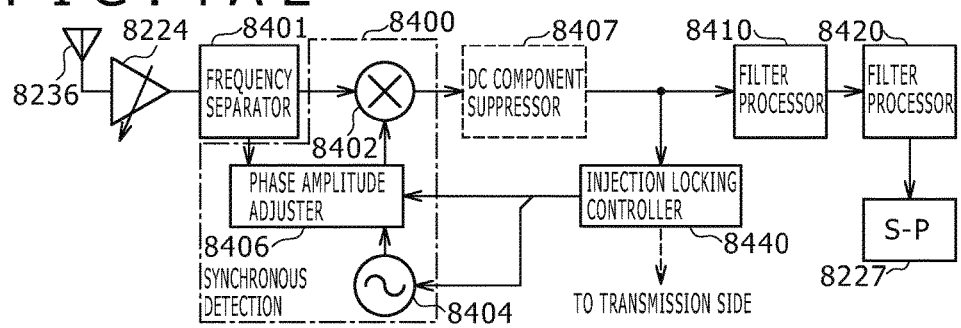
FIG. 4A3
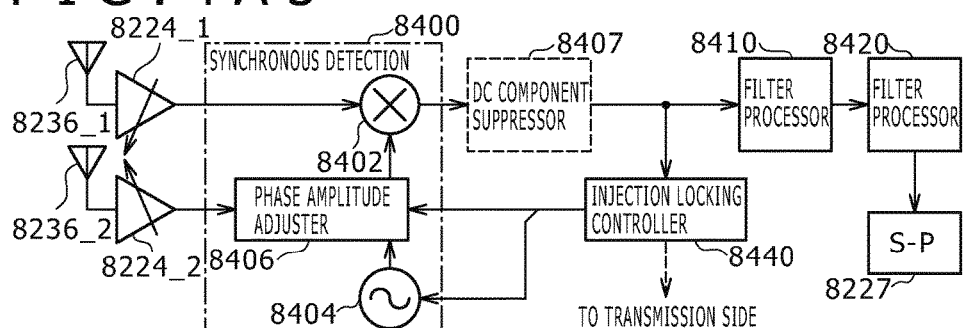
FIG. 4A4
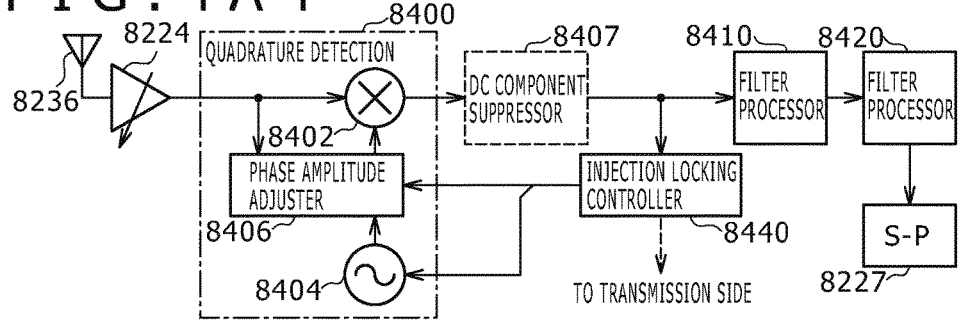

Vo : OUTPUT SIGNAL OF RECEPTION-SIDE LOCAL OSCILLATOR 8404
*FREE-RUNNING OUTPUT

Vout : OUTPUT SIGNAL OF RECEPTION-SIDE LOCAL OSCILLATOR 8404
*INJECTION-LOCKED OUTPUT Sin j : INJECTION SIGNAL $\theta - \phi$ : THE AMOUNT OF PHASE SHIFT FOR SYNCHRONOUS DETECTION (WHEN MODULATION AXIS AND REFERENCE CARRIER AXIS ARE IN PHASE)

FIG.5A1
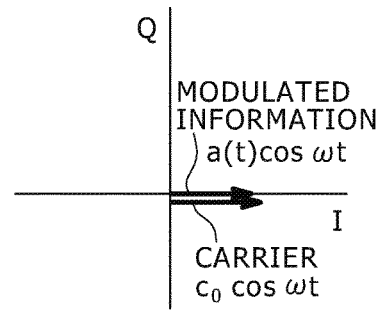
FIG.5A5
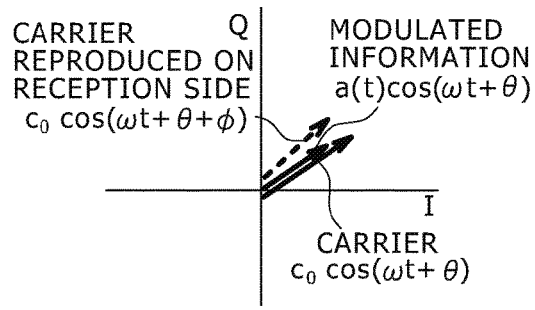
FIG.5A2
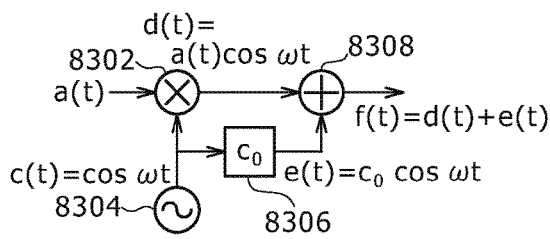
FIG.5A3
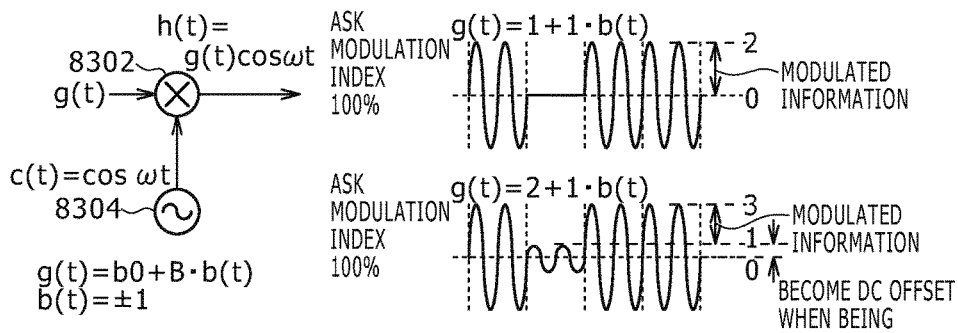
FIG.5A4
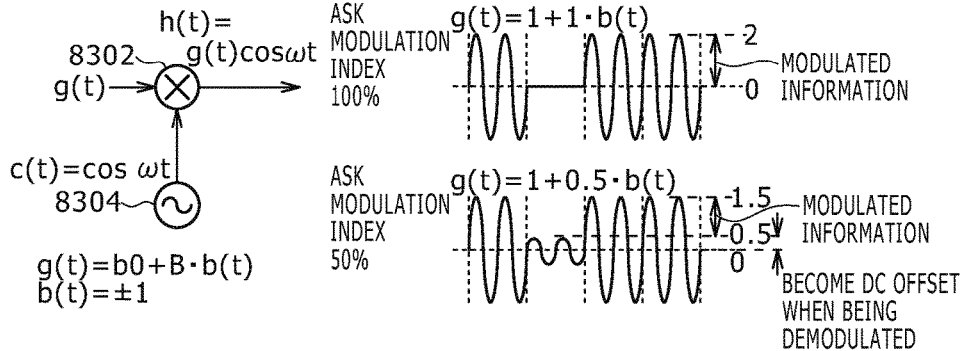

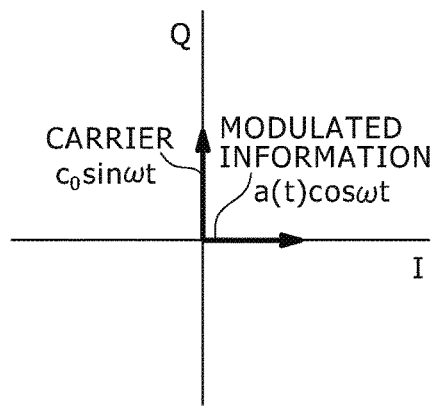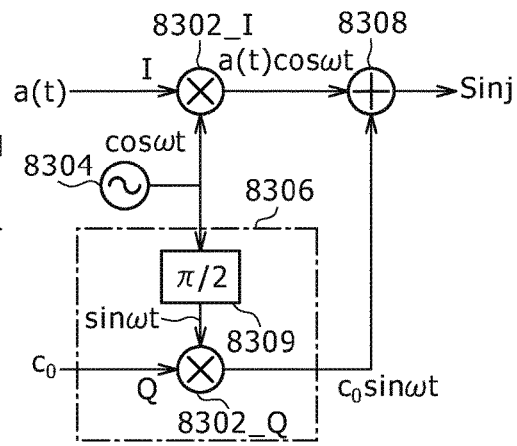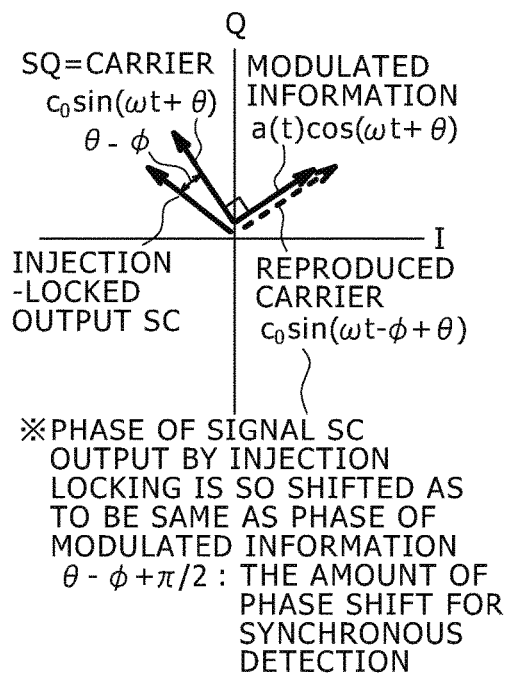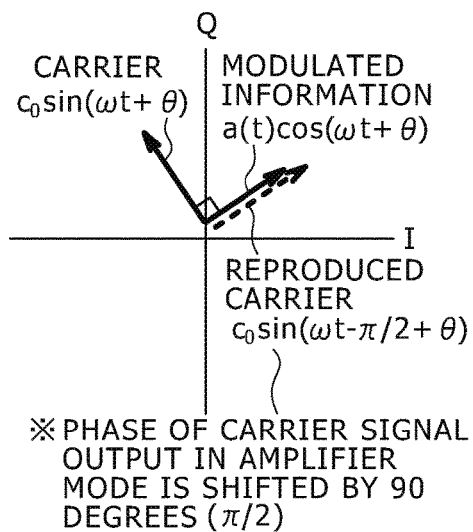

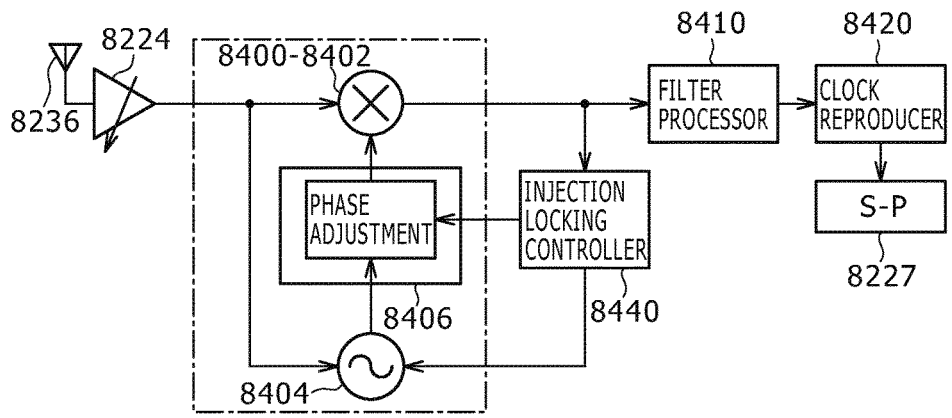
FIG.5C1
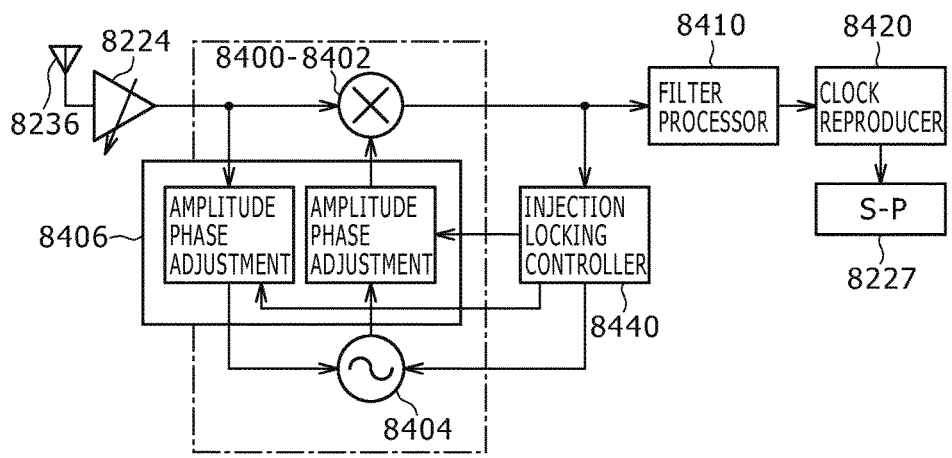
FIG.5C2
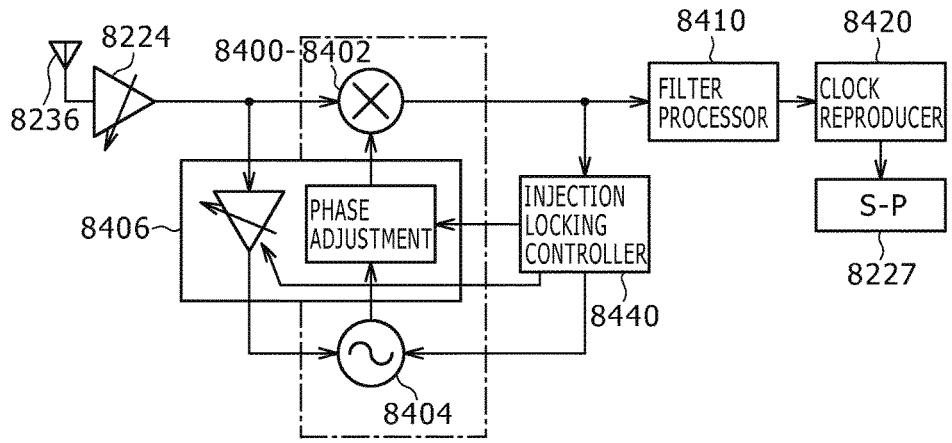
FIG.5C3

FIG.6A1
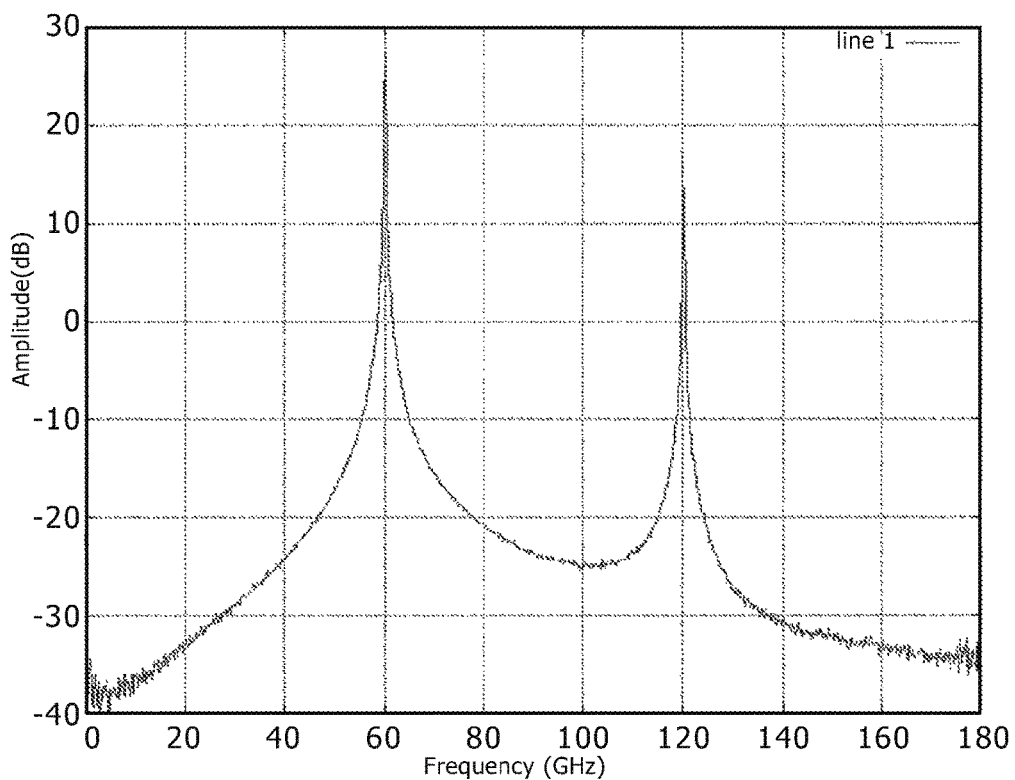
FIG.6A2
| ITEMS | SPECIFICATIONS |
|---|---|
| I:DATA | M-SEQUENCE 2^11-1 |
| I:SYMBOL RATE | 10GS/s |
| I:Rolloff Factor | 0.35, root raised cosine |
| Q: | DC |
| CENTER FREQUENCY | 60GHz |

FIG. 6B1
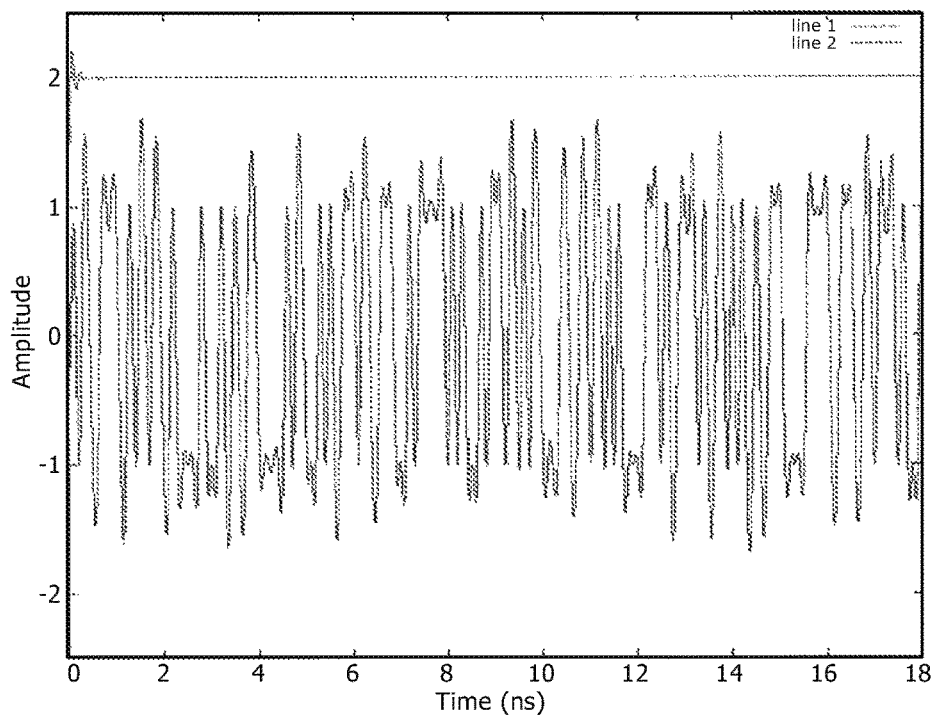
FIG. 6B2
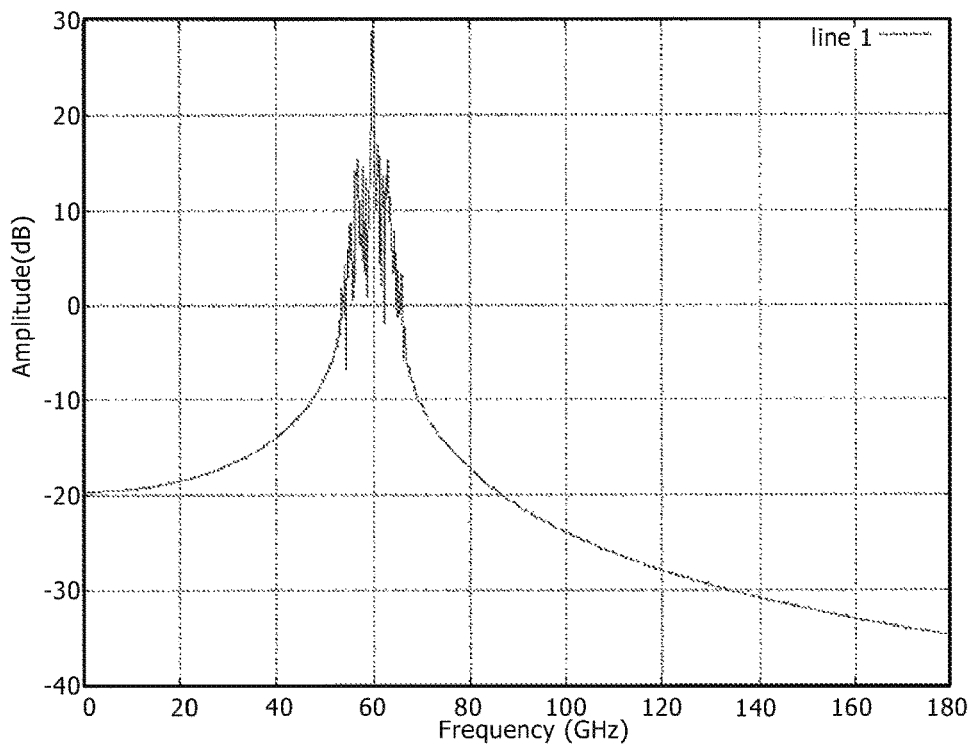

FIG.6C1
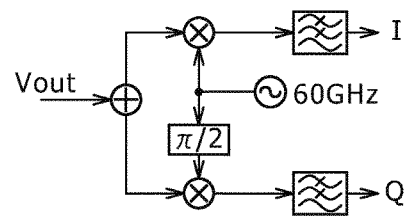
FIG.6C2
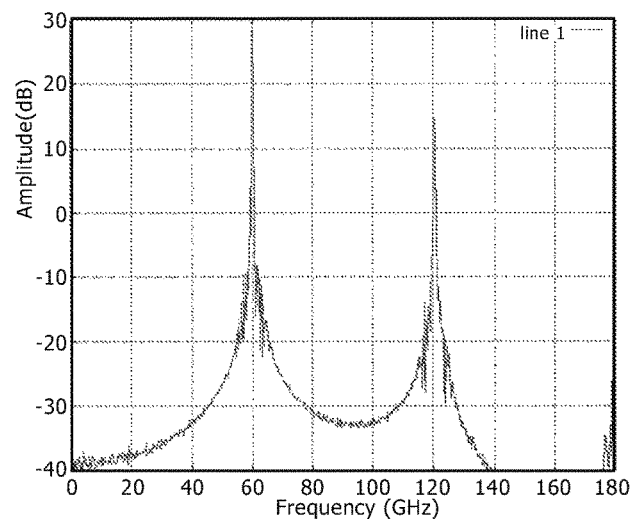
FIG.6C3
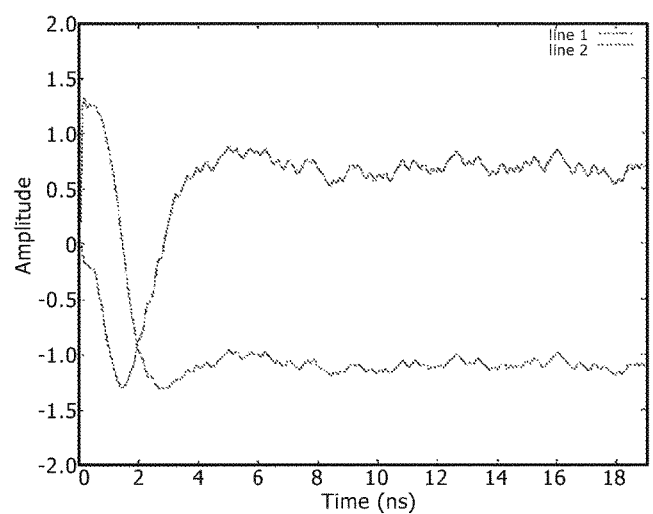

FIG.6D1
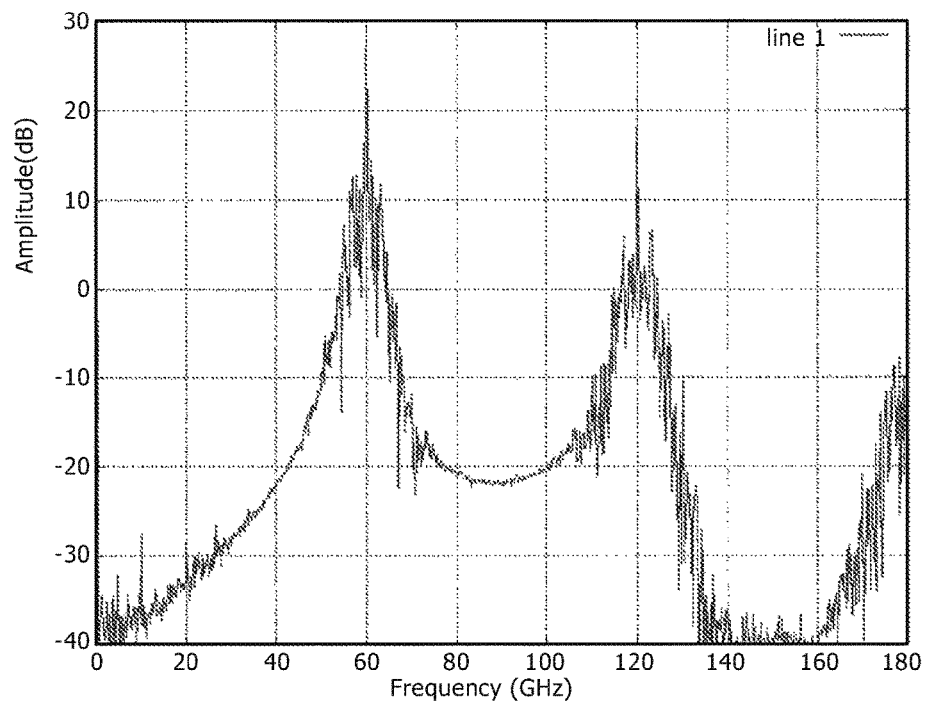
FIG.6D2
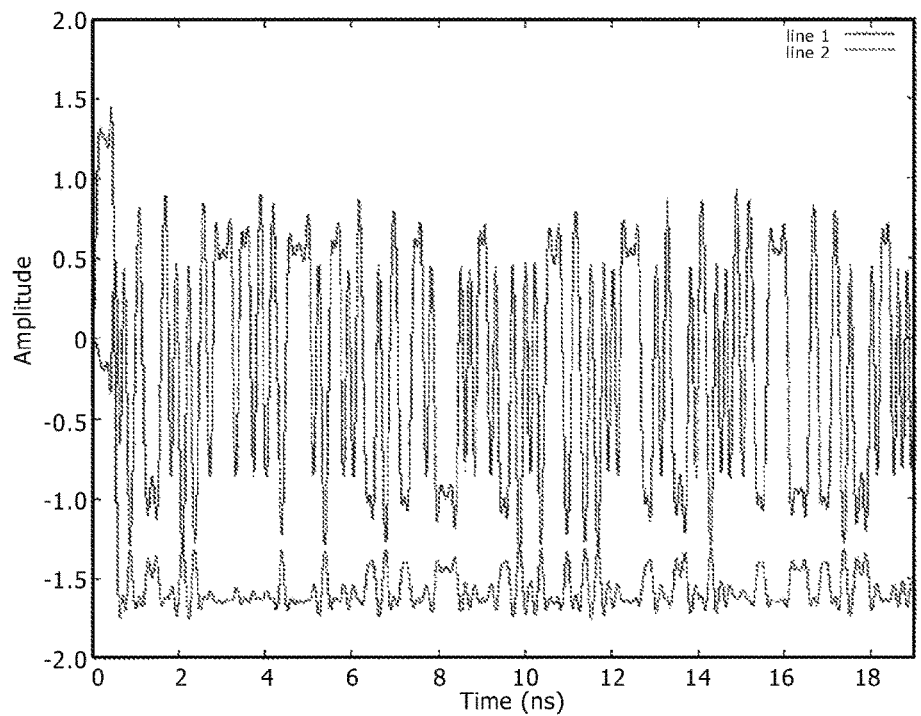

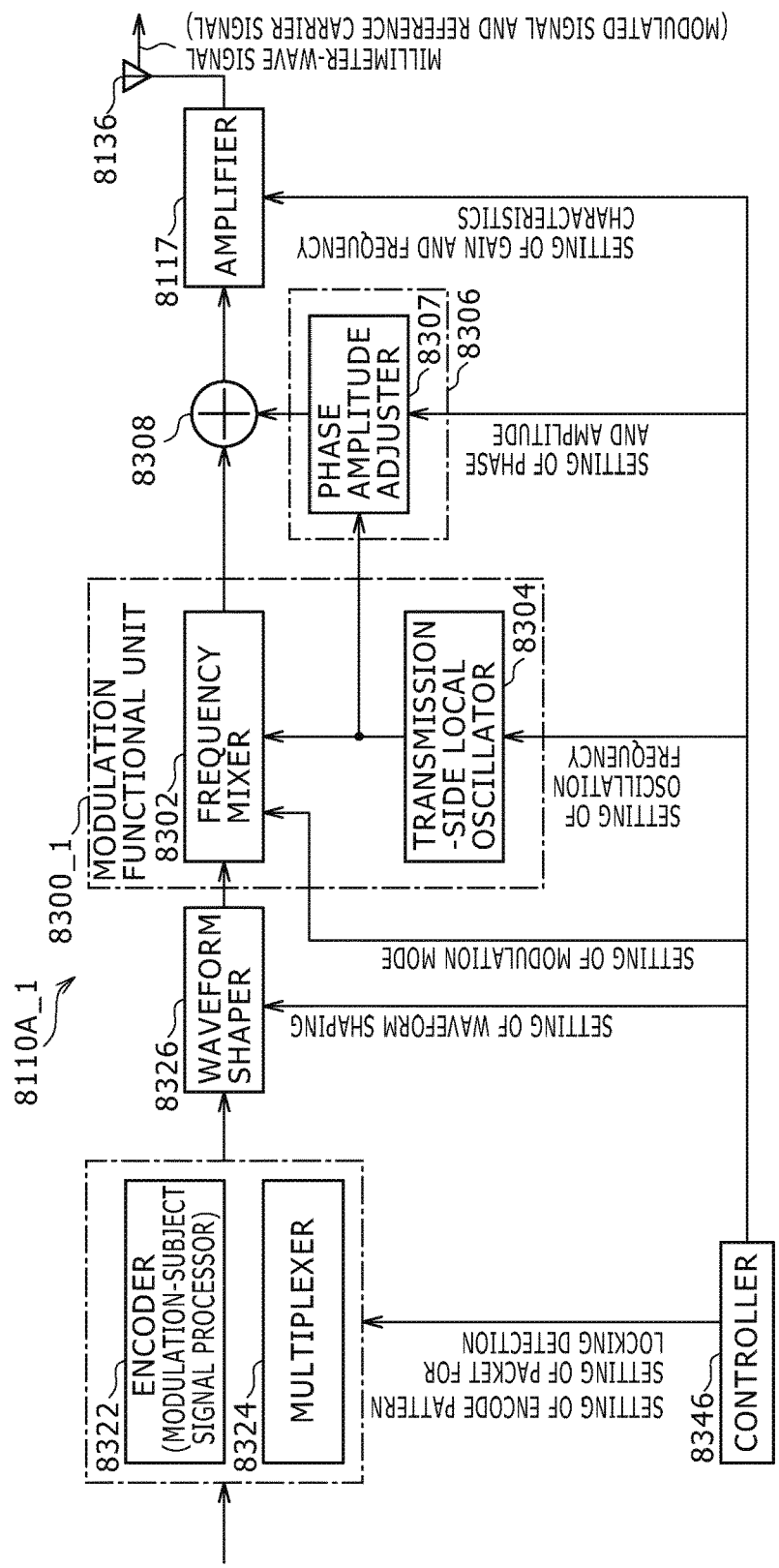

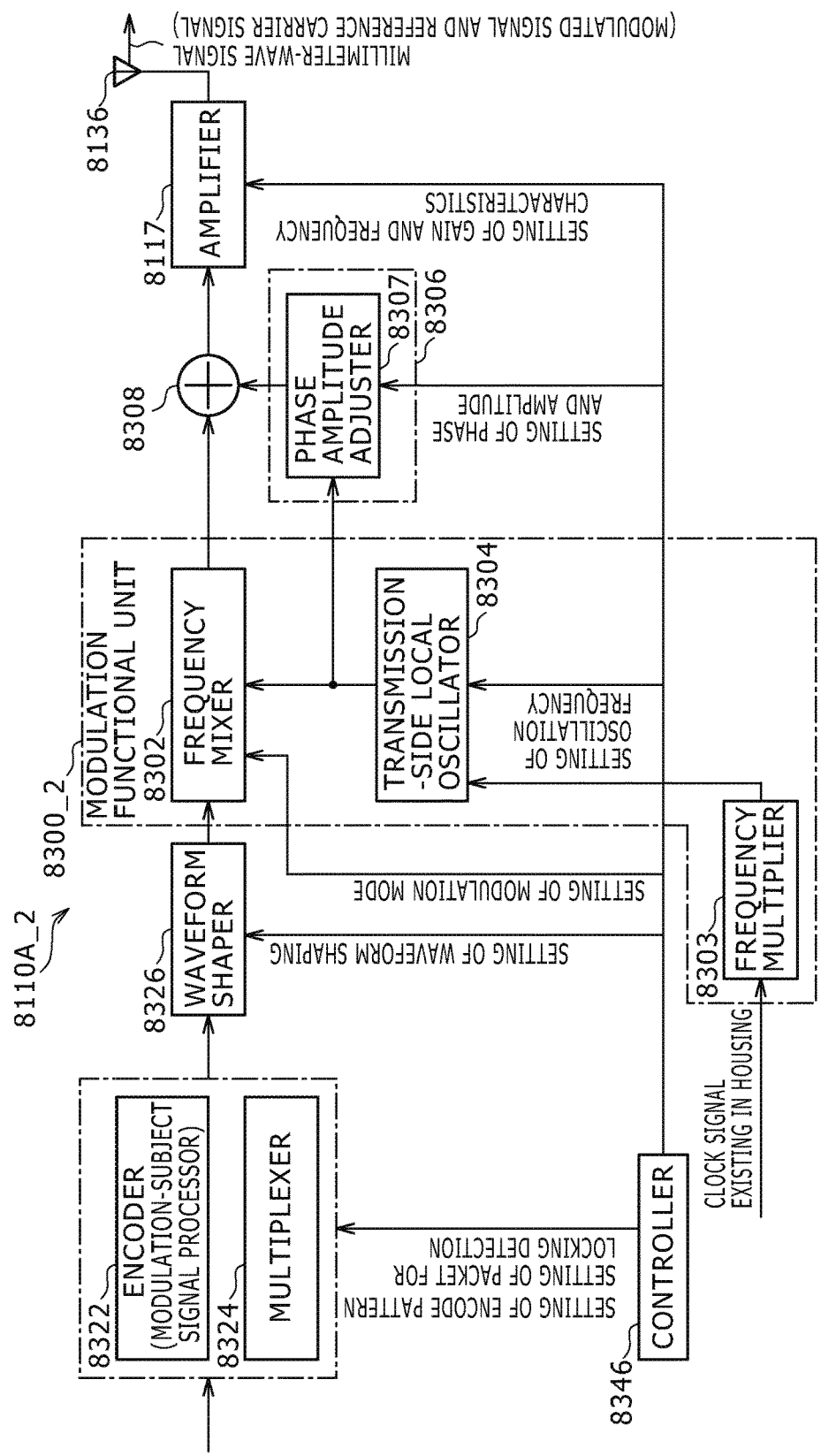

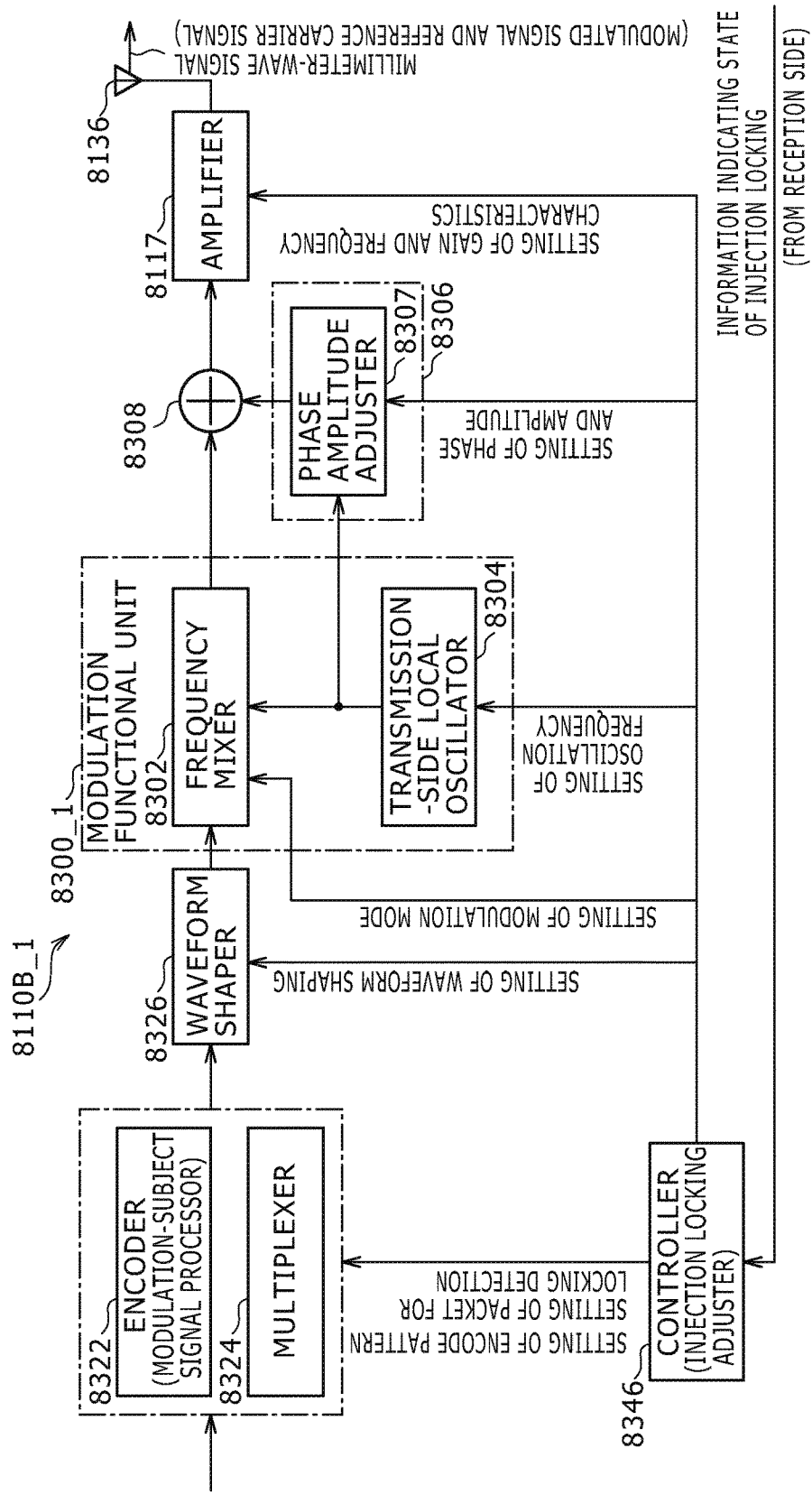

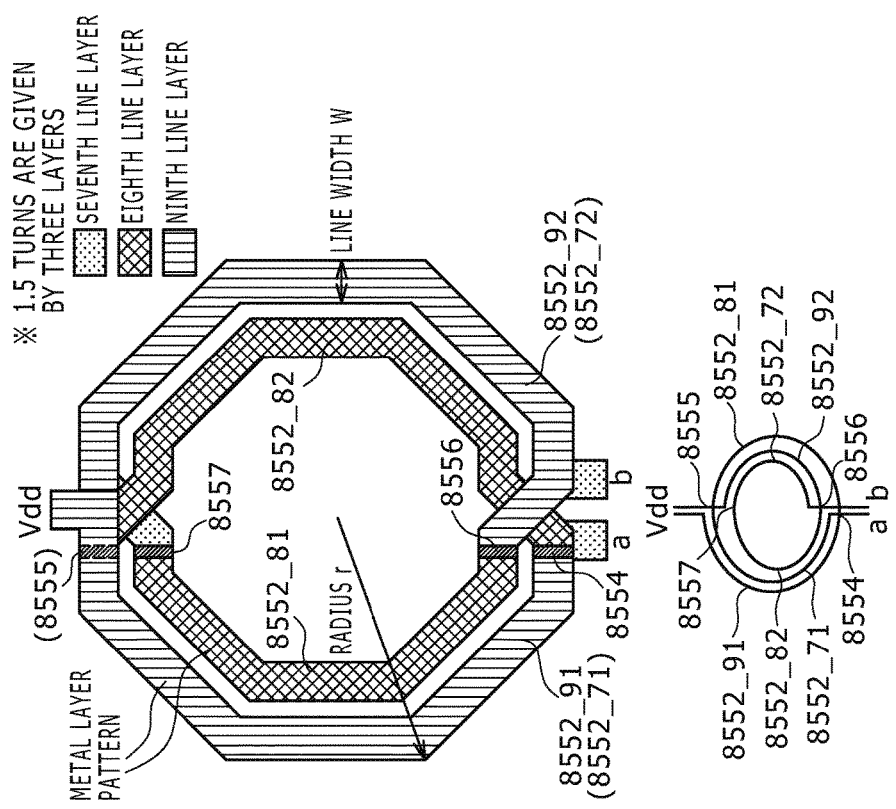
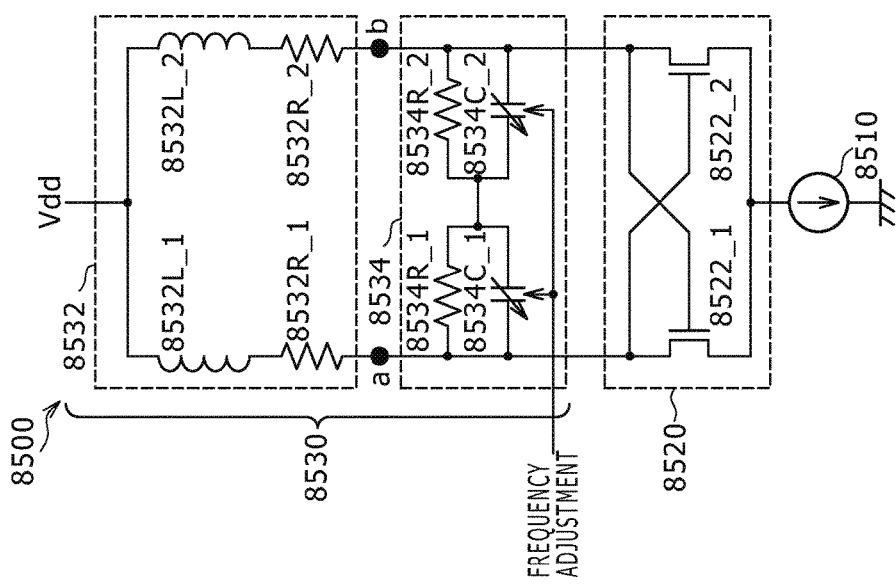

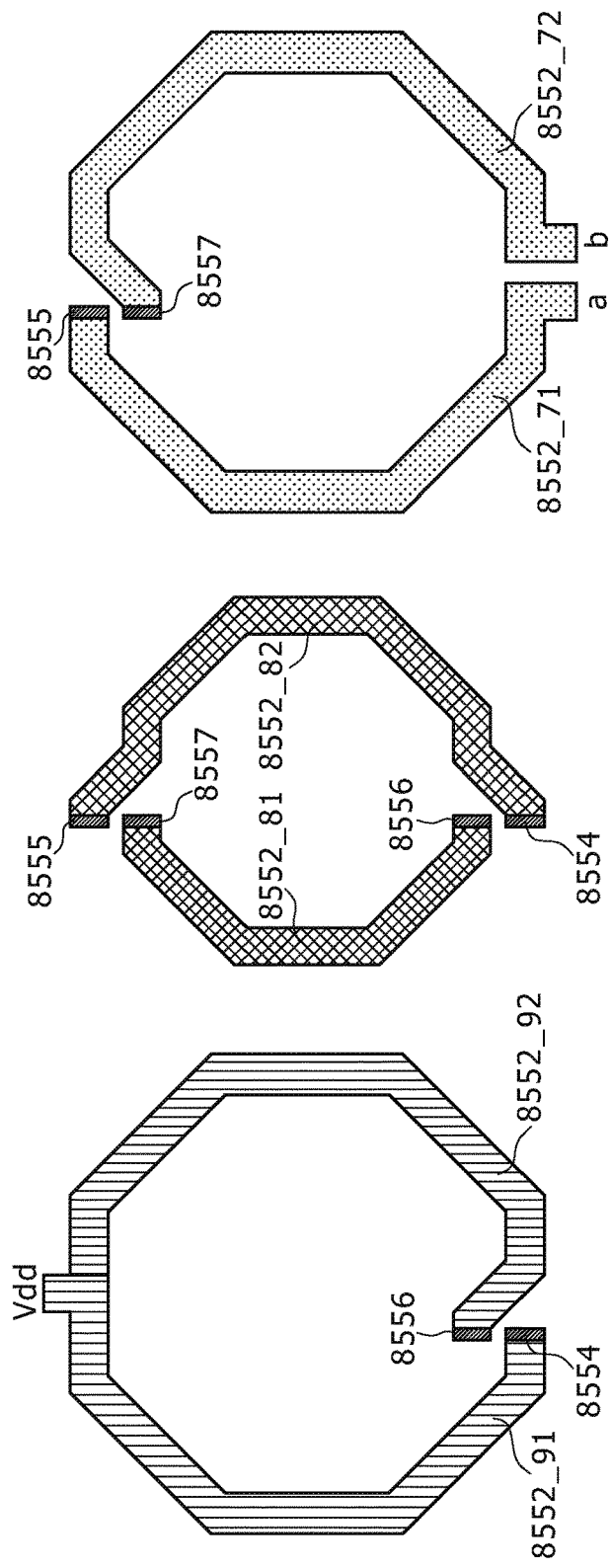

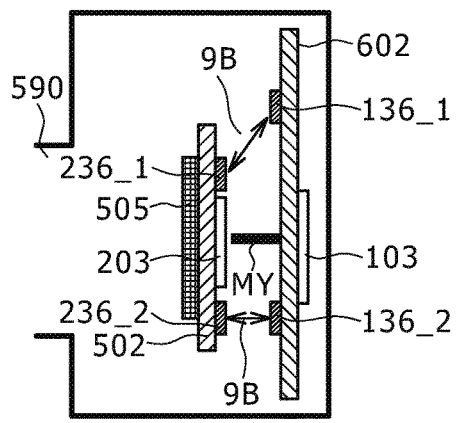
FIG. 13A1
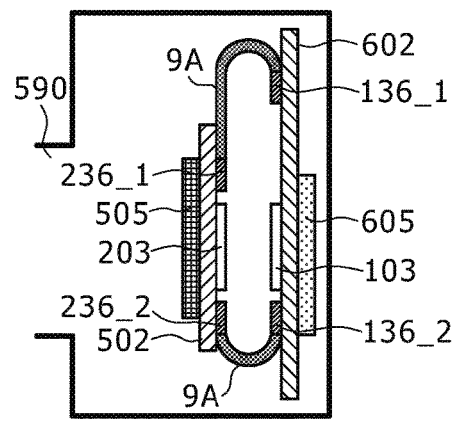
FIG. 13A2
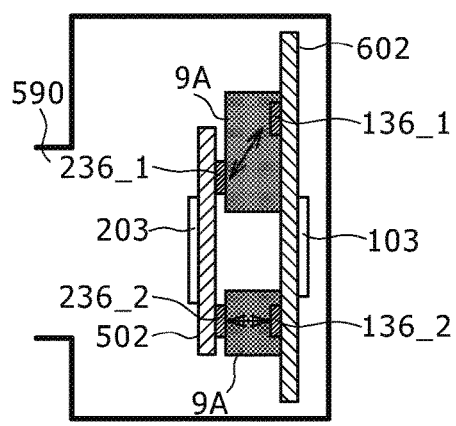
FIG. 13A3
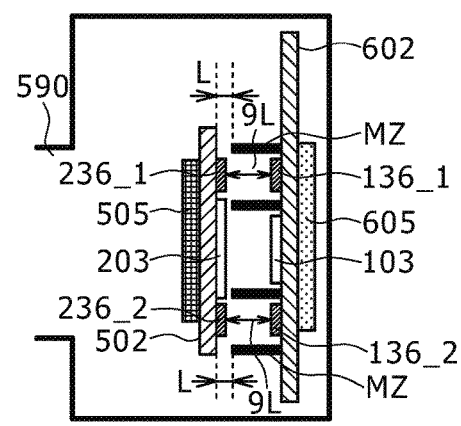
FIG. 13A4
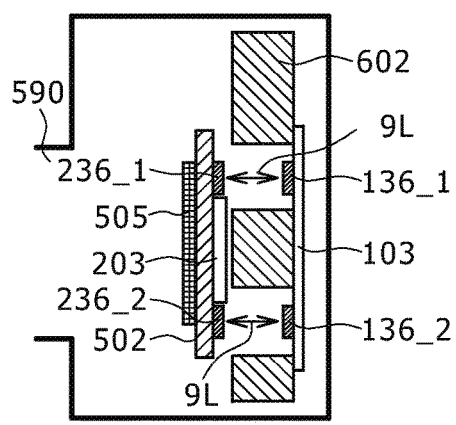
FIG. 13A5

FIG.13B1
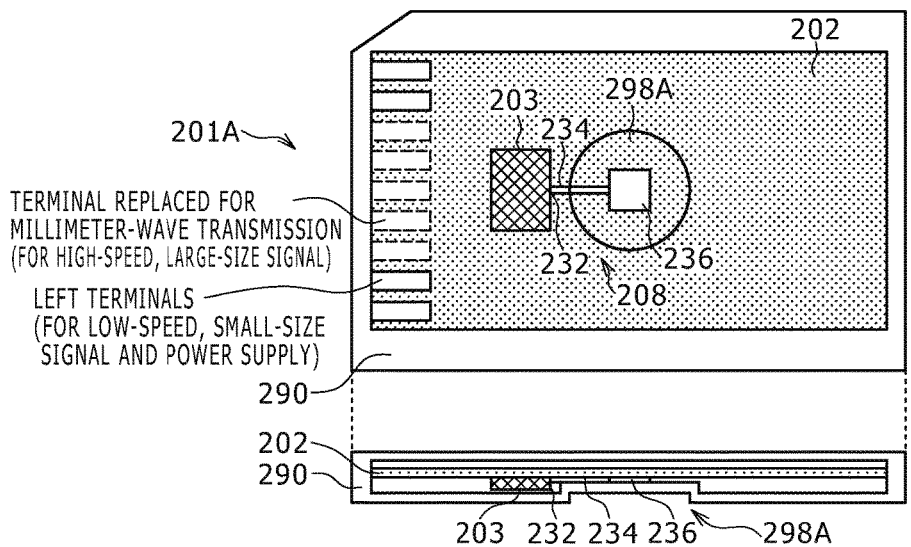
FIG.13B2
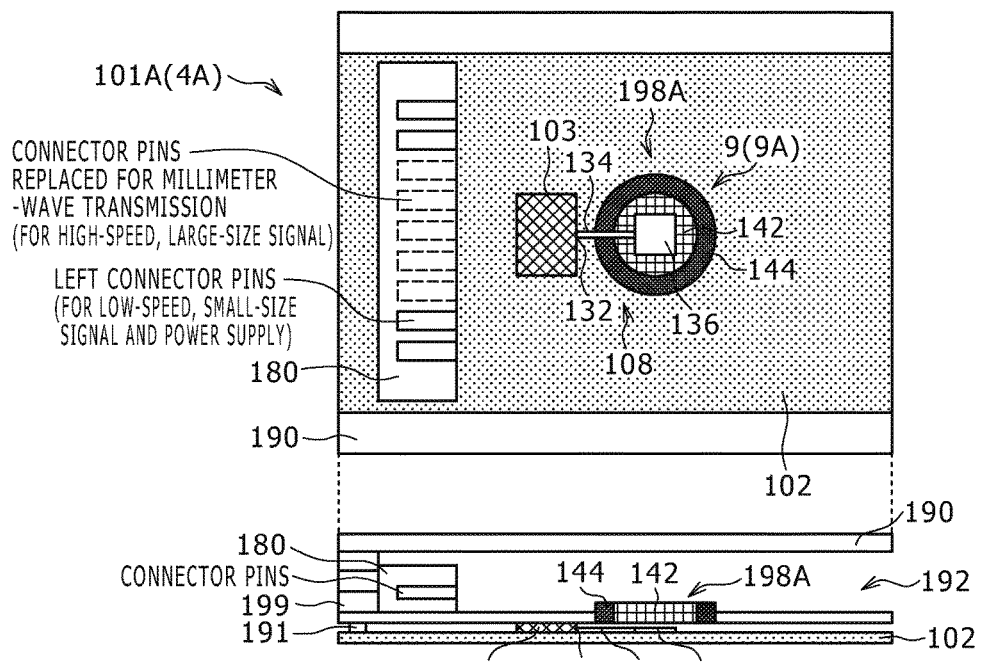
FIG.13B3
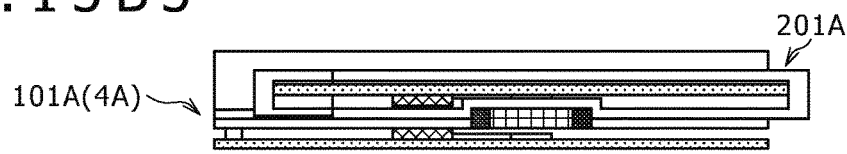

FIG.13C1
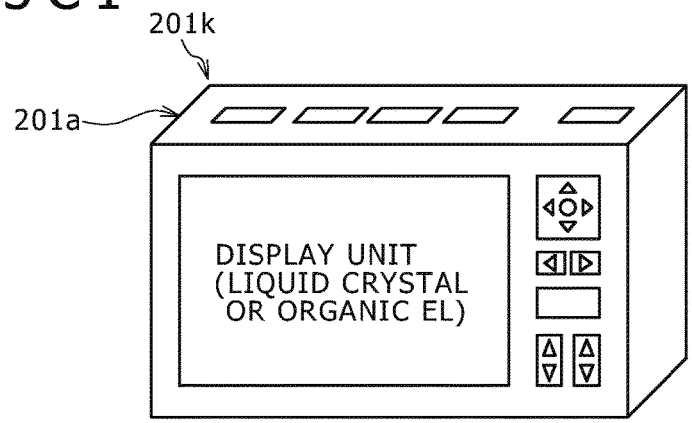
FIG.13C2
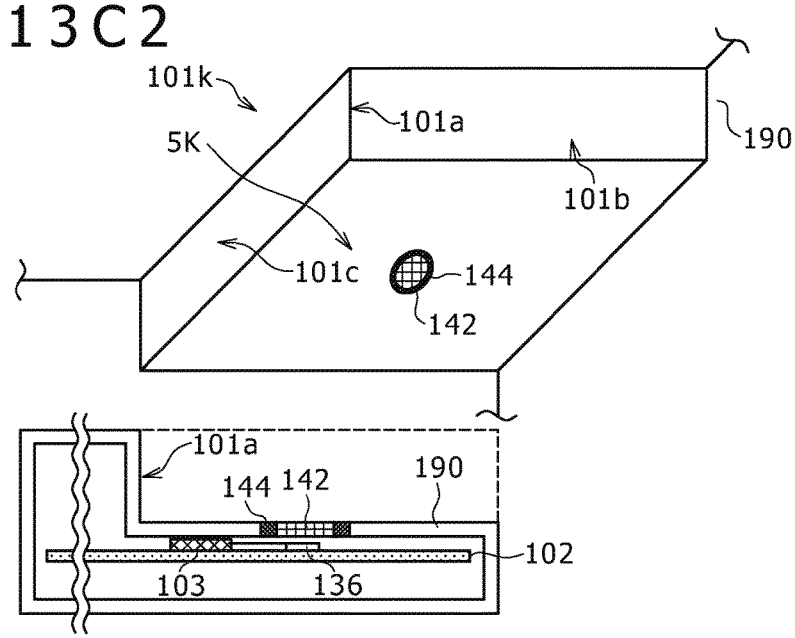
FIG.13C3
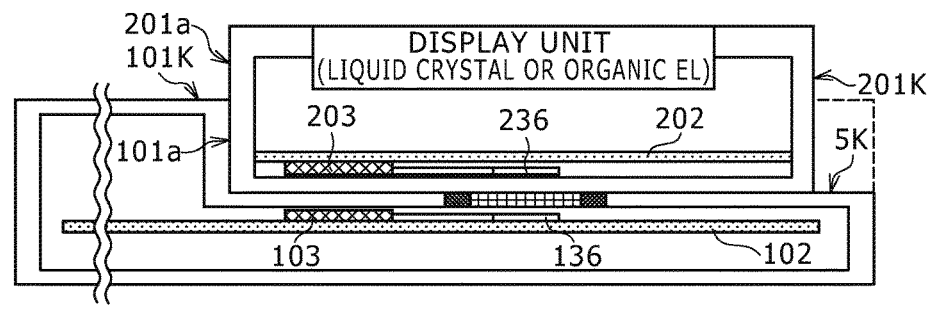

WIRELESS TRANSMISSION SYSTEM, WIRELESS COMMUNICATION DEVICE, AND WIRELESS COMMUNICATION METHOD

CROSS REFERENCES TO RELATED APPLICATIONS

This is a Continuation of application Ser. No. 15/381,409, filed on Dec. 16, 2016, which is a Continuation of application Ser. No. 15/010,197, filed on Jan. 29, 2016, now U.S. Pat. No. 9,544,007, issued on Jan. 10, 2017, which is a Continuation of application Ser. No. 14/453,325, filed on Aug. 6, 2014, now U.S. Pat. No. 9,281,860, issued on Mar. 8, 2016, which is a Continuation of application Ser. No. 12/805,552, filed on Aug. 5, 2010, now U.S. Pat. No. 8,831,073, issued on Sep. 9, 2014, which contains subject matter related to Japanese Patent Application JP 2009-200118, filed in the Japan Patent Office on Aug. 31, 2009, Japanese Patent Application JP 2009-199403, filed in the Japan Patent Office on Aug. 31, 2009, and Japanese Patent Application JP 2009-199404, filed in the Japan Patent Office on Aug. 31, 2009 the entire contents of which being incorporated herein by reference.

BACKGROUND OF THE INVENTION

1. Field of the Invention

The present invention relates to a wireless transmission system, a wireless communication device, and a wireless communication method.

2. Description of the Related Art

For example, low voltage differential signaling (LVDS) is known as a technique for realizing high-speed signal transmission between pieces of electronic apparatus disposed at a comparatively-short distance (e.g. within several centimeters to ten and several centimeters) and high-speed signal transmission in electronic apparatus. However, along with recent further increases in the size and transmission speed of transmission data, increase in the power consumption, increase in the influence of signal distortion due to reflection and so forth, increase in unnecessary radiation, etc. become problems. For example, the performance of the LVDS is reaching the limit in the case of high-speed (real-time) transmission of e.g. video signals (including imaging signals) and computer image signals in apparatus.

It would be possible to increase the number of lines and parallelize the signal transmission to thereby decrease the transmission speed per one signal line in order to address the problems in increasing the transmission speed of transmission data. However, this countermeasure leads to increase in the number of input/output terminals. As a result, increase in the complexity of the printed board and cable lines, increase in the semiconductor chip size, and so forth are required. Furthermore, because high-speed, large-size data are routed by the lines, so-called electromagnetic interference becomes a problem.

Both of the problems in the LVDS and the technique of increasing the number of lines are attributed to the signal transmission by the electrical lines. Thus, as a technique for solving the problems attributed to the signal transmission by the electrical lines, techniques of transmitting signals with replacement of the electrical lines by wireless transmission have been proposed (refer to e.g. Japanese Patent Laid-open No. 2005-204221 (hereinafter, patent document 1), Japanese Patent Laid-open No. 2005-223411 (hereinafter, patent document 2), Japanese Patent Laid-open No. Hei 10-256478 (hereinafter, patent document 3), and U.S. Pat. No. 5,754,948 (hereinafter, patent document 4)).

Patent documents 1 and 2 propose that signal transmission in a housing is performed by wireless transmission and the ultra wide band (UWB) communication system is employed. Patent documents 3 and 4 show that a carrier frequency in the millimeter wave band is used.

SUMMARY OF THE INVENTION

However, the carrier frequency is low in the UWB communication system of patent documents 1 and 2. Thus, this system is not suitable for high-speed communication for e.g. video signal transmission. In addition, this system has size problems such as a large antenna size. Furthermore, the frequency used in the transmission is close to the frequency of processing of other baseband signals. Therefore, this system also involves a problem that interference readily occurs between the wireless signal and the baseband signal. Moreover, when the carrier frequency is low, the transmission is susceptible to the influence of driving system noise in the apparatus and countermeasures thereagainst are necessary.

On the other hand, if a carrier frequency in the millimeter wave band, which corresponds to shorter wavelengths, is used as described in patent documents 3 and 4, the problems of the antenna size and the interference can be solved.

In the case of employing wireless transmission to which the millimeter wave band is applied, the carrier frequency is required to have high stability if a wireless system (wireless communication technique) like one used in the general open-air area (outdoor area) is used. This means that an oscillator circuit having high frequency stability but a complicated circuit configuration is necessary, and means that the system configuration as a whole also becomes complicated.

For example, the circuit scale becomes larger if external basic parts, a frequency multiplier circuit, a PLL circuit, and so forth are used in order to realize a carrier signal with a frequency whose stability is as high as ppm (parts per million) order. Furthermore, in the case of attempting to realize the whole of the oscillator circuit including a tank circuit (resonant circuit composed of inductors and capacitors) by a silicon integrated circuit, in practice, it is difficult to form a tank circuit having a high quality factor and thus a tank circuit having a high quality factor has to be disposed outside the integrated circuit.

However, in the case of considering realization of wireless high-speed signal transmission between pieces of electronic apparatus disposed at a comparatively-short distance and in electronic apparatus by a frequency band corresponding to shorter wavelengths (e.g. millimeter wave band), it would appear that it is not wise to require the carrier frequency to have high stability. Rather, it would appear that it is better to consider relaxing the stability of the carrier frequency to thereby use an oscillator circuit having a simple circuit configuration and simplify the system configuration as a whole.

However, if the stability of the carrier frequency is simply relaxed, possibly frequency variation (difference between the carrier frequency used by the transmitting circuit and the carrier frequency used by the receiving circuit) will become a problem and proper signal transmission could not be performed (signal could not be properly demodulated), although depending on the modulation/demodulation system.

There is a need for the present invention to provide a mechanism that allows proper signal transmission while relaxing the stability of the carrier frequency in wireless signal transmission between pieces of electronic apparatus and in apparatus.

In a wireless transmission system, wireless communication devices, and a wireless communication method according to modes of the present invention, first, a communication unit for transmission and a communication unit for reception are disposed in the housing of electronic apparatus.

A wireless signal transmission path enabling wireless information transmission is constructed between the communication unit for transmission and the communication unit for reception. The wireless signal transmission path may be the air (so-called free space). However, it is preferable that the wireless signal transmission path be one having a waveguide structure that transmits a wireless signal while confining the wireless signal in the transmission path.

In some cases, the wireless transmission system is formed of the combination of plural pieces of electronic apparatus that each includes transmission-side communication unit and/or reception-side communication unit so that the transmission side and the reception side may form a pair. In other cases, one piece of electronic apparatus is so configured as to include transmission-side and reception-side communication units and this one piece of electronic apparatus serves as the wireless transmission system itself. The wireless communication device is so configured as to include a transmission-side or reception-side communication unit. For example, the wireless communication device is provided as a semiconductor integrated circuit and is mounted on a circuit board in electronic apparatus.

The communication unit for transmission carries out frequency conversion of a transmission-subject signal by a modulation carrier signal to generate a modulated signal, and sends out the generated modulated signal to the wireless signal transmission path. The communication unit for reception generates a demodulation carrier signal locked with the modulation carrier signal by using a signal received via the wireless signal transmission path as an injection signal, and demodulates the transmission-subject signal by carrying out frequency conversion of the modulated signal received via the wireless signal transmission path by the demodulation carrier signal.

In its essence, the wireless signal transmission path is constructed between the transmission-side communication unit disposed in the housing of electronic apparatus and the reception-side communication unit disposed in the housing of electronic apparatus similarly (this electronic apparatus may be either the same as or different from that in which the transmission-side communication unit is disposed), and wireless signal transmission is performed between both communication units.

In this wireless signal transmission, in the mechanism of the modes of the present invention, the reception side uses the received signal as the injection signal to generate the demodulation carrier signal locked with the modulation carrier signal, and demodulates the transmission-subject signal by carrying out frequency conversion (down-conversion) by using the demodulation carrier signal.

The transmission side may send out only the modulated signal obtained by frequency conversion (up-conversion), and the received modulated signal may be used as the injection signal for generating the demodulation carrier signal. However, it is preferable that a reference carrier signal used for the modulation be also sent out together with the modulated signal and the reception side attempt to achieve the injection locking with the received reference carrier signal.

The mechanism of the modes of the present invention provides the state in which the modulation carrier signal used for the up-conversion and the demodulation carrier signal used for the down-conversion are surely locked with each other. Thus, the transmission-subject signal can be properly demodulated even if wireless signal transmission is so performed that the stability of the frequency of the modulation carrier signal is relaxed.

In the down-conversion, use of synchronous detection is easy. By expansively using the synchronous detection for quadrature detection, not only amplitude modulation but also phase modulation and frequency modulation can be employed. This means that the data transmission rate can be enhanced by rendering the modulated signal to be in quadrature for example.

According to the modes of the present invention, in wireless signal transmission between pieces of apparatus or in apparatus (housing), the transmission-subject signal can be properly demodulated on the reception side even if the stability of the frequency of the modulation carrier signal is relaxed.

Because the stability of the frequency of the carrier signal may be relaxed, an oscillator circuit having a simple circuit configuration can be used and the system configuration as a whole can also be simplified.

Because the stability of the frequency of the carrier signal may be relaxed, the whole of the oscillator circuit including a tank circuit (and a frequency converter) can be formed on the same semiconductor substrate. A one-chip oscillator circuit (semiconductor integrated circuit) including a built-in tank circuit and a one-chip communication circuit (semiconductor integrated circuit) including a built-in tank circuit are realized.

BRIEF DESCRIPTION OF THE DRAWINGS

FIG. 1A is a diagram for explaining the signal interface of a wireless transmission system in terms of the functional configuration;

FIGS. 1B1 to 1B3 are diagrams for explaining signal multiplexing in the wireless transmission system;

FIGS. 4A1 to 4A4 are diagrams for explaining a basic configuration example of a demodulation functional unit of the embodiments and the peripheral circuit thereof;

FIGS. 5A1 to 5A5 are diagrams for explaining the basis of demodulation processing when a carrier signal and a reference carrier signal have the same frequency and the same phase;

FIGS. 5B1 to 5B4 are diagrams for explaining the basis of the demodulation processing when the carrier signal and the reference carrier signal have the same frequency and phases in a quadrature relationship;

FIGS. 5C1 to 5C3 are diagrams for explaining the basis of the circuit configuration of the demodulation processing when the carrier signal and the reference carrier signal have the same frequency and phases in a quadrature relationship;

FIGS. 6A1 and 6A2 are first diagrams for explaining a specific example of the demodulation processing when the carrier signal and the reference carrier signal have the same frequency and phases in a quadrature relationship;

FIGS. 6B1 and 6B2 are second diagrams for explaining the specific example of the demodulation processing when the carrier signal and the reference carrier signal have the same frequency and phases in a quadrature relationship;

FIGS. 6C1 to 6C3 are third diagrams for explaining the specific example of the demodulation processing when the carrier signal and the reference carrier signal have the same frequency and phases in a quadrature relationship;

FIGS. 6D1 and 6D2 are fourth diagrams for explaining the specific example of the demodulation processing when the carrier signal and the reference carrier signal have the same frequency and phases in a quadrature relationship;

FIG. 7A is a diagram for explaining a configuration example of a transmitter side employing an injection locking system according to a first embodiment of the present invention (first example);

FIG. 7B is a diagram for explaining a configuration example of the transmitter side employing the injection locking system according to the first embodiment (second example);

FIG. 9A is a diagram for explaining a configuration example of the transmitter side employing the injection locking system according to a second embodiment of the present invention (first example);

FIGS. 11A and 11B are diagrams for explaining the circuit configuration of an oscillator circuit and a layout pattern example of an inductor circuit on a CMOS;

FIGS. 11C to 11E are diagrams for explaining the details of the layout pattern example of the inductor circuit on the CMOS;

FIGS. 13A1 to 13A5 are diagrams for explaining a first example of a wireless transmission path structure of the embodiments;

FIGS. 13B1 to 13B3 are diagrams for explaining a second example of the wireless transmission path structure of the embodiments;

FIGS. 13C1 to 13C3 are diagrams for explaining a third example of the wireless transmission path structure of the embodiments;

DETAILED DESCRIPTION OF THE PREFERRED EMBODIMENTS

Figure 2A:
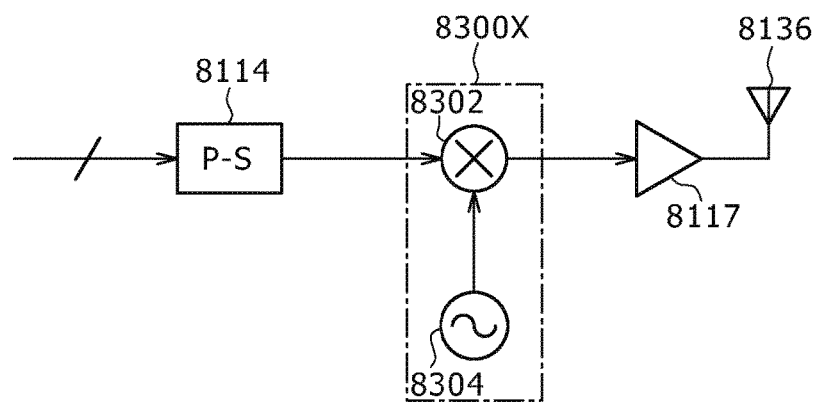
FIGS. 2A and 2B are diagrams for explaining a comparative example of a modulation functional unit and a demodulation functional unit in a communication processing system.

Embodiments of the present invention will be described in detail below with reference to the drawings.

The description will be made in the following order.
1. Communication Processing System: Basis
2. Modulation and Demodulation: Comparative Example
3. Modulation and Demodulation: Basis (Use of Injection Locking System)
4. Relationship between Phase of Reference Carrier Signal and Demodulation Processing
5. Injection Locking System: First Embodiment
6. Injection Locking System: Second Embodiment
7. Configuration Example of Oscillator Circuit
8. Relationship between Multi-channel Transmission and Injection Locking
9. Transmission Path Structure (for Transmission in Housing and between Mounted/Loaded Pieces of Apparatus)
10. System Configuration: First Application Example (Single Channel)
11. System Configuration: Second Application Example (Broadcast Communication)
12. System Configuration: Third Application Example (Frequency Division Multiplexing: Two Channels)
13. System Configuration: Fourth Application Example (Frequency Division Multiplexing: Full-duplex Bidirectional Communication)

<Communication Processing System: Basis>

FIGS. 1A to 1B3 are diagrams for explaining a wireless transmission system according to the embodiments of the present invention. Specifically, FIG. 1A is a diagram for explaining the signal interface of a wireless transmission system 1 in terms of the functional configuration. FIGS. 1B1 to 1B3 are diagrams for explaining signal multiplexing in the wireless transmission system 1.

In the following description, a carrier frequency in the millimeter wave band is employed as the carrier frequency used in the wireless transmission system of the embodiments. However, the mechanism of the embodiments can be used not only for a carrier frequency in the millimeter wave band but also for e.g. the sub-millimeter wave band, which corresponds to shorter wavelengths. The wireless transmission system of the embodiments is used in e.g. a digital recording/reproduction device, a terrestrial television receiving device, a cellular phone device, a game machine, and a computer.

[Functional Configuration]

As shown in FIG. 1A, the wireless transmission system 1 is so configured that a first communication device 100 as one example of first wireless apparatus and a second communication device 200 as one example of second wireless apparatus are coupled to each other via a millimeter-wave signal transmission path 9 and perform signal transmission in the millimeter wave band. The millimeter-wave signal transmission path 9 is one example of the wireless signal transmission path. The signal as the transmission subject is frequency-converted to the millimeter wave band, which is suitable for wide band transmission, and then transmitted.

The wireless transmission device (system) is constructed by a first communication unit (first millimeter wave transmitting device) and a second communication unit (second millimeter wave transmitting device). Between the first communication unit and the second communication unit disposed at a comparatively-short distance, a millimeter-wave signal is transmitted via the millimeter-wave signal transmission path after the transmission-subject signal is converted to this millimeter-wave signal. The "wireless transmission" in the embodiments means that the transmission-subject signal is transmitted not by a general electrical line (simple wire line) but by wireless transmission (in this example, by millimeter waves).

The "comparatively-short distance" refers to a distance shorter than the distance between communication devices in an open-air area (outdoor area) used in broadcasting and general wireless communication, and may be any distance as long as it has such a length that the transmission range can be substantially specified as a closed space. The "closed space" refers to a space in such a state that the leakage of electrical waves from the inside of the space to the outside is small and the arrival (entry) of electrical waves from the outside into the inside of the space is also small. Typically, the "closed space" is in such a state that the whole of the space is surrounded by a housing (case) having an effect to blocking electrical waves.

Examples of communication in such a state include communication between boards in the housing of one piece of electronic apparatus and communication between chips on the same board, and communication between electronic pieces of electronic apparatus in the state in which plural pieces of electronic apparatus are integrated, such as the state in which one piece of electronic apparatus is mounted on the other piece of electronic apparatus.

A typical example of the "integrated" state is the state in which both pieces of electronic apparatus are brought into complete contact with each other by the mounting. However, the "integrated" state is not limited thereto as long as it is such a state that the transmission range between both pieces of electronic apparatus can be substantially specified as the closed space as described above. The "integrated" state encompasses also the case in which both pieces of electronic apparatus are disposed at given positions separately from each other somewhat (by the comparatively-short distance: e.g. within several centimeters to ten and several centimeters) and can be regarded as being "substantially" integrated. That is, the communication state may be any state as long as the leakage of electrical waves from the inside of the space that is formed by both pieces of electronic apparatus and allows propagation of electrical waves therethrough to the outside is small and the arrival (entry) of electrical waves from the outside into the inside of the space is also small.

Hereinafter, signal transmission in the housing of one piece of electronic apparatus will be referred to as the in-housing signal transmission, and signal transmission in the state in which plural pieces of electronic apparatus are integrated (hereinafter, "integrated" encompasses also "substantially integrated") will be referred to as the inter-apparatus signal transmission. In the case of the in-housing signal transmission, the wireless transmission system of the embodiments in which the communication device (communication unit: transmitting unit) on the transmission side and the communication device (communication unit: receiving unit) on the reception side are housed in the same housing and a wireless signal transmission path is formed between the communication units (transmitting unit and receiving unit) serves as electronic apparatus itself. In the case of the inter-apparatus signal transmission, the communication device (communication unit: transmitting unit) on the transmission side and the communication device (communication unit: receiving unit) on the reception side are housed in the housings of different pieces of electronic apparatus, and a wireless signal transmission path is formed between the communication units (transmitting unit and receiving unit) in both pieces of electronic apparatus and the wireless transmission system of the embodiments is constructed when both pieces of electronic apparatus are disposed at given positions to be integrated.

In the communication devices that are so provided as to sandwich the millimeter-wave signal transmission path, a pair of transmitting unit and receiving unit are disposed in combination. The signal transmission between one communication device and the other communication device may be either unidirectional (single-directional) transmission or bidirectional transmission. For example, when a first communication unit serves as the transmission side and a second communication unit serves as the reception side, the transmitting unit is disposed as the first communication unit and the receiving unit is disposed as the second communication unit. When the second communication unit serves as the transmission side and the first communication unit serves as the reception side, the transmitting unit is disposed as the second communication unit and the receiving unit is disposed as the first communication unit.

The transmitting unit includes e.g. a transmission-side signal generating unit that performs signal processing for the transmission-subject signal to generate a millimeter-wave signal (signal converter that converts the electrical signal as the transmission subject to the millimeter-wave signal) and a transmission-side signal coupler that couples the millimeter-wave signal generated by the transmission-side signal generating unit to a transmission path (millimeter-wave signal transmission path) that transmits the millimeter-wave signal. It is preferable that the transmission-side signal generating unit be integrated with a functional unit that generates the transmission-subject signal.

For example, the transmission-side signal generating unit has a modulator circuit and the modulator circuit modulates the transmission-subject signal. The transmission-side signal generating unit carries out frequency conversion of the signal resulting from the modulation by the modulator circuit to generate the millimeter-wave signal. In principle, it would also be possible to directly convert the transmission-subject signal to the millimeter-wave signal. The transmission-side signal coupler supplies the millimeter-wave signal generated by the transmission-side signal generating unit to the millimeter-wave signal transmission path.

The receiving unit includes e.g. a reception-side signal coupler that receives the millimeter-wave signal transmitted through the millimeter-wave signal transmission path and a reception-side signal generating unit that performs signal processing for the millimeter-wave signal (input signal)

received by the reception-side signal coupler to generate a normal electrical signal (transmission-subject signal) (signal converter that converts the millimeter-wave signal to the electrical signal as the transmission subject). It is preferable that the reception-side signal generating unit be integrated with a functional unit that receives the transmission-subject signal. For example, the reception-side signal generating unit has a demodulator circuit. The reception-side signal generating unit carries out frequency conversion of the millimeter-wave signal to generate an output signal, and thereafter the demodulator circuit demodulates the output signal to generate the transmission-subject signal. In principle, it would also be possible to directly convert the millimeter-wave signal to the transmission-subject signal.

That is, in making the signal interface, transmission is performed by a contact-less, cable-less system (this transmission is not transmission by electrical lines) by the millimeter-wave signal regarding the transmission-subject signal. It is preferable that transmission be performed by the millimeter-wave signal regarding at least signal transmission (particularly, video signal, high-speed clock signal, and so forth for which high-speed transmission and large-size transmission are required). In its essential, the signal transmission that is traditionally performed by electrical lines is performed by the millimeter-wave signal in the embodiments. Performing signal transmission in the millimeter wave band makes it possible to realize Gbps-order high-speed signal transmission. In addition, the range of the millimeter-wave signal can be easily limited, and effects attributed to this property are also achieved.

The respective signal couplers may be any unit as long as they allow the first communication unit and the second communication unit to transmit the millimeter-wave signal via the millimeter-wave signal transmission path. For example, they may be a unit having an antenna structure (antenna coupler) or may be a unit that allows the coupling without having an antenna structure.

The "millimeter-wave signal transmission path that transmits the millimeter-wave signal" may be the air (so-called free space). However, it is preferable that it be one having a structure that transmits the millimeter-wave signal while confining the millimeter-wave signal in the transmission path. By aggressively utilizing this property, the route of the millimeter-wave signal transmission path can be arbitrarily settled as with the electrical line for example.

A typical example of the transmission path having such a structure will be a so-called waveguide tube. However, the transmission path is not limited thereto. For example, a transmission path formed by using a dielectric material capable of transmitting the millimeter-wave signal (it will be referred to as the dielectric transmission path and the millimeter wave in-dielectric transmission path) is preferable, and a hollow waveguide path obtained by forming a transmission path and providing a blocking material that suppresses external radiation of the millimeter-wave signal and has a hollow inside in such a manner as to surround the transmission path is preferable. Allowing the dielectric material and the blocking material to have flexibility permits routing of the millimeter-wave signal transmission path.

If the transmission path is the air (so-called free space), each signal coupler has an antenna structure and the signal is transmitted in the space of a short distance by this antenna structure. If a transmission path composed of a dielectric material is employed, it is not essential for each signal coupler to have an antenna structure although it may have the antenna structure.

The mechanism of the wireless transmission system 1 of the embodiments will be specifically described below. An example in which each functional unit is formed in a semiconductor integrated circuit (chip) is employed as the most preferable example for the following description. However, employing this example is not essential.

A semiconductor chip 103 capable of millimeter wave band communication is provided in the first communication device 100, and a semiconductor chip 203 capable of millimeter wave band communication is provided in the second communication device 200.

In the embodiments, only the signal for which high-speed transmission and large-size transmission are required is treated as the signal as the subject of communication in the millimeter wave band, whereas other signals for which low-speed, small-size transmission is enough and the signal that can be regarded as a DC signal, such as a power supply signal, are not treated as the subject of conversion to the millimeter-wave signal. For these signals (including the power supply signal) that are not treated as the subject of conversion to the millimeter-wave signal, signal connection between the boards is made by a mechanism similar to that of the existing technique. The original electrical signals as the transmission subject before conversion to the millimeter-wave signal will be referred to collectively as the baseband signal.

[First Communication Device]

In the first communication device 100, the semiconductor chip 103 capable of millimeter wave band communication and a transmission path coupler 108 are mounted on a board 102. The semiconductor chip 103 is a system LSI (large scale integrated) circuit obtained by integrating an LSI functional unit 104 with a signal generating unit 107 (millimeter-wave signal generating unit). It is also possible to employ a configuration in which the LSI functional unit 104 and the signal generating unit 107 are not integrated, although not shown in the drawing. However, if they are separate units, a problem attributed to signal transmission between them by electrical lines would possibly occur. Thus, it is preferable that they be integrally fabricated. If they are fabricated as separate units, it is preferable to decrease the adverse effect by disposing two chips (LSI functional unit 104 and signal generating unit 107) at a short distance and providing a wire line whose wire bonding length is as short as possible between the chips.

The signal generating unit 107 and the transmission path coupler 108 are so configured as to have data bidirectionality. For this purpose, a transmission-side signal generating unit and a reception-side signal generating unit are provided in the signal generating unit 107. The transmission path coupler 108 is used for both of transmission and reception in this configuration although different couplers may be provided on the transmission side and the reception side.

The "bidirectional communication" shown here is single-fiber bidirectional transmission in which the number of millimeter-wave signal transmission paths 9 serving as the transmission channel of millimeter waves is one (single fiber). For realization of this transmission, a half-duplex system to which time division multiplexing (TDM) is applied, frequency division multiplexing (FDM, see FIGS. 1B1 to 1B3), or another system is employed.

In the case of the time division multiplexing, transmission and reception are separated in a time division manner, and thus "simultaneity of bidirectional communication (single-fiber simultaneous bidirectional transmission)," i.e. simultaneously performing signal transmission from the first communication device 100 to the second communication device 200 and signal transmission from the second communication device 200 to the first communication device 100, is not realized. The single-fiber simultaneous bidirectional transmission is realized by the frequency division multiplexing. However, in the frequency division multiplexing, different frequencies are used for transmission and reception as shown in FIG. 1B1 and therefore the transmission band width of the millimeter-wave signal transmission path 9 needs to be widened.

Instead of mounting the semiconductor chip 103 directly on the board 102, a semiconductor package obtained by mounting the semiconductor chip 103 on an interposer substrate and molding the semiconductor chip 103 by resin (e.g. epoxy resin) may be mounted on the board 102. That is, the interposer substrate serves as the substrate for chip mounting, and the semiconductor chip 103 is provided on the interposer substrate. As the interposer substrate, a sheet member that has a relative dielectric constant in a certain range (about 2 to 10) and is obtained by combining e.g. thermally-strengthened resin and copper foil can be used.

The semiconductor chip 103 is connected to the transmission path coupler 108. For the transmission path coupler 108, e.g. an antenna structure including an antenna coupler, an antenna terminal, a microstrip line, an antenna, etc. is employed. It is also possible to incorporate also the transmission path coupler 108 in the semiconductor chip 103 by using a technique of directly forming an antenna in the chip.

The LSI functional unit 104 is responsible for major application control of the first communication device 100, and includes e.g. a circuit for processing various kinds of signals desired to be transmitted to the counterpart and a circuit for processing various signals received from the counterpart.

The signal generating unit 107 (electrical signal converter) converts a signal from the LSI functional unit 104 to a millimeter-wave signal and controls signal transmission via the millimeter-wave signal transmission path 9.

Specifically, the signal generating unit 107 has a transmission-side signal generating unit 110 and a reception-side signal generating unit 120. A transmitting unit (transmission-side communication unit) is formed by the transmission-side signal generating unit 110 and the transmission path coupler 108. A receiving unit (reception-side communication unit) is formed by the reception-side signal generating unit 120 and the transmission path coupler 108.

The transmission-side signal generating unit 110 has a multiplexing processor 113, a parallel-serial converter 114, a modulator 115, a frequency converter 116, and an amplifier 117 in order to perform signal processing for an input signal to generate the millimeter-wave signal. The modulator 115 and the frequency converter 116 may be integrated into a unit based on a so-called direct conversion system.

The reception-side signal generating unit 120 has an amplifier 124, a frequency converter 125, a demodulator 126, a serial-parallel converter 127, and a demultiplexing processor 128 in order to perform signal processing for the millimeter-wave electrical signal received by the transmission path coupler 108 to generate an output signal. The frequency converter 125 and the demodulator 126 may be integrated into a unit based on a so-called direct conversion system.

If the embodiments are not applied, the parallel-serial converter 114 and the serial-parallel converter 127 are provided for apparatus based on a parallel interface using plural signals for parallel transmission but are unnecessary for apparatus based on a serial interface.

If the signals from the LSI functional unit 104 include plural kinds of signals (defined as N1) as the subject of communication in the millimeter wave band, the multiplexing processor 113 performs multiplexing processing such as time division multiplexing, frequency division multiplexing, or code division multiplexing to thereby put together the plural kinds of signals into a signal on one channel. For example, the multiplexing processor 113 puts together plural kinds of signals for which high-speed transmission and large-size transmission are required into a signal on one channel as the subject of transmission by millimeter waves.

In the case of the time division multiplexing and the code division multiplexing, the multiplexing processor 113 is provided at the previous stage of the parallel-serial converter 114, and puts together plural kinds of signals into a signal on one channel to supply the signal to the parallel-serial converter 114. In the case of the time division multiplexing, a changeover switch is provided for supplying plural kinds of signals _@ (@ denotes 1 to N) to the parallel-serial converter 114 in such a way that the time is minutely separated for the plural kinds of signals @.

In the case of the frequency division multiplexing, millimeter-wave signals need to be generated by modulating signals by different carrier frequencies to convert the signals to frequencies in the range of frequency bands F_@ different from each other, and these millimeter-wave signals obtained by using the respective different carrier frequencies need to be transmitted in the same direction or the opposite direction. For this purpose, for example if the millimeter-wave signals are transmitted in the same direction as shown in FIG. 1B2, the parallel-serial converter 114, the modulator 115, the frequency converter 116, and the amplifier 117 are provided for each of the plural kinds of signals _@, and an addition processor is provided as the multiplexing processor 113 at the subsequent stage of each amplifier 117. Furthermore, the millimeter-wave electrical signal in the frequency bands F_1+ . . . +F_N resulting from the frequency multiplexing processing is supplied to the transmission path coupler 108. A so-called combiner is used as the addition processor if the millimeter-wave signals obtained by using the respective different carrier frequencies are transmitted in the same direction as shown in FIG. 1B2.

As is apparent from FIG. 1B2, the transmission band width needs to be widened in the frequency division multiplexing, by which signals on plural channels are put together into a signal on one channel. As shown in FIG. 1B3, the transmission band width needs to be further widened in the case of using both of the scheme of putting together signals on plural channels into a signal on one channel by the frequency division multiplexing and the full-duplex system, in which different frequencies are used for transmission and reception.

The parallel-serial converter 114 converts a parallel signal to a serial data signal and supplies the serial data signal to the modulator 115. The modulator 115 modulates the transmission-subject signal and supplies the resulting signal to the frequency converter 116. The modulator 115 may be any unit as long as it modulates at least one of amplitude, frequency, and phase by the transmission-subject signal, and a system of any combination of these factors can also be employed.

Examples of the analog modulation system include amplitude modulation (AM) and vector modulation. The vector modulation includes frequency modulation (FM) and phase modulation (PM). Examples of the digital modulation system include amplitude shift keying (ASK), frequency shift keying (FSK), phase shift keying (PSK), and amplitude phase shift keying (APSK), in which the amplitude and phase are modulated. A representative example of the APSK is quadrature amplitude modulation (QAM).

The frequency converter 116 carries out frequency conversion of the transmission-subject signal resulting from the modulation by the modulator 115 to generate a millimeter-wave electrical signal and supply the millimeter-wave electrical signal to the amplifier 117. The millimeter-wave electrical signal refers to an electrical signal having a certain frequency in the range of about 30 GHz to 300 GHz. The addition of the word "about" is based on the fact that the frequency may be any as long as it is such a frequency that the effects by the millimeter wave communication are obtained and the lower limit and upper limit of the frequency are not limited to 30 GHz and 300 GHz, respectively.

The frequency converter 116 can employ various circuit configurations. For example, it can employ a configuration including a frequency mixing circuit (mixer circuit) and a local oscillator circuit. The local oscillator circuit generates a carrier (carrier signal, reference carrier) used for modulation. The frequency mixing circuit multiplies (modulates) the carrier in the millimeter wave band generated by the local oscillator circuit by the signal from the parallel-serial converter 114 to generate a modulated signal in the millimeter wave band and supply the modulated signal to the amplifier 117.

The amplifier 117 amplifies the millimeter-wave electrical signal resulting from the frequency conversion and supplies the amplified signal to the transmission path coupler 108. The amplifier 117 is connected to the bidirectional transmission path coupler 108 via an antenna terminal (not shown).

The transmission path coupler 108 transmits the millimeter-wave signal generated by the transmission-side signal generating unit 110 to the millimeter-wave signal transmission path 9, and receives a millimeter-wave signal from the millimeter-wave signal transmission path 9 to output it to the reception-side signal generating unit 120.

The transmission path coupler 108 is formed of an antenna coupler. The antenna coupler serves as one example of the transmission path coupler 108 (signal coupler) or part of the transmission path coupler 108. The antenna coupler refers to a part that couples an electronic circuit in the semiconductor chip and an antenna disposed inside or outside the chip in the narrow sense, and refers to a part for signal coupling between the semiconductor chip and the millimeter-wave signal transmission path 9 in the broad sense. For example, the antenna coupler includes at least an antenna structure. In the case of performing transmission and reception by time division multiplexing, the transmission path coupler 108 is provided with an antenna changeover part (antenna sharing part).

The antenna structure refers to the structure in the coupler with the millimeter-wave signal transmission path 9. The antenna structure does not mean only an antenna itself but may be any as long as it couples an electrical signal in the millimeter wave band to the millimeter-wave signal transmission path 9. For example, the antenna structure includes an antenna terminal, a microstrip line, and an antenna. If the antenna changeover part is formed in the same chip, the antenna terminal and the microstrip line as the parts other than the antenna changeover part serve as the transmission path coupler 108.

The transmission-side antenna radiates electromagnetic waves based on a millimeter-wave signal to the millimeter-wave signal transmission path 9. The reception-side antenna receives electromagnetic waves based on a millimeter-wave signal from the millimeter-wave signal transmission path 9. The microstrip line interconnects the antenna terminal and the antenna. The microstrip line transmits a transmission-side millimeter-wave signal from the antenna terminal to the antenna and transmits a reception-side millimeter-wave signal from the antenna to the antenna terminal.

The antenna changeover part is used when the antenna is shared in transmission and reception. For example, in transmission of a millimeter-wave signal to the second communication device 200 as the counterpart, the antenna changeover part connects the antenna to the transmission-side signal generating unit 110. In reception of a millimeter-wave signal from the second communication device 200 as the counterpart, the antenna changeover part connects the antenna to the reception-side signal generating unit 120. The antenna changeover part is provided on the board 102 separately from the semiconductor chip 103. However, the antenna changeover part is not limited thereto but may be provided in the semiconductor chip 103. The antenna changeover part can be omitted if the antennas for transmission and reception are separately provided.

The millimeter-wave signal transmission path 9, which serves as a propagation path for millimeter waves, may have such a configuration as to propagate millimeter waves through a space in a housing as a free-space transmission path for example. Furthermore, it is preferable that the millimeter-wave signal transmission path 9 be formed of a waveguide structure such as a waveguide tube, a transmission line, a dielectric line, or a component in a dielectric and have such a characteristic as to efficiently transmit electromagnetic waves in the millimeter wave band. For example, it is preferable that the millimeter-wave signal transmission path 9 be formed as a dielectric transmission path 9A containing a dielectric material having a relative dielectric constant in a certain range and a dielectric loss tangent in a certain range. For example, by filling the whole of the inside of the housing with a dielectric material, not a free-space transmission path but the dielectric transmission path 9A is disposed between the transmission path coupler 108 and the transmission path coupler 208. In addition, it would also be possible to form the dielectric transmission path 9A by interconnecting the antenna of the transmission path coupler 108 and the antenna of the transmission path coupler 208 by a dielectric line that is a linear member composed of a dielectric material and having a certain line diameter.

The "certain range" may include arbitrary predetermined values as long as the relative dielectric constant and dielectric loss tangent of the dielectric material in this range are such that the effects of the embodiments are achieved. That is, the dielectric material may be any material as long as it has such characteristics that the effects of the embodiments are achieved and can transmit millimeter waves. One example of the values of the characteristics of the dielectric material is as follows although the values can not necessarily be defined definitely because the values can not be decided depending only on the dielectric material but have relation also to the transmission path length and the frequency of the millimeter waves.

To transmit a millimeter-wave signal in the dielectric transmission path 9A at high speed, it is preferable that the relative dielectric constant of the dielectric material be set to about 2 to 10 (preferably 3 to 6) and the dielectric loss tangent thereof be set to 0.00001 to 0.01 (preferably 0.00001 to 0.001). As the dielectric material satisfying such conditions, a material composed of e.g. an acrylic resin, an urethane resin, an epoxy resin, a silicone resin, a polyimide resin, a cyanoacrylate resin, or a liquid crystal polymer can be used.

Such ranges of the relative dielectric constant and the dielectric loss tangent of the dielectric material are similar to those in the embodiments unless a particular note is made. As the millimeter-wave signal transmission path 9 having such a configuration as to confine a millimeter-wave signal in the transmission path, a hollow waveguide path in which the transmission path is surrounded by a blocking material and the inside thereof is hollow may be employed instead of the dielectric transmission path 9A.

The reception-side signal generating unit 120 is connected to the transmission path coupler 108. The reception-side amplifier 124 is connected to the transmission path coupler 108, and amplifies a millimeter-wave electrical signal received by the antenna to supply the amplified signal to the frequency converter 125. The frequency converter 125 carries out frequency conversion of the millimeter-wave electrical signal resulting from the amplification and supplies the signal resulting from the frequency conversion to the demodulator 126. The demodulator 126 demodulates the signal resulting from the frequency conversion to acquire a baseband signal and supply it to the serial-parallel converter 127.

The serial-parallel converter 127 converts the serial received data to parallel output data and supplies it to the demultiplexing processor 128.

The demultiplexing processor 128 corresponds to the multiplexing processor 113 and separates the signal put together onto one channel into plural kinds of signals _@ (@ denotes 1 to N). For example, the demultiplexing processor 128 separates plural data signals put together into a signal on one channel into the respective separate signals and supplies the signals to the LSI functional unit 104.

If signals are put together into a signal on one channel by frequency division multiplexing, it is necessary to receive a millimeter-wave electrical signal in the frequency bands F_1+ . . . +F_N resulting from the frequency division multiplexing processing to separate the signal into the respective separate signals and transmit the signals in the same direction to process the signals for each of the frequency bands F_@. For this purpose, as shown in FIG. 1B2, the amplifier 224, the frequency converter 225, the demodulator 226, and the serial-parallel converter 227 are provided for each of the plural kinds of signals _@ and a frequency separator is provided as the demultiplexing processor 128 at the previous stage of each amplifier 224. Furthermore, the millimeter-wave electrical signals in the respective frequency bands F_@ resulting from the separation are supplied to the channels of the corresponding frequency bands F_@. A so-called splitter is used as the frequency separator if a signal obtained by multiplexing of millimeter-wave signals of the respective different carrier frequencies is separated into the respective separate signals as shown in FIG. 1B2.

The use form of the frequency division multiplexing system shown in FIG. 1B2 is for a system in which plural sets of transmitting unit and receiving unit are used and signals are transmitted in the same direction in such a way that the respective sets use different carrier frequencies. However, the use form of the frequency division multiplexing system is not limited thereto. For example, it is also possible to perform full-duplex bidirectional communication in which, in FIG. 1A, a set of the transmission-side signal generating unit 110 in the first communication device 100 and a reception-side signal generating unit 220 in the second communication device 200 uses a first carrier frequency and a set of the reception-side signal generating unit 120 in the first communication device 100 and a transmission-side signal generating unit 210 in the second communication device 200 uses a second carrier frequency and the respective sets simultaneously perform signal transmission in directions opposite to each other. In this case, a so-called circulator allowing simultaneous signal transmission to both devices is used as the antenna changeover parts for the transmission path couplers 108 and 208 in FIG. 1A.

It is also possible to employ a form in which a larger number of sets of transmitting unit and receiving unit are used and the respective sets use carrier frequencies different from each other and the same direction and the opposite direction are combined. In this case, a configuration can be employed in which, in FIG. 1B2, circulators are used for the transmission path couplers 108 and 208 and the multiplexing processors 113 and 213 and the demultiplexing processors 128 and 228 are used.

If the semiconductor chip 103 is thus configured, the number of signals as the subject of conversion to millimeter waves is reduced by carrying out parallel-serial conversion of an input signal to transmit the signal to the semiconductor chip 203 and carrying out serial-parallel conversion of a received signal from the semiconductor chip 203.

If the original signal transmission between the first communication device 100 and the second communication device 200 is based on a serial format, the parallel-serial converter 114 and the serial-parallel converter 127 do not have to be provided.

[Second Communication Device]

The second communication device 200 substantially has a functional configuration similar to that of the first communication device 100. The respective functional units therein are given reference numerals whose hundreds digit is two. Furthermore, the functional unit that is the same/similar as/to the functional unit in the first communication device 100 is given a reference numeral having the same tens digit and ones digit as those of the functional unit in the first communication device 100. A transmitting unit is formed by the transmission-side signal generating unit 210 and the transmission path coupler 208, and a receiving unit is formed by the reception-side signal generating unit 220 and the transmission path coupler 208.

An LSI functional unit 204 is responsible for major application control of the second communication device 200, and includes e.g. a circuit for processing various kinds of signals desired to be transmitted to the counterpart and a circuit for processing various signals received from the counterpart.

[Connection and Operation]

The technique of carrying out frequency conversion of an input signal and then performing signal transmission is generally used in broadcasting and wireless communication. For these use purposes, transmitter, receiver, and so forth that can address e.g. the following issues and thus are comparatively complicated are used: α) how far the communication can be carried out (issue of S/N against thermal noise), β) how to address reflection and multipath, and γ) how to suppress obstruction and interference with another channel. In contrast, the signal generating units 107 and 207 used in the embodiments are used with the millimeter wave band, which is a frequency band of frequencies higher than those used by the complicated transmitter, receiver, and so forth generally used in broadcasting and wireless communication, and thus the wavelength A is shorter. Therefore, units that allow easy reuse of the frequencies and are suitable for communication among a large number of devices in the near field are used as the signal generating units 107 and 207.

The embodiments can flexibly address requirements for high-speed transmission and large-size transmission by performing signal transmission in the millimeter wave band as described above, differently from the existing signal interface employing electrical lines. For example, only the signals for which high-speed transmission and large-size transmission are required are regarded as the subject of communication in the millimeter wave band. Furthermore, depending on the system configuration, the communication devices 100 and 200 partially include the traditional electrical line interface (connection by terminals and connectors) for low-speed, small-size signals and power supply.

The signal generating unit 107 performs signal processing for an input signal from the LSI functional unit 104 to generate a millimeter-wave signal. The signal generating unit 107 is connected to the transmission path coupler 108 by a transmission line such as a microstrip line, a strip line, a coplanar line, or a slot line, and the generated millimeter-wave signal is supplied to the millimeter-wave signal transmission path 9 via the transmission path coupler 108.

The transmission path coupler 108 has an antenna structure and has functions to convert the transmitted millimeter-wave signal to electromagnetic waves and send out the electromagnetic waves. The transmission path coupler 108 is coupled to the millimeter-wave signal transmission path 9, and the electromagnetic waves resulting from the conversion by the transmission path coupler 108 are supplied to one end of the millimeter-wave signal transmission path 9. The other end of the millimeter-wave signal transmission path 9 is coupled to the transmission path coupler 208 of the second communication device 200. By providing the millimeter-wave signal transmission path 9 between the transmission path coupler 108 of the first communication device 100 and the transmission path coupler 208 of the second communication device 200, electromagnetic waves in the millimeter wave band are propagated in the millimeter-wave signal transmission path 9.

To the millimeter-wave signal transmission path 9, the transmission path coupler 208 of the second communication device 200 is coupled. The transmission path coupler 208 receives the electromagnetic waves transmitted to the other end of the millimeter-wave signal transmission path 9 and converts the electromagnetic waves to a millimeter-wave signal to supply it to the signal generating unit 207 (baseband signal generating unit). The signal generating unit 207 performs signal processing for the converted millimeter-wave signal to generate an output signal (baseband signal) and supply it to the LSI functional unit 204.

Although the above description relates to signal transmission from the first communication device 100 to the second communication device 200, the same way of thinking applies also to transmission of a signal from the LSI functional unit 204 in the second communication device 200 to the first communication device 100, and millimeter-wave signals can be transmitted bidirectionally.

A signal transmission system in which signal transmission is performed via an electrical line has the following problems.

i) Although large-size, high-speed transmission of transmission data is required, there is a limit to the transmission speed and transmission capacity of the electrical line.

ii) It would be possible to increase the number of lines and parallelize the signal transmission to thereby decrease the transmission speed per one signal line in order to address the problems in increasing the transmission speed of transmission data. However, this countermeasure leads to increase in the number of input/output terminals. As a result, increase in the complexity of the printed board and cable lines, increase in the physical size of the connector parts and electrical interface, and so forth are required. Thus, the shapes of these components become more complicated and the reliability of these components is lowered, so that problems of cost increase and so forth occur.

iii) As the band of the baseband signal becomes wider along with significant increase in the data size of cinema video, computer images, etc., the problem of electromagnetic compatibility (EMC) becomes more obvious. For example, if an electrical line is used, the line works as an antenna and interference on a signal corresponding to the tuned frequency of the antenna occurs. Furthermore, reflection and resonance attributed to a mismatch of the impedance of the line and so forth also cause unnecessary radiation. If resonance and reflection are present, they are readily accompanied by radiation, and the problem of electromagnetic inductive interference (EMI) also becomes serious. To address these problems, the configuration of the electronic apparatus becomes more complicated.

iv) If reflection exists, besides EMC and EMI, a transmission error due to interference between symbols and a transmission error due to the intrusion of obstruction also become problems on the reception side.

In contrast, the wireless transmission system 1 of the embodiments performs signal transmission not by an electrical line but by millimeter waves. A signal from the LSI functional unit 104 toward the LSI functional unit 204 is converted to a millimeter-wave signal, and the millimeter-wave signal is transmitted between the transmission path couplers 108 and 208 via the millimeter-wave signal transmission path 9.

Because of the wireless transmission, there is no need to pay attention to the line shape and the position of the connector, and thus many restrictions on the layout do not arise. The signal for which signal transmission is replaced by transmission by millimeter waves has a short wavelength, and the range of the wavelength is also limited. Thus, the problems of EMC and EMI can be easily solved. In general, another functional unit using a frequency in the millimeter wave band does not exist inside the communication devices 100 and 200, and therefore countermeasures against EMC and EMI can be easily realized.

The following advantages are achieved because the signal transmission in the embodiments is wireless transmission in the state in which the first communication device 100 and the second communication device 200 are brought close to each other, and is signal transmission between fixed positions and with a known positional relationship.

1) It is easy to properly design the propagation channel (waveguide structure) between the transmission side and the reception side.

2) By designing the dielectric structure of the transmission path coupler sealing the transmission side and the reception side in conjunction with the propagation channel (waveguide structure of the millimeter-wave signal transmission path 9), favorable transmission having higher reliability compared with free-space transmission is enabled.

3) The control of the controller (in the present example, the LSI functional unit 104) for managing the wireless transmission also does not need to be frequently carried out dynamically and adaptively differently from general wireless communication. Thus, the overhead due to the control can be reduced compared with general wireless communication. As a result, size reduction, power consumption decrease, and speed increase are permitted.

4) If the wireless transmission environment is calibrated at the time of manufacturing or designing and individual variation and so forth is grasped, higher-quality communication is permitted through transmission with reference to the data of the individual variation.

5) Even if reflection exists, the influence thereof can be easily removed on the reception side by using a small equalizer because the reflection is fixed reflection. The setting of the equalizer is also permitted by presetting and static control, and the realization of the equalizer is easy.

Furthermore, the following advantages are achieved because the signal transmission in the embodiments is based on wireless communication in the band of millimeter waves, which have short wavelengths.

a) A wide communication band can be ensured in the millimeter wave communication, and therefore a high data rate can be easily achieved.

b) The frequency used for the transmission can be separated from the frequencies of processing for other baseband signals, and thus the interference between the frequencies of millimeter waves and the baseband signals hardly occurs.

c) Because millimeter waves have short wavelengths, the size of the antenna and the waveguide structure, which are defined depending on the wavelength, can be reduced. In addition, electromagnetic shielding can be easily made because the distance attenuation is large and diffraction is small.

d) In wireless communication in a normal open-air area, strict restrictions on the stability of the carrier exist in order to prevent interference and so forth. To realize such a carrier having high stability, external frequency basic parts having high stability, a multiplier circuit, a PLL (phase locked loop circuit), and so forth are used, so that the circuit scale becomes larger. However, in the case of millimeter waves (particularly when signal transmission between fixed positions and with a known positional relationship is also used), the millimeter waves can be easily blocked and prevented from leaking to the outside. Thus, a carrier having low stability can be used in the transmission, and therefore increase in the circuit scale can be suppressed. It is preferable to employ an injection locking system (details thereof will be described later) in order for the reception side to demodulate the signal transmitted by a carrier with relaxed stability by small circuitry.

A system in which communication is carried out in the millimeter wave band is exemplified as one example of the wireless transmission system for the embodiments. However, the application range thereof is not limited to a system in which communication is carried out in the millimeter wave band. Centimeter waves (preferably waves close to millimeter waves), whose wavelengths are longer than those of millimeter waves, may be used or conversely sub-millimeter waves (preferably waves close to millimeter waves), whose wavelengths are shorter than those of millimeter waves, may be used. However, it would be most effective to use the millimeter wave band in terms of employing the injection locking system in in-housing signal transmission and inter-apparatus signal transmission and forming the whole of the oscillator circuit including a tank circuit on a CMOS chip.

Modulation and Demodulation: Comparative Example

Figure 2B:
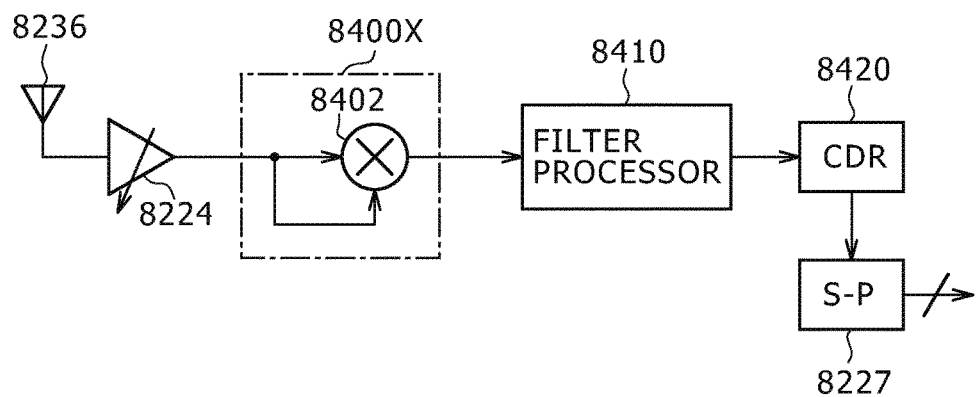

FIGS. 2A and 2B are diagrams for explaining a comparative example of a modulation functional unit and a demodulation functional unit in a communication processing system.

Modulation Functional Unit: Comparative Example

FIG. 2A shows the configuration of a modulation functional unit 8300X of the comparative example provided on the transmission side. A signal (e.g. 12-bit image signal) as the transmission subject is converted to a high-speed serial data sequence by a parallel-serial converter 8114 and supplied to the modulation functional unit 8300X.

The modulation functional unit 8300X can employ various circuit configurations depending on the modulation system. For example, if the modulation system is a system of modulating the amplitude and/or the phase, the modulation functional unit 8300X can employ a configuration including a frequency mixer 8302 and a transmission-side local oscillator 8304.

The transmission-side local oscillator 8304 (first carrier signal generating unit) generates a carrier signal (modulation carrier signal) used for modulation. The frequency mixer 8302 (first frequency converter) multiplies (modulates) the carrier in the millimeter wave band generated by the transmission-side local oscillator 8304 by the signal from the parallel-serial converter 8114 (corresponding to the parallel-serial converter 114), to generate a modulated signal in the millimeter wave band and supply it to an amplifier 8117 (corresponding to the amplifier 117). The modulated signal is amplified by the amplifier 8117 and radiated from an antenna 8136.

Demodulation Functional Unit: Comparative Example

FIG. 2B shows the configuration of a demodulation functional unit 8400X of the comparative example provided on the reception side. The demodulation functional unit 8400X can employ various circuit configurations within the range dependent on the modulation system of the transmission side. The following description is based on the assumption that a system in which the amplitude and/or the phase are modulated is employed so that consistency with the above description of the modulation functional unit 8300X can be ensured.

The demodulation functional unit 8400X of the comparative example includes a two-input frequency mixer 8402 (mixer circuit), and a squared detection circuit that obtains a detection output in proportion to the square of the amplitude of the received millimeter-wave signal (envelop thereof) is used. It would also be possible to use a simple envelop detection circuit having no square characteristic instead of the squared detection circuit. In the example shown in the diagram, a filter processor 8410, a clock reproducer 8420 (clock data recovery (CDR)), and a serial-parallel converter 8227 (S-P, corresponding to the serial-parallel converter 127) are provided at the subsequent stages of the frequency mixer 8402. In the filter processor 8410, e.g. a low-pass filter (LPF) is provided.

A millimeter-wave signal received by an antenna 8236 is input to a gain-variable amplifier 8224 (corresponding to the amplifier 224) to be subjected to amplitude adjustment, and then supplied to the demodulation functional unit 8400X.

The received signal resulting from the amplitude adjustment is simultaneously input to two input terminals of the frequency mixer 8402, so that a squared signal is generated to be supplied to the filter processor 8410. A high-frequency component is removed from the squared signal generated by the frequency mixer 8402 by the low-pass filter in the filter processor 8410. Thereby, the waveform of the input signal (baseband signal) sent from the transmission side is generated to be supplied to the clock reproducer 8420.

The clock reproducer 8420 (CDR) reproduces a sampling clock based on this baseband signal and samples the baseband signal by the reproduced sampling clock to thereby generate a received data sequence. The generated received data sequence is supplied to the serial-parallel converter 8227 (S-P), so that a parallel signal (e.g. 12-bit image signal) is reproduced. Various systems are available as the system of the clock reproduction. For example, a symbol synchronization system is employed.

Problems of Comparative Example

In the case of constructing a wireless transmission system by using the modulation functional unit 8300X and the demodulation functional unit 8400X of the comparative example, the following drawbacks exist.

First, the following drawback exists regarding the oscillator circuit. For example, multi-channel transmission needs to be considered in the open-air area (outdoor area) communication. In this case, the communication is affected by the frequency variation component of the carrier, and therefore requirement specifications of the stability of the carrier of the transmission side are strict. If using, in the transmission side and the reception side, a normal technique like that used in wireless communication in the outdoor area is attempted for data transmission by millimeter waves in in-housing signal transmission and inter-apparatus signal transmission, the carrier is required to have high stability, and a millimeter-wave oscillator circuit whose frequency stability is ppm (parts per million) order is necessary.

To realize a carrier signal having high frequency stability, it would be possible to realize the high-stability millimeter-wave oscillator circuit on a silicon integrated circuit (complementary metal-oxide semiconductor (CMOS)) for example. However, a silicon substrate used for a normal CMOS has a low insulating property. Therefore, a tank circuit having a high quality factor can not be easily formed, and therefore the realization is not easy. For example, if inductance is formed on a CMOS chip, the quality factor thereof is about 30 to 40, as shown in A. Niknejad, "mm-Wave Silicon Technology 60 GHz and Beyond" (particularly, 3.1.2 Inductors pp. 70 and 71), ISBN 978-0-387-76558-7 (hereinafter, reference document A).

Therefore, to realize the high-stability oscillator circuit, e.g. employing the following technique would be possible. Specifically, a tank circuit having a high quality factor is provided by using a quartz oscillator or the like outside the CMOS on which the major body part of the oscillator circuit is formed and the tank circuit is oscillated at a low frequency. In addition, this oscillation output is multiplied to be raised to a frequency in the millimeter wave band. However, it is not preferable to provide such an external tank in all of the chips in order to realize a function to replace signal transmission by lines, such as low voltage differential signaling (LVDS), by signal transmission by millimeter waves.

If a system of modulating the amplitude like on-off keying (OOK) is used, it is enough that envelop detection is carried out on the reception side. Thus, the oscillator circuit is unnecessary and the number of tank circuits can be reduced. However, if the signal transmission distance becomes longer, the reception amplitude becomes smaller. In the system of using a squared detection circuit as one example of the envelop detection, the influence of the decrease in the reception amplitude is significant and signal distortion becomes to affect the transmission. Thus, this system is disadvantageous. In other words, the squared detection circuit is disadvantageous in terms of the sensitivity.

As another technique for realizing a carrier signal whose frequency stability is high, it would be possible to use a frequency multiplier circuit, a PLL circuit, and so forth having high stability for example. However, this technique leads to increase in the circuit scale. For example, in a technique disclosed in "A 90 nm CMOS Low-Power 60 GHz Tranceiver with Integrated Baseband Circuitry," ISSCC 2009/SESSION 18/RANGING AND Gb/s COMMUNICATION/18.5, 2009 IEEE International Solid-State Circuits Conference, pp. 314 to 316 (hereinafter, reference document B), a 60-GHz divider is eliminated to reduce the power consumption by using a push-push oscillator circuit. However, even in this technique, 30-GHz oscillator circuit and divider, a phase frequency detection circuit (phase frequency detector (PFD)), an external reference (in this example, 117 MHz), and so forth are necessary. Therefore, it is obvious that the circuit scale is large.

Because the squared detection circuit can extract only the amplitude component from the received signal, the modulation system that can be used is limited to a system of modulating the amplitude (e.g. ASK such as OOK), and it is difficult to employ a system of modulating the phase or the frequency. The difficulty in employing the phase modulation system leads to a disadvantage that the data transmission rate can not be enhanced by rendering the modulated signal to be in quadrature.

Furthermore, in the case of realizing multi-channel transmission by the frequency division multiplexing system, the system of using the squared detection circuit has the following drawback. A band-pass filter for frequency selection on the reception side needs to be disposed at the previous stage of the squared detection circuit. However, it is not easy to realize a sharp band-pass filter having a small size. Furthermore, if a sharp band-pass filter is used, requirement specifications become strict also regarding the stability of the carrier frequency of the transmission side.

<Modulation and Demodulation: Basis>

Figure 3A:
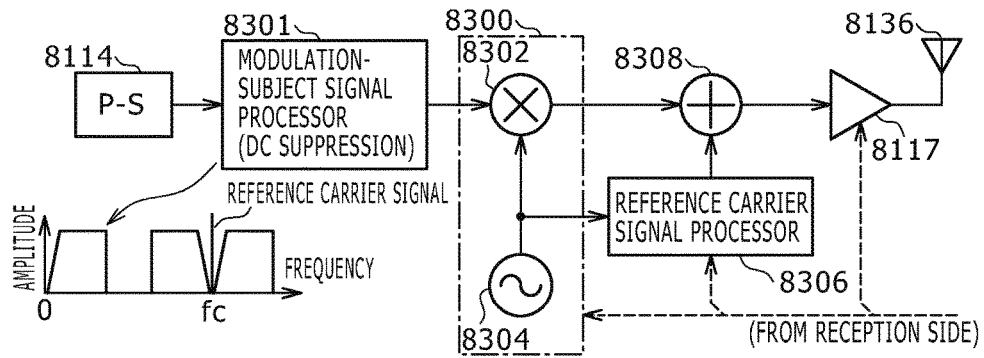
FIGS. 3A to 3D are diagrams for explaining a basic configuration example of a modulation functional unit of embodiments of the present invention and the peripheral circuit thereof.
Figure 3B:
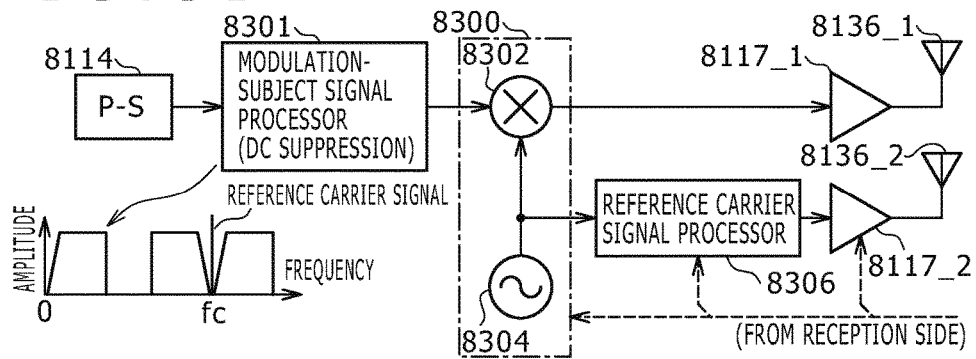
Figure 3C:
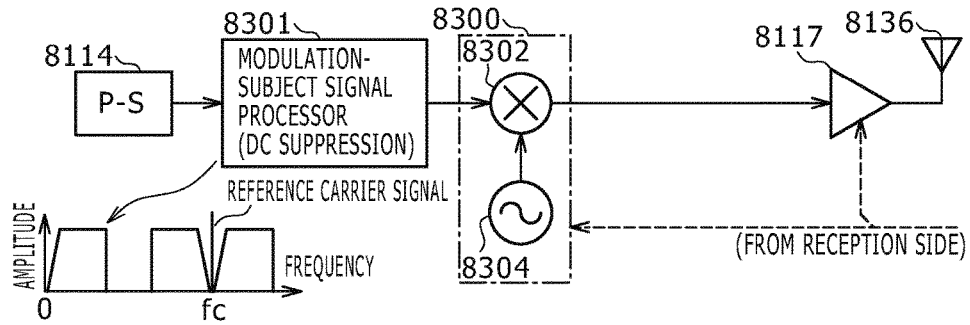
Figure 3D:
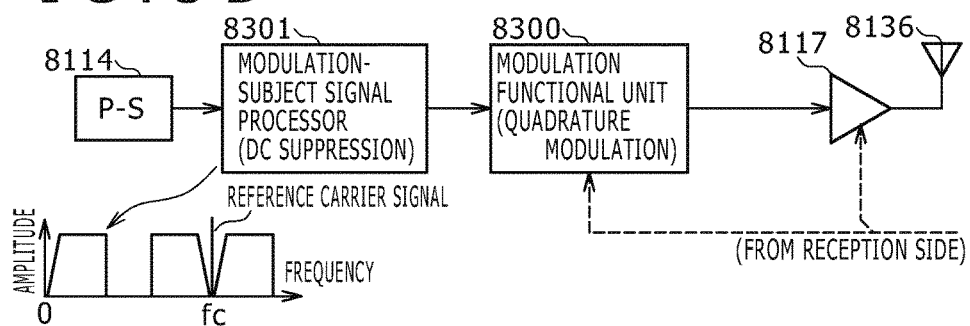
Figure 4B:
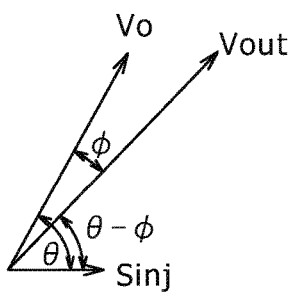
FIG. 4B is a diagram for explaining the phase relationship of injection locking.

FIGS. 3A to 4B are diagrams for explaining the basic configuration of the modulation function and the demodulation function in a communication processing system. Specifically, FIGS. 3A to 3D are diagrams for explaining a basic configuration example of a transmission-side signal generating unit 8110 (communication unit on the transmission side) composed of a modulation functional unit 8300 (modulators 115 and 215 and frequency converters 116 and 216) of the embodiments provided on the transmission side and the peripheral circuit thereof. FIGS. 4A1 to 4A4 are diagrams for explaining a basic configuration example of a reception-side signal generating unit 8220 (communication unit on the reception side) composed of a demodulation functional unit 8400 (frequency converters 125 and 225 and demodulators 126 and 226) of the embodiments provided on the reception side and the peripheral circuit thereof. FIG. 4B is a diagram for explaining the phase relationship of injection locking.

As a countermeasure against the problems in the above-described comparative example, the demodulation functional unit 8400 of the embodiments employs an injection locking system.

In the case of employing the injection locking system, it is preferable to perform proper correction processing for the modulation-subject signal in advance in order to facilitate the injection locking on the reception side. Typically, the modulation-subject signal is modulated after the near-DC (direct current) component is suppressed for the modulation-subject signal, i.e. the modulation-subject signal is modulated after a low-frequency component around the DC is suppressed (cut), so that the modulated signal component near the carrier frequency fc may become as small as possible and the injection locking on the reception side may be facilitated. That is, it is preferable to suppress not only DC but also the component around DC. In the case of a digital system, DC-free coding is performed in order to eliminate the occurrence of a DC component due to the continuation of the same symbol for example.

It is preferable to send out also a reference carrier signal that corresponds to the carrier signal used for the modulation and is used as the basis of the injection locking on the reception side together with the signal modulated to a millimeter-wave signal (modulated signal). The reference carrier signal is a signal corresponding to the carrier signal that is output from the transmission-side local oscillator 8304 and used for the modulation. The frequency and phase (preferably, and amplitude) of the reference carrier signal are always constant (invariable). Typically, the reference carrier signal is the carrier signal itself used for the modulation. However, the reference carrier signal is not limited thereto as long as it is synchronous with the carrier signal. For example, the reference carrier signal may be a signal that is synchronous with the carrier signal used for the modulation and has another frequency (e.g. harmonic signal). Alternatively, it may be a signal that has the same frequency but has another phase (e.g. quadrature carrier signal orthogonal to the carrier signal used for the modulation).

Depending on the modulation system and the modulator circuit, the carrier signal is included in the output signal itself from the modulator circuit in some cases (e.g. standard amplitude modulation or ASK), whereas the carrier is suppressed in the other cases (e.g. amplitude modulation, ASK, or PSK based on a carrier suppression system). Therefore, the circuit for sending out also the reference carrier signal together with the signal modulated to a millimeter-wave signal from the transmission side employs a circuit configuration dependent on the kind of reference carrier signal (whether or not to use the carrier signal itself used for the modulation as the reference carrier signal), the modulation system, and the modulator circuit.

[Modulation Functional Unit]

FIGS. 3A to 3D show the basic configuration of the modulation functional unit 8300 and the peripheral circuit thereof. A modulation-subject signal processor 8301 is provided at the previous stage of the modulation functional unit 8300 (frequency mixer 8302). The respective examples shown in FIGS. 3A to 3D are configuration examples for a digital system. The modulation-subject signal processor 8301 performs DC-free coding such as 8-9 conversion coding (8B/9B coding), 8-10 conversion coding (8B/10B coding), or scramble processing for data supplied from the parallel-serial converter 8114 in order to eliminate the occurrence of a DC component due to the continuation of the same symbol. Although not shown in the diagram, it is preferable to perform high-pass filter processing (or band-pass filter processing) for the modulation-subject signal in an analog modulation system.

In the 8-10 conversion coding, 8-bit data is converted to a 10-bit code. For example, data codes in which the number of "1" and the number of "0" are as close to each other as possible are employed as the 10-bit codes among 1024 kinds of 10-bit codes to thereby allow the data to have the DC-free characteristic. Part of the 10-bit codes that are not employed as the data codes are used as e.g. special codes indicating idle, packet delimiter, and so forth. As for the scramble processing, e.g. 64B/66B coding employed in the 10GBase-X family (IEEE802.3ae or the like) is known.

In basic configuration 1 shown in FIG. 3A, a reference carrier signal processor 8306 and a signal combiner 8308 are provided, and operation of combining (mixing) the output signal (modulated signal) of the modulator circuit (first frequency converter) and the reference carrier signal is carried out. It could be said that this system is a versatile system independent of the kind of reference carrier signal, the modulation system, and the modulator circuit. However, depending on the phase of the reference carrier signal, possibly the combined reference carrier signal is detected as a direct-current offset component at the time of demodulation on the reception side and affects the reproducibility of the baseband signal. In this case, a countermeasure to suppress this direct-current component is taken on the reception side. In other words, it is preferable to make the reference carrier signal having such a phase relationship that the direct-current offset component does not have to be removed at the time of demodulation.

The reference carrier signal processor 8306 adjusts the phase and amplitude of the modulation carrier signal supplied from the transmission-side local oscillator 8304 according to need, and supplies its output signal as the reference carrier signal to the signal combiner 8308. For example, this basic configuration 1 is employed in the case of a system in which the carrier signal whose frequency and phase are always constant is not included in the output signal itself of the frequency mixer 8302 essentially (system in which the frequency or the phase is modulated) or in the case of using a harmonic signal or quadrature carrier signal of the carrier signal used for the modulation as the reference carrier signal.

In this configuration, a harmonic signal or quadrature carrier signal of the carrier signal used for the modulation can be used as the reference carrier signal, and the amplitude and phase of the modulated signal and the reference carrier signal can be adjusted separately from each other. Specifically, the amplifier 8117 carries out gain adjustment with attention paid to the amplitude of the modulated signal, and simultaneously the amplitude of the reference carrier signal is also adjusted at this time. However, only the amplitude of the reference carrier signal can be adjusted by the reference carrier signal processor 8306 so that the reference carrier signal may have preferred amplitude in terms of the injection locking.

Although the signal combiner 8308 is provided to combine the modulated signal and the reference carrier signal in basic configuration 1, this is not essential. Like in basic configuration 2 shown in FIG. 3B, the modulated signal and the reference carrier signal may be sent from different antennas 8136_1 and 8136_2, respectively, to the reception side via the respective different millimeter-wave signal transmission paths 9, preferably without the occurrence of interference. In basic configuration 2, the reference carrier signal whose amplitude is also always constant can be sent out to the reception side. Thus, it could be said that this system is the optimum system in terms of easiness of achievement of the injection locking.

Basic configurations 1 and 2 have an advantage that the amplitude and phase of the carrier signal used for the modulation (in other words, the modulated signal to be sent out) and the reference carrier signal can be adjusted separately from each other. Therefore, it could be said that these configurations are suitable for making the modulation axis on which the transmission-subject information is carried and the axis of the reference carrier signal used for the injection locking (reference carrier axis) not be in phase but have different phases to thereby prevent the occurrence of a direct-current offset component in the demodulated output.

If the carrier signal whose frequency and phase are always constant can be included in the output signal itself of the frequency mixer 8302, it is possible to employ basic configuration 3 shown in FIG. 3C, which does not include the reference carrier signal processor 8306 and the signal combiner 8308. Only the modulated signal modulated to a millimeter-wave signal by the frequency mixer 8302 can be sent out to the reception side, and the carrier signal included in the modulated signal can be treated as the reference carrier signal. There is no need to add another reference carrier signal to the output signal of the frequency mixer 8302 and send the resulting signal to the reception side. For example, this basic configuration 3 can be employed in the case of a system of modulating the amplitude (e.g. ASK system). In this case, it is preferable to perform DC-free processing.

However, also when amplitude modulation or ASK is employed, a circuit of a carrier suppression system (e.g. balanced modulator circuit or double-balanced modulator circuit) may be aggressively employed as the frequency mixer 8302 so that the reference carrier signal may also be sent together with the output signal of the frequency mixer 8302 (modulated signal) as with basic configurations 1 and 2.

Also in the case of a system of modulating the phase or the frequency, it would also be possible to send out only the modulated signal modulated (frequency-converted) to a millimeter-wave signal by the modulation functional unit 8300 (using e.g. quadrature modulation) like in basic configuration 4 shown in FIG. 3D. However, the injection level (the amplitude level of the reference carrier signal input to the oscillator circuit of the injection locking system), the modulation system, the data rate, the carrier frequency, and so forth also have relation to whether or not the injection locking can be achieved on the reception side. Therefore, there is a limit to the application range of this configuration.

All of basic configurations 1 to 4 can employ a mechanism to receive information based on the result of detection of the injection locking on the reception side from the reception side as shown by the dotted lines in the diagram and adjust the frequency of the modulation carrier signal and the phase of millimeter waves (particularly waves used for the injection locking on the reception side: e.g. reference carrier signal or modulated signal) and the reference carrier signal. It is not essential to transmit the information from the reception side to the transmission side by millimeter waves, but any system may be employed no matter whether the system is based on wired transmission or wireless transmission.

In all of basic configurations 1 to 4, the frequency of the modulation carrier signal (and reference carrier signal) is adjusted through control of the transmission-side local oscillator 8304.

In basic configurations 1 and 2, the amplitude and phase of the reference carrier signal are adjusted through control of the reference carrier signal processor 8306 and the amplifier 8117. It would also be possible in basic configuration 1 to adjust the amplitude of the reference carrier signal by the amplifier 8117, which adjusts the transmission power. However, this case involves a drawback that the amplitude of the modulated signal is also adjusted together.

In basic configuration 3, which is suitable for a system of modulating the amplitude (analog amplitude modulation or digital ASK), the carrier frequency component (equivalent to the amplitude of the reference carrier signal) in the modulated signal is adjusted by adjusting the direct-current component for the modulation-subject signal or controlling the modulation index (modulation ratio). For example, suppose that a signal resulting from addition of a direct-current component to the transmission-subject signal is modulated. In this case, if the modulation index is kept constant, the amplitude of the reference carrier signal is adjusted by controlling the direct-current component. If the direct-current component is kept constant, the amplitude of the reference carrier signal is adjusted by controlling the modulation index.

However, in this case, the signal combiner 8308 does not need to be used, but the signal resulting from mixing of the modulated signal, which is obtained by modulating the carrier signal by the transmission-subject signal, and the carrier signal used for the modulation is sent out automatically by merely sending out only the modulated signal output from the frequency mixer 8302 to the reception side. Inevitably, the reference carrier signal is carried on the axis that is the same as (i.e. that is in phase with) the modulation axis on which the transmission-subject signal of the modulated signal is carried. On the reception side, the carrier frequency component in the modulated signal is used as the reference carrier signal for the injection locking. As described in detail later, on the phase plane, the modulation axis on which the transmission-subject information is carried and the axis of the carrier frequency component (reference carrier signal) used for the injection locking are in phase, and a direct-current offset component attributed to the carrier frequency component (reference carrier signal) arises in the demodulated output.

[Demodulation Functional Unit]

FIGS. 4A1 to 4A4 show the basic configuration of the demodulation functional unit 8400 and the peripheral circuit thereof. The demodulation functional unit 8400 of the embodiments includes a reception-side local oscillator 8404 and acquires the output signal corresponding to the carrier signal used for the modulation on the transmission side by supplying an injection signal to the reception-side local oscillator 8404. Typically, the demodulation functional unit 8400 acquires the oscillation output signal locked with the carrier signal used on the transmission side. Subsequently, the demodulation functional unit 8400 multiplies the received millimeter-wave modulated signal and a carrier signal for demodulation (demodulation carrier signal: referred to as the reproduction carrier signal) based on the output signal of the reception-side local oscillator 8404 (carries out synchronous detection) by the frequency mixer 8402 to thereby acquire a synchronous detection signal. The high-frequency component is removed from this synchronous detection signal by the filter processor 8410, and thereby the waveform of the input signal (baseband signal) sent from the transmission side is obtained. The subsequent operation is the same as that in the comparative example.

The frequency mixer 8402 carries out frequency conversion (down-conversion, demodulation) by the synchronous detection to thereby achieve e.g. advantages that the bit error rate characteristic is excellent and that phase modulation and frequency modulation can be used through expansion to quadrature detection.

For the demodulation by supply of the reproduction carrier signal based on the output signal of the reception-side local oscillator 8404 to the frequency mixer 8402, phase shift needs to be considered, and it is vital to provide a phase adjusting circuit in the synchronous detection system. This is because a phase difference exists between the received modulated signal and the oscillation output signal output from the reception-side local oscillator 8404 by the injection locking as described in e.g. L. J. Paciorek, "Injection Lock of Oscillators," Proceeding of the IEEE, Vol. 55 NO. 11, November 1965, pp. 1723 to 1728 (hereinafter, reference document C).

In this example, a phase amplitude adjuster 8406 that has not only the functions of the phase adjusting circuit but also a function to adjust the injection amplitude is provided in the demodulation functional unit 8400. The phase adjusting circuit may be provided for either the injection signal to the reception-side local oscillator 8404 or the output signal of the reception-side local oscillator 8404. Alternatively, it may be provided for both of them. By the reception-side local oscillator 8404 and the phase amplitude adjuster 8406, a demodulation-side (second) carrier signal generating unit that generates the demodulation carrier signal locked with the modulation carrier signal and supplies it to the frequency mixer 8402 is configured.

As shown by the dotted lines in the diagram, a direct-current component suppressor 8407 is provided at the subsequent stage of the frequency mixer 8402. The direct-current component suppressor 8407 removes the direct-current offset component possibly included in the synchronous detection signal depending on the phase of the reference carrier signal combined with the modulated signal (specifically, when the modulated signal and the reference carrier signal are in phase).

According to reference document C, if the lock range is represented by the maximum acquisition frequency range $\Delta f_{omax}$, the lock range is defined by expression (A). In expression (A), the free-running oscillation frequency of the reception-side local oscillator 8404 is defined as fo ($\omega_o$), the center frequency of the injection signal (in the case of the reference carrier signal, the frequency of the reference carrier signal) is defined as fi ($\omega_i$), the injection voltage to the reception-side local oscillator 8404 is defined as Vi, the free-running oscillation voltage of the reception-side local oscillator 8404 is defined as Vo, and the quality factor is defined as Q. From expression (A), it turns out that the quality factor has an influence on the lock range and a lower quality factor provides a wider lock range.

$$\Delta f_{omax} = f_o/(2*Q)*(V_i/V_o)*1/\sqrt{1-(V_i/V_o)^2} \quad (A)$$

From expression (A), it can be understood that the reception-side local oscillator 8404, which acquires the oscillation output signal by the injection locking, can be locked with components inside $\Delta f_{omax}$ of the injection signal, but can not be locked with components outside $\Delta f_{omax}$ and thus the reception-side local oscillator 8404 has a band-pass effect. For example, in the case of supplying the modulated signal having a frequency range to the reception-side local oscillator 8404 to obtain the oscillation output signal by the injection locking, the oscillation output signal locked with the average frequency of the modulated signal (the frequency of the carrier signal) is obtained, and components outside $\Delta f_{omax}$ are removed.

As the way of supply of the injection signal to the reception-side local oscillator 8404, it would be possible to supply the received millimeter-wave signal to the reception-side local oscillator 8404 as the injection signal like in basic configuration 1 shown in FIG. 4A1. In this case, it is preferable that frequency components inside $\Delta f_{omax}$ be few. This expression is based on the fact that, even when the frequency components inside $\Delta f_{omax}$ exist somewhat, the injection locking is possible if the signal input level and the frequency are properly adjusted. That is, it would be difficult to achieve the injection locking because frequency components that are unnecessary for the injection locking can also be supplied to the reception-side local oscillator 8404. However, there is no problem even with basic configuration 1 as long as the modulation is carried out after low-frequency components are suppressed (by DC-free coding or the like) for the modulation-subject signal in advance on the transmission side to thereby prevent the modulated signal component from existing near the carrier frequency.

Furthermore, it would be possible to provide a frequency separator 8401 to carry out frequency separation of the received millimeter-wave signal into the modulated signal and the reference carrier signal and supply the separated reference carrier signal component to the reception-side local oscillator 8404 as the injection signal like in basic configuration 2 shown in FIG. 4A2. Because the signal component is supplied after frequency components that are unnecessary for the injection locking are suppressed in advance, the injection locking can be easily achieved.

Basic configuration 3 shown in FIG. 4A3 corresponds to the case in which the transmission side employs basic configuration 2 shown in FIG. 3B. Specifically, this configuration is based on a system in which the modulated signal and the reference carrier signal are received by different antennas 8236_1 and 8236_2, respectively, via the respective different millimeter-wave signal transmission paths 9, preferably without the occurrence of interference. In basic configuration 3 of the reception side, the reference carrier signal whose amplitude is also always constant can be supplied to the reception-side local oscillator 8404. Thus, it could be said that this configuration is the optimum system in terms of easiness of achievement of the injection locking.

Basic configuration 4 shown in FIG. 4A4 corresponds to the case in which the transmission side is based on a system of modulating the phase or the frequency and has basic configuration 4 shown in FIG. 3D. Although this configuration is similar to basic configuration 1, the demodulation functional unit 8400 has the configuration of a demodulator circuit compliant with phase modulation or frequency modulation, such as a quadrature detection circuit, in practice.

The millimeter-wave signal received by the antenna 8236 is supplied to the frequency mixer 8402 and the reception-side local oscillator 8404 by a splitter (demultiplexer) (not shown). The reception-side local oscillator 8404 outputs the reproduction carrier signal locked with the carrier signal used for the modulation on the transmission side due to the functioning of the injection locking.

The injection level (the amplitude level of the reference carrier signal input to the oscillator circuit of the injection locking system), the modulation system, the data rate, the carrier frequency, and so forth also have relation to whether or not the injection locking can be achieved on the reception side (the reproduction carrier signal locked with the carrier signal used for the modulation on the transmission side can be acquired). Furthermore, it is vital to make the modulated signal be outside such a band that the injection locking is possible. For this purpose, it is preferable to perform DC-free coding on the transmission side so that the center (average) frequency of the modulated signal may be almost equal to the carrier frequency and the center (average) phase may be almost equal to zero (the origin on the phase plane).

For example, an example in which the modulated signal itself obtained by modulation by a binary phase shift keying (BPSK) system is used as the injection signal is disclosed in P. Edmonson, et al., "Injection Locking Techniques for a 1-GHz Digital Receiver Using Acoustic-Wave Devices," IEEE Transactions on Ultrasonics, Ferroelectrics, and Frequency Control, Vol. 39, No. 5, September, 1992, pp. 631 to 637 (hereinafter, reference document D). In the BPSK system, a phase change by 180 degrees occurs in the injection signal to the reception-side local oscillator 8404 depending on the symbol time T of the input signal. In order that the reception-side local oscillator 8404 can achieve the injection locking even in this case, for example the symbol time T needs to satisfy the relationship $T<1/(2\Delta f_{omax})$ if the maximum acquisition frequency range width of the reception-side local oscillator 8404 is defined as $\Delta f_{omax}$. This means that the symbol time T must be set sufficiently short. This fact that a shorter symbol time T is more preferable means that a higher data rate is more preferable. This is convenient for the use purpose aiming at high-speed data transfer.

Furthermore, an example in which the modulated signal itself obtained by modulation by an 8-phase shift keying (8PSK) system is used as the injection signal is disclosed in Tarar, M. A.; Zhizhang Chen, "A Direct Down-Conversion Receiver for Coherent Extraction of Digital Baseband Signals Using the Injection Locked Oscillators," Radio and Wireless Symposium, 2008 IEEE, Volume, Issue, 22-24 Jan. 2008, pp. 57 to 60 (hereinafter, reference document E). This reference document E also shows that a higher data rate makes it easier to achieve the injection locking if the injection voltage and the carrier frequency are the same. This is also convenient for the use purpose aiming at high-speed data transfer.

In all of basic configurations 1 to 4, the lock range is controlled by controlling the injection voltage Vi and the free-running oscillation frequency fo based on expression (A). In other words, it is vital that the injection voltage Vi and the free-running oscillation frequency fo are so adjusted that the injection locking can be achieved. For example, an injection locking controller 8440 is provided at the subsequent stage of the frequency mixer 8402 (in the example of the diagram, at the subsequent stage of the direct-current component suppressor 8407), and the state of the injection locking is determined based on the synchronous detection signal (baseband signal) acquired by the frequency mixer 8402. Based on the determination result, the respective units as the adjustment subject are so controlled that the injection locking can be achieved.

In this case, it is possible to employ either one or both of a technique in which the reception side reacts and a technique in which information contributing to control (not only the control information but also the sensing signal as the basis of the control information and so forth) is supplied to the transmission side as shown by the dotted lines in the diagram and the transmission side reacts. The technique in which the reception side reacts involves drawbacks in terms of power consumption and interference tolerance because a situation in which the injection locking can not be achieved on the reception side occurs unless the millimeter-wave signal (particularly, the reference carrier signal component) is transmitted with somewhat-high intensity. However, this technique has an advantage that reaction can be performed by only the reception side.

In contrast, the technique in which the transmission side reacts has advantages that the millimeter-wave signal can be transmitted with the necessary minimum power to allow achievement of the injection locking on the reception side and thus the power consumption can be reduced and that the interference tolerance is enhanced, although information transmission from the reception side to the transmission side is necessary.

The following advantages are achieved by employing the injection locking system in in-housing signal transmission and inter-apparatus signal transmission. The transmission-side local oscillator 8304 can relax the requirement specifications of the stability of the frequency of the carrier signal used for the modulation. The reception-side local oscillator 8404, which is on the injection locking side, needs to have such a low quality factor as to be capable of following frequency variation on the transmission side as is apparent from expression (A).

This is convenient for the case of forming the whole of the reception-side local oscillator 8404 including a tank circuit (inductance component and capacitance component) on a CMOS. On the reception side, the reception-side local oscillator 8404 may have a low quality factor. This point applies also the transmission-side local oscillator 8304 on the transmission side. The transmission-side local oscillator 8304 may have low frequency stability and may have a low quality factor.

The microminiaturization of the CMOS will be further advanced in the future and the operating frequency thereof will be further raised. To realize a small-size transmission system in a wider band, using a high carrier frequency is desired. The injection locking system of the present example can relax the requirement specifications about the stability of the oscillation frequency, and thus allows the carrier signal having a higher frequency to be easily used.

Because the frequency stability may be low (in other words, the quality factor may be low) although the frequency is high, a frequency multiplier circuit having high stability, a PLL circuit for carrier synchronization, and so forth do not need to be used to realize the carrier signal having a high frequency and high stability. Even with a higher carrier frequency, the communication function can be simply realized with a small circuit scale.

The reception-side local oscillator 8404 acquires the reproduction carrier signal locked with the carrier signal used on the transmission side and supplies it to the frequency mixer 8402 to carry out synchronous detection. Therefore, a band-pass filter for wavelength selection does not need to be provided at the previous stage of the frequency mixer 8402. Virtually it is enough to carry out control of making the transmission and reception local oscillator circuits be completely locked with each other (i.e. control for achieving the injection locking) as the operation of selecting the reception frequency, and thus the selection of the reception frequency is easy. In the case of the millimeter wave band, the time required for the injection locking is shorter compared with the lower frequency band. Thus, the operation of selecting the reception frequency can be completed in a short time.

Because the transmission and reception local oscillator circuits are completely locked with each other, the variation component of the carrier frequency on the transmission side is cancelled. Thus, various modulation systems such as phase modulation can be easily employed. For example, as digital modulation, phase modulation such as quadrature phase shift keying (QPSK) modulation and 16 quadrature amplitude modulation (16QAM) modulation is widely known. In these phase modulation systems, quadrature modulation is carried out between the baseband signal and the carrier. In the quadrature modulation, the input data is rendered the I-phase and Q-phase baseband signals and modulation is carried out. That is, the modulation is carried out separately for the respective carrier signals on the I-axis and the Q-axis by the I-phase signal and the Q-phase signal, respectively. The injection locking can be applied not only to a 8PSK modulation system like that described in reference document E but also to a quadrature modulation system such as QPSK or 16QAM, and the data transmission rate can be enhanced by rendering the modulated signal to be in quadrature.

If the injection locking is employed, due to combination with synchronous detection, the transmission is hardly affected by the problem of interference even in the case in which plural transmission/reception pairs simultaneously perform independent transmission, such as the case in which multi-channel transmission or full-duplex bidirectional transmission is performed, without use of a band-pass filter for wavelength selection on the reception side.

[Relationship Between Injection Signal and Oscillation Output Signal]

FIG. 4B shows the phase relationship among the respective signals in the injection locking. In FIG. 4B, as the basic phase relationship, a relationship in which the injection signal (in this example, the reference carrier signal) and the carrier signal used for the modulation are in phase with each other is shown.

As the operation mode of the reception-side local oscillator 8404, two modes, an injection locking mode and an amplifier mode, can be employed. When the injection locking system is employed, the injection locking mode is used as the basic operation and the amplifier mode is used in the special case. The special case is the case in which the reference carrier signal is used as the injection signal and the phases of the carrier signal used for the modulation and the reference carrier signal are different from each other (typically, in a quadrature relationship).

When the reception-side local oscillator 8404 operates in the injection locking mode, a phase difference exists between the received reference carrier signal SQ and the oscillation output signal SC output from the reception-side local oscillator 8404 due to the injection locking as shown in the diagram. To carry out quadrature detection by the frequency mixer 8402, this phase difference needs to be corrected. As is apparent from the diagram, the amount of phase shift of the output signal of the reception-side local oscillator 8404 is "θ−φ" in the diagram when the phase adjustment of the output signal of the reception-side local oscillator 8404 is so carried out by the phase amplitude adjuster 8406 that the phase of the output signal of the reception-side local oscillator 8404 substantially corresponds with the phase of the modulated signal SI.

In other words, the phase amplitude adjuster 8406 shifts the phase of the output signal Vout obtained when the reception-side local oscillator 8404 is operating in the injection locking mode in such a way that the phase difference "θ−φ" between the injection signal Sin j to the reception-side local oscillator 8404 and the injection-locked output signal Vout is cancelled. The phase difference between the injection signal Sin j to the reception-side local oscillator 8404 and the free-running output Vo of the reception-side local oscillator 8404 is θ, and the phase difference between the injection-locked output signal Vout of the reception-side local oscillator 8404 and the free-running output Vo of the reception-side local oscillator 8404 is φ.

<Relationship Between Phase of Reference Carrier Signal and Demodulation Processing>

[Basis]

FIGS. 5A1 to 5C3 are diagrams for explaining the relationship between the phase of the reference carrier signal and demodulation processing. Specifically, FIGS. 5A1 to 5A5 are diagrams for explaining the basis of the demodulation processing when the carrier signal and the reference carrier signal have the same frequency and the same phase. FIGS. 5B1 to 5B4 are diagrams for explaining the basis of the demodulation processing when the carrier signal and the reference carrier signal have the same frequency and phases in a quadrature relationship. FIGS. 5C1 to 5C3 are diagram showing the basis of the circuit configuration thereof.

If the injection locking system is employed, it is preferable that the reference carrier signal corresponding to (at least synchronous with) the carrier signal used for the modulation be also sent to the reception side together with the modulated signal obtained by modulating the carrier signal by the processed input signal. Typically, a signal having the same frequency as that of the carrier signal used for the modulation is used as the reference carrier signal. Depending on how the phase relationship between the carrier signal used for the modulation and the reference carrier signal is set, an unnecessary component (particularly, direct-current offset component) arises at the time of demodulation on the reception side. Regarding this point, a description will be made below about the relationship between the phase of the reference carrier signal and the demodulation processing when a signal having the same frequency as that of the carrier signal used for the modulation is used as the reference carrier signal.

In the ASK system, the amplitude of the carrier signal is modulated by the transmission-subject signal. It may be considered that one of the I-phase signal and the Q-phase signal is used and the signal amplitude of the modulated signal is given in the range of 0 to +F on the phase plane represented by the I-axis and the Q-axis. The case in which the modulation is carried out with binary values of 0 and +F is the simplest, and is equivalent to OOK when the modulation index is 100%. "F" can be regarded as "1" by normalization, so that binary ASK is realized.

A consideration will be made below about the case in which a signal having the same frequency and the same phase as those of the carrier signal used for the modulation is used as the reference carrier signal. For example, when information is carried on the I-axis and is to be transmitted as shown in FIG. 5A1, the reference carrier signal is also made to be in phase (I-axis).

If the carrier signal used for the modulation and the reference carrier signal are made to be in phase with each other, e.g. the following technique can be employed.

A first example shown in FIG. 5A2 is one example of the technique in which basic configuration 1 shown in FIG. 3A is used. A transmission-subject signal a(t) and a carrier signal c(t)=cos ωt are supplied to the frequency mixer 8302. A balanced modulator circuit or a double-balanced modulator circuit is used as the frequency mixer 8302 and amplitude modulation of carrier suppression is carried out to thereby generate a signal d(t)=a(t)cos ωt and supply it to the signal combiner 8308. The transmission-subject signal a(t) takes binary values of 0 and +1. The reference carrier signal processor 8306 sets Co (within the range of 0 to 1) as the amplitude of the carrier signal c(t)=cos ωt output from the transmission-side local oscillator 8304 and supplies the resulting signal as a reference carrier signal e(t)=Co cos ωt to the signal combiner 8308. The signal combiner 8308 carries out signal combining of d(t)+e(t) to thereby generate a transmission signal f(t). The modulation is equivalent to 100%-modulation when Co=0.

A second example shown in FIG. 5A3 and a third example shown in FIG. 5A4 are examples of the technique in which basic configuration 3 shown in FIG. 3C is used. A circuit configuration to which carrier suppression is not applied is used as the frequency mixer 8302, and amplitude modulation is carried out by a signal g(t) obtained by adding a direct-current component b0 to a transmission-subject signal b(t) to thereby generate a signal h(t)=g(t)cos ωt. The transmission-subject signal b(t) takes binary values of −1 and +1. The amplitude B of the transmission-subject signal b(t) is equivalent to the modulation index (modulation ratio).

In the second example shown in FIG. 5A3, the modulation index B is kept constant (=1) and the amplitude of the reference carrier signal (amplitude during the period when b(t)=−1) is adjusted by controlling the direct-current component b0 within the range of 1 to 2. In the third example shown in FIG. 5A4, the direct-current component b0 is kept constant (=1) and the amplitude of the reference carrier signal (amplitude during the period when b(t)=−1) is adjusted by controlling the modulation index B within the range of 0 to 1.

In all of the first to third examples, when information is carried on only the I-axis and is to be transmitted, the reference carrier signal is also made to be in phase (I-axis). In this case, a direct-current offset component arises on the reception side as is apparent from FIG. 5A5.

For example, if the I-axis is defined as the axis of the real component and the Q-axis is defined as the axis of the imaginary component and the amplitude of the transmission-subject signal a(t) is set to 0 and +1 in the first example, the reception signal point is plotted at 0 and +1 on the I-axis. If the reference carrier is also carried on the I-axis, the signal point is plotted at "0+Co" and "+1+Co." That is, a direct-current component of +Co is carried as a result.

If the transmission-subject signal b(t) is set to −1 and +1 in the second example and the third example, the reception signal point is plotted at −1 and +1 on the I-axis. If the reference carrier is also carried on the I-axis, the signal point is plotted at "−1+Co" and "+1+Co." That is, a direct-current component of +Co is carried as a result. These examples are based on the concept that, in the case of employing BPSK, this BPSK is made equivalent to ASK by carrying out modulation after the modulation-subject signal is processed by signal processing in advance so that the reference carrier may also be carried on the I-axis.

For solving this problem, it would be possible to provide the direct-current component suppressor 8407 for suppressing the direct-current component on the reception side as shown in FIGS. 4A1 to 4A4. However, variation from apparatus to apparatus exists and thus individual adjustment dependent on the magnitude of the direct-current offset is necessary, and there is a drawback that the direct-current component suppressor 8407 is affected by temperature drift.

As a method for solving this problem without the provision of the direct-current component suppressor 8407 on the reception side, it would be possible to carry the reference carrier signal on a phase axis different from (preferably, remotest from) the phase axis on which the transmission information is carried (phase axis of the modulated signal) and send the signals.

For example, in the case of the ASK mode, in which the transmission information is carried on only one of the I-axis and the Q-axis, it would be possible to make the reference carrier signal and the modulated information be in quadrature on the transmission side. Specifically, instead of carrying out two-axis modulation with the I-phase signal and the Q-axis signal, only one of the I-axis and the Q-axis is used for signal transmission whereas the other is treated as the non-modulation axis, and the non-modulated signal is used as the reference carrier signal.

The relationship of the I-axis and the Q-axis may be reversed between the transmission information (modulated information) and the reference carrier signal. For example, the transmission information may be carried on the I-axis whereas the reference carrier signal may be carried on the Q-axis on the transmission side. Conversely, the transmission information may be carried on the Q-axis whereas the reference carrier signal may be carried on the I-axis. In the example shown in FIGS. 5B1 to 5B4, the transmission information is carried on the I-axis whereas the reference carrier signal is carried on the Q-axis.

As shown in FIG. 5B2, a frequency mixer 8302_I is provided for the I-axis for the transmission signal. A transmission-subject signal a(t) is supplied to the frequency mixer 8302_I. The reference carrier signal processor 8306 has a frequency mixer 8302_Q for the Q-axis for the reference carrier signal and a 90-degree phase shifter 8309 as a functional unit for making the carrier signal be in quadrature at the previous stage of the frequency mixer 8302_Q. A phase amplitude adjusting circuit 8307 may be made to function as the 90-degree phase shifter 8309. A direct-current component Co is supplied to the frequency mixer 8302_Q.

On the reception side, the reproduction carrier signal based on the output signal of the reception-side local oscillator 8404 is supplied to the frequency mixer 8402 and is multiplied with the received I-axis modulated signal (synchronous detection is carried out), to thereby restore the I-axis baseband signal. At this time, phase adjustment is so carried out that the phase of the reproduction carrier signal based on the output signal of the reception-side local oscillator 8404 almost corresponds with the phase of the I-axis modulated signal. As long as the phases are almost equal to each other eventually, the phase adjustment may be carried out either at the previous stage or the subsequent stage of the reception-side local oscillator 8404 as described above.

If the modulated signal (carrier signal) and the reference carrier signal are made to be in a quadrature relationship, how to obtain the reproduction carrier signal based on the output signal of the reception-side local oscillator 8404 has relation to the injection amplitude. Broadly speaking, the way of thinking about the phase shift differs depending on whether the injection locking of the reception-side local oscillator 8404 properly functions or the injection locking does not function and thus the reception-side local oscillator 8404 operates in the amplifier mode.

For example, if the injection amplitude is set small (weak injection signal is used) so that the injection locking of the reception-side local oscillator 8404 may properly function, the reproduction carrier signal is acquired based on the output signal Vout (oscillation output signal SC) of the reception-side local oscillator 8404 obtained by the injection locking. Although "the injection amplitude is set small (weak injection signal is used)," the injection locking results in failure if the injection signal is too weak. Therefore, an input having a proper level is necessary so that the injection locking may properly function. In this case, the oscillation output signal SC based on a reference carrier signal SQ of the Q-axis is obtained from the reception-side local oscillator 8404. However, as shown in FIG. 4B, a phase difference exists between the received reference carrier signal SQ and the oscillation output signal SC output from the reception-side local oscillator 8404 due to the injection locking. Furthermore, a phase difference of 90 degrees exists between the Q-axis reference carrier signal serving as the injection signal to the reception-side local oscillator 8404 and the modulation axis (I-axis) on which the transmission-subject signal is carried.

As a result, the amount of phase shift by the phase adjustment that is so carried out by the phase amplitude adjuster 8406 that the phase of the output signal of the reception-side local oscillator 8404 almost corresponds with the phase of the modulated signal SI is equal to the phase difference obtained by adding the phase difference from the modulation axis on which the transmission-subject information is carried (in the case of the present example, 90 degrees) to "θ−φ" in FIG. 4B. As shown in FIG. 5B3, the phase adjustment is so carried out by the phase amplitude adjuster 8406 that the phase of the output signal of the reception-side local oscillator 8404 almost corresponds with the phase of the modulated signal SI to thereby obtain the reproduction carrier signal SR, and this reproduction carrier signal SR is supplied to the frequency mixer 8402.

By multiplying this reproduction carrier signal SR and the received I-axis modulated signal SI by the frequency mixer 8402 (carrying out synchronous detection), the I-axis baseband signal is restored. Thereby, the baseband signal free from the direct-current offset component is obtained.

If the injection amplitude is set large (strong injection signal is used), the injection locking mode of the reception-side local oscillator 8404 does not function but the reception-side local oscillator 8404 operates in the amplifier mode. In this case, the phase amplitude adjuster 8406 shifts the phase of the output signal of the reference carrier signal component when the reception-side local oscillator 8404 is operating in the amplifier mode in such a way that the phase difference from the modulation axis on which the transmission-subject information is carried is cancelled. In the present example, the transmission-subject information is carried on the I-axis whereas the reference carrier signal is carried on the Q-axis, and therefore the phase difference between both axes is 90 degrees.

Therefore, as shown in FIG. 5B4, the phase of the Q-axis reference carrier signal component of the output signal output from the reception-side local oscillator 8404 in the amplifier mode is shifted by 90 degrees so as to be made to correspond with the phase of the I-axis modulated signal to thereby obtain the reproduction carrier signal SR, and this reproduction carrier signal SR is supplied to the frequency mixer 8402. By multiplying this reproduction carrier signal SR and the received I-axis modulated signal SI by the frequency mixer 8402 (carrying out synchronous detection), the I-axis baseband signal is restored. Thereby, the baseband signal free from the direct-current offset component is obtained.

Because a phase difference of 90 degrees exists between the reference carrier signal SQ (=Co sin(ωt+θ)) and the modulated signal SI (=a(t)cos(ωt+θ)), the direct-current component of the baseband signal can be suppressed by shifting the phase of the reference carrier signal SQ by 90 degrees. For example, if the reference carrier is carried on the Q-axis, the signal point is plotted at "+1+jCo" and "0+jCo." If only the I-axis component is extracted, the signal point is plotted at "0" and "+1." Thus, a result in which the direct-current component is not carried is obtained. Only the Q-axis component can be obtained if synchronous detection is carried out with the output signal output from the reception-side local oscillator 8404 in the amplifier mode corresponding to the reference carrier signal SQ on the Q-axis. Thus, the phase is shifted by 90 degrees on the way to thereby allow achievement of the I-axis component.

Therefore, as the circuit configuration of the demodulation system, a circuit configuration that carries out only phase adjustment as shown in FIG. 5C1 and a circuit configuration that adjusts both of the phase and the amplitude as shown in FIG. 5C2 are possible. In the case of adjusting both of the phase and the amplitude, it is possible to employ any of a configuration in which they are adjusted on the injection side of the reception-side local oscillator 8404 and a configuration in which they are adjusted on the oscillation output side of the reception-side local oscillator 8404. Furthermore, as shown in FIG. 5C3, the injection amplitude may be adjusted on the injection side of the reception-side local oscillator 8404 in order that adjustment is made as to whether or not to allow the injection locking to properly function.

[Specific Example of Demodulation Processing in the Case of Quadrature Relationship]

FIGS. 6A1 to 6D2 are diagrams for explaining a specific example of demodulation processing when the carrier signal and the reference carrier signal have the same frequency and phases in a quadrature relationship. As the reception-side local oscillator 8404, a differential negative resistance oscillator circuit 8500 to be described later is used.

FIG. 6A1 shows a spectrum example of the output signal of the reception-side local oscillator 8404 in the free-running oscillation thereof. From the diagram, it turns out that the reception-side local oscillator 8404 oscillates at 60 GHz and a strong second harmonic is also generated. A simulation is performed about the behavior of the output signal Vout of the reception-side local oscillator 8404 when a signal Sin j including an I-axis component (modulated signal) and a Q-axis component (reference carrier signal) is injected to the reception-side local oscillator 8404 in this state.

In the circuit shown in FIG. 5B2, a data signal of an M-sequence (2^11-1) is used for the I-axis and a direct-current component is used for the Q-axis, and the signal Sin j obtained by up-converting each of them to the 60-GHz band is used as the injection signal to the reception-side local oscillator 8404. FIG. 6A2 shows the specifications of the injection signal. FIG. 6B1 shows a waveform example of the baseband I, Q signal used as the injection signal. FIG. 6B2 shows a spectrum example thereof. A current obtained by multiplying this injection signal by the scale factor is injected to the reception-side local oscillator 8404 by a current source.

FIGS. 6C1 to 6D2 show the behavior of the output signal of the reception-side local oscillator 8404 when the signal Sin j including the I-axis component (modulated signal) and the Q-axis component (reference carrier signal) is injected to the reception-side local oscillator 8404. In order to analyze the output signal Vout of the reception-side local oscillator 8404, the output signal is down-converted to an I-signal and a Q-signal by using a quadrature detection circuit as shown in FIG. 6C1.

FIG. 6C2 shows a spectrum example of the output signal Vout when the injection amplitude is so set that the injection locking of the reception-side local oscillator 8404 properly functions. In this example, the scale factor is set to 10^-4. FIG. 6C3 shows an example of the I-signal and the Q-signal at this time resulting from the down-conversion by use of the quadrature detection circuit shown in FIG. 6C1.

The signal injection is started from 0.5 nsec, and the injection locking is achieved after about 4 nsec. As just described, it turns out that, if the injection signal is weak, the injection locking properly functions and thereby the I-axis modulated signal component gets out of the lock range Δfomax to be mostly removed by the band-pass effect of the reception-side local oscillator 8404.

The baseband signal free from the direct-current offset component is obtained by adjusting the phase of the oscillation output signal SC obtained due to the injection locking based on the Q-axis reference carrier signal SQ so that this phase may correspond with the phase of the I-axis modulated signal SI and carrying out synchronous detection by supplying the resulting signal as the reproduction carrier signal SR to the frequency mixer 8402.

FIG. 6D1 shows a spectrum example of the output signal Vout when the injection amplitude is set large so that the injection locking of the reception-side local oscillator 8404 may not function but the reception-side local oscillator 8404 may operate in the amplifier mode. In this example, the scale factor is set to $5 \times 10^{-3}$. FIG. 6D2 shows an example of the I-signal and the Q-signal at this time resulting from the down-conversion by use of the quadrature detection circuit shown in FIG. 6C1.

The signal injection is started from 0.5 nsec, and the output signal is achieved after about 4 nsec. If attention is paid to the spectrum of the output signal Vout, it turns out that the oscillation output signal is not obtained in the injection locking mode but the reception-side local oscillator 8404 operates in the amplifier mode in which the injected signal is output as it is substantially. It turns out that a strong second harmonic is also generated besides the fundamental also when the reception-side local oscillator 8404 operates in the amplifier mode. As just described, if the injection signal is strong, the injection locking mode does not function but the reception-side local oscillator 8404 operates in the amplifier mode, and thus each of the I-axis modulated signal component and the Q-axis reference carrier signal component is output as it is substantially. However, even in such an amplifier mode, the output signal corresponding to the Q-axis reference carrier signal component synchronous with the I-axis carrier signal for the modulation generated by the transmission-side local oscillator 8304 is obtained.

Thus, the baseband signal free from the direct-current offset component is obtained by adjusting the phase of the output signal SA in the amplifier mode corresponding to the Q-axis reference carrier signal SQ so that this phase may correspond with the phase of the I-axis modulated signal SI and carrying out synchronous detection by supplying the resulting signal as the reproduction carrier signal SR to the frequency mixer 8402. Because the phase difference between the I-axis and the Q-axis is 90 degrees, by carrying out the synchronous detection by supplying the signal obtained by shifting the phase of the output signal SA to the I-axis side by 90 degrees as the reproduction carrier signal SR to the frequency mixer 8402, the direct-current component of the baseband signal can be suppressed.

Next, a description will be made below about a detailed example of the transmission side (transmission-side signal generating unit 110) and the reception side (reception-side signal generating unit 220) when the injection locking system is employed in transmission of a millimeter-wave signal from the first communication device 100 to the second communication device 200.

Injection Locking System: First Embodiment

Figure 8:
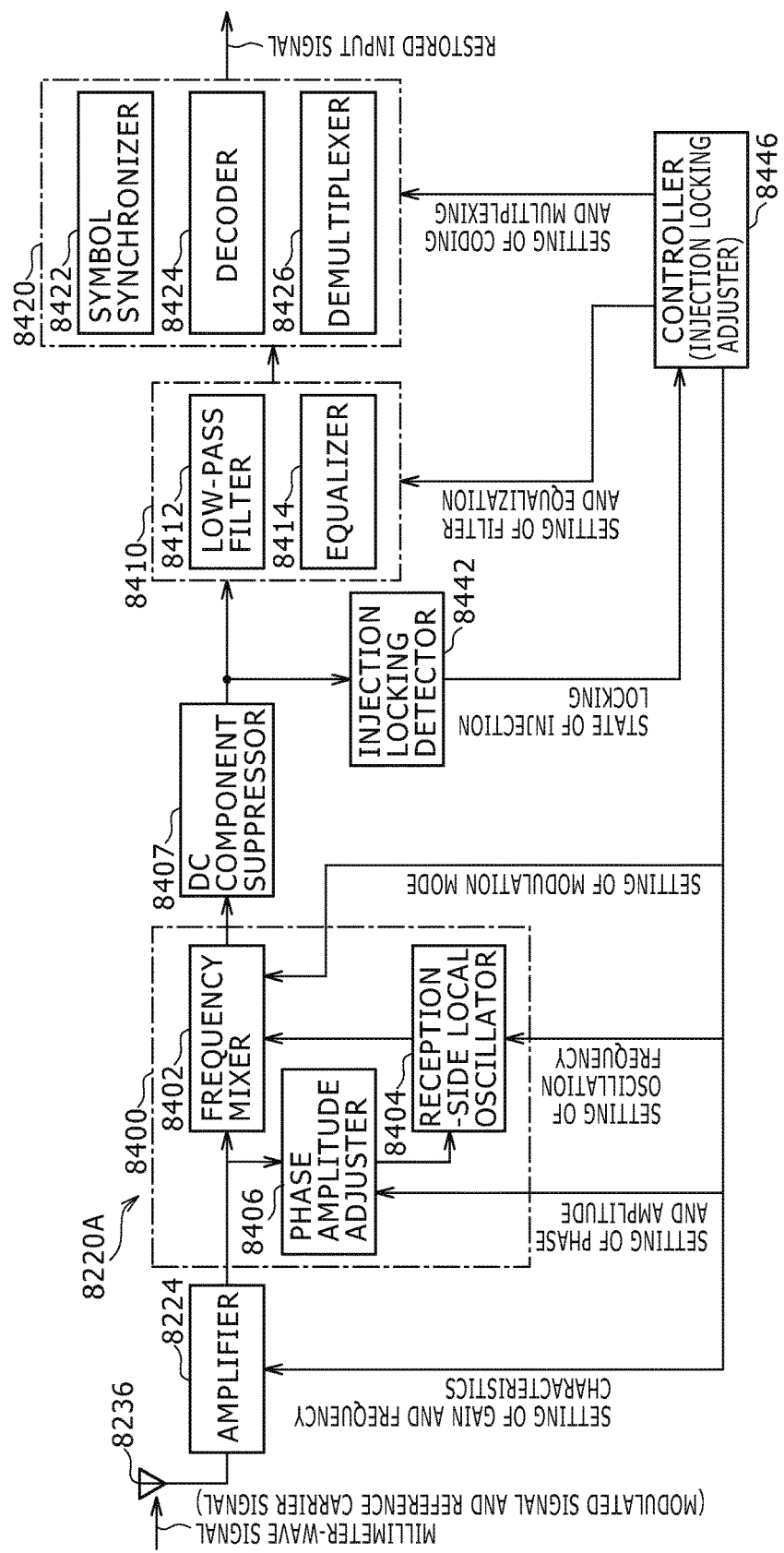
FIG. 8 is a diagram for explaining a configuration example of a receiver side employing the injection locking system according to the first embodiment.

FIGS. 7A and 7B are diagrams for explaining a configuration example of the transmitter side employing the injection locking system according to a first embodiment of the present invention. FIG. 8 is a diagram for explaining a configuration example of the receiver side employing the injection locking system according to the first embodiment. A wireless transmission system 1A of the first embodiment is configured by the combination of a transmission-side signal generating unit 8110A of the first embodiment shown in FIGS. 7A and 7B and a reception-side signal generating unit 8220A of the first embodiment shown in FIG. 8. The first embodiment relates to a configuration employing a system in which control to allow achievement of injection locking is carried out on the reception side.

[Configuration Example of Transmission Side]

FIG. 7A shows the configuration of the transmission-side signal generating unit 8110A 1 (corresponding to the transmission-side signal generating units 110 and 210) of the first embodiment (first example). FIG. 7B shows the configuration of the transmission-side signal generating unit 8110A 2 (corresponding to the transmission-side signal generating units 110 and 210) of the first embodiment (second example). Reference numeral "_1" is given in the first example and reference numeral "_2" is given in the second example. These reference numerals are omitted when a description is made without discrimination between the first and second examples.

The transmission-side signal generating unit 8110A of the first embodiment includes an encoder 8322, a multiplexer 8324, and a waveform shaper 8326 between a parallel-serial converter 8114 (not shown) and a modulation functional unit 8300. It is not essential that the transmission-side signal generating unit 8110A includes these functional units. These functional units are provided when they are necessary.

The transmission-side signal generating unit 8110A includes a controller 8346 to control the respective functional units. Although the provision of the controller 8346 is not essential, this function often exists on a CMOS chip or a board in recent various systems. The controller 8346 has functions for setting of encoding and multiplexing, setting of waveform shaping, setting of the modulation mode, setting of the oscillation frequency, setting of the phase and amplitude of the reference carrier signal, setting of the gain and frequency characteristics of an amplifier 8117, setting of the characteristics of the antenna, and so forth. The respective pieces of setting information are supplied to the corresponding functional units.

The encoder 8322 performs coding processing such as error correction for data serialized by the parallel-serial converter 8114 (not shown) based on setting information of the encode pattern from the controller 8346. At this time, the encoder 8322 applies DC-free coding such as 8-9 conversion coding or 8-10 conversion coding as the function of the modulation-subject signal processor 8301 to thereby prevent the existence of the modulated signal component near the carrier frequency and facilitate the injection locking on the reception side.

The multiplexer 8324 turns data to packets. If the injection locking detector on the reception side detects the injection locking based on the correlation with known patterns, the multiplexer 8324 periodically inserts a known signal waveform or a known data pattern (e.g. pseudo random signal: PN signal) based on setting information of the packet for the locking detection from the controller 8346.

The waveform shaper 8326 performs waveform shaping processing such as frequency characteristic correction, pre-emphasis, and band limitation based on setting information of waveform shaping from the controller 8346.

The transmission-side signal generating unit 8110A includes the modulation functional unit 8300 having a frequency mixer 8302 (modulator circuit) and a transmission-side local oscillator 8304 (transmission-side oscillator). Furthermore, the transmission-side signal generating unit 8110A includes a reference carrier signal processor 8306 having a phase amplitude adjusting circuit 8307 and a signal combiner 8308 besides the modulation functional unit 8300. In this example, the reference carrier signal processor 8306 treats the carrier signal itself output from the transmission-side local oscillator 8304 as the reference carrier signal. The reference carrier signal processor 8306 adjusts the amplitude and phase of the reference carrier signal by the phase amplitude adjusting circuit 8307 and supplies the resulting signal to the signal combiner 8308.

In the first example shown in FIG. 7A, the transmission-side local oscillator 8304 generates the carrier signal used for the modulation on the CMOS chip by using a tank circuit on the CMOS chip.

The second example shown in FIG. 7B is a configuration example in which a clock signal that can be used as the basis exists in the first communication device 100. In this example, the modulation functional unit 8300_2 includes a frequency multiplier 8303 at the previous stage of the transmission-side local oscillator 8304. The frequency multiplier 8303 multiplies the "clock signal that can be used as the basis" supplied from a clock signal generator (not shown) and supplies the multiplied signal to the transmission-side local oscillator 8304. The transmission-side local oscillator 8304 in the second example is a synchronous oscillator circuit and generates the carrier signal used for the modulation in synchronization with the multiplied signal.

The frequency mixer 8302 modulates the carrier signal generated by the transmission-side local oscillator 8304 by the processed input signal from the waveform shaper 8326 and supplies the resulting signal to the signal combiner 8308. The phase amplitude adjusting circuit 8307 sets the phase and amplitude of the reference carrier signal to be transmitted based on setting information of the phase and the amplitude from the controller 8346.

The signal combiner 8308 is provided to send the reference carrier signal to the reception side together with the modulated signal modulated to a millimeter-wave signal when the number of each of antennas 8136 and 8236 is one. The signal combiner 8308 is unnecessary if the modulated signal generated by the frequency mixer 8302 and the reference carrier signal generated by the reference carrier signal processor 8306 are transmitted by different antennas.

If the reference carrier signal is also sent out to the reception side together with the signal modulated to a millimeter-wave signal, the signal combiner 8308 performs processing of combining the modulated signal modulated to the millimeter-wave signal by the frequency mixer 8302 and the reference carrier signal from the phase amplitude adjusting circuit 8307 and passes the resulting signal to the amplifier 8117. If only the modulated signal modulated to the millimeter-wave signal by the frequency mixer 8302 is sent out to the reception side, the signal combiner 8308 does not perform the combining processing but passes only the modulated signal modulated to the millimeter-wave signal by the frequency mixer 8302 to the amplifier 8117. The amplifier 8117 adjusts the amplitude of the transmission output and the frequency characteristics for the millimeter-wave signal received from the signal combiner 8308 according to need, and supplies the resulting signal to the antenna 8136.

As is understood from the above description, in the case of sending out also the reference carrier signal to the reception side together with the signal modulated to a millimeter-wave signal, the modulation system and the circuit configuration of the frequency mixer 8302 also have relation to whether or not to make the signal combiner 8308 function. Depending on the modulation system and the circuit configuration of the frequency mixer 8302, it is possible to send out also the reference carrier signal to the reception side together with the signal modulated to a millimeter-wave signal even without the functioning of the signal combiner 8308.

In amplitude modulation and ASK, a modulator circuit of the carrier suppression system may be aggressively used as the frequency mixer 8302, and the reference carrier signal generated by the transmission-side local oscillator 8304 may also be transmitted together with the output of the frequency mixer 8302. In this case, a harmonic of the carrier signal used for the modulation can be used as the reference carrier signal, and the amplitude of the modulated signal and the reference carrier signal can be adjusted separately from each other. Specifically, gain adjustment is carried out in the amplifier 8117 with attention paid to the amplitude of the modulated signal, and simultaneously the amplitude of the reference carrier signal is also adjusted at this time. However, only the amplitude of the reference carrier signal can be adjusted by the phase amplitude adjusting circuit 8307 so that preferred amplitude may be obtained in terms of the injection locking.

[Configuration Example of Reception Side]

FIG. 8 shows the configuration of the reception-side signal generating unit 8220A (corresponding to the reception-side signal generating units 120 and 220) of the first embodiment. The reception-side signal generating unit 8220A of the first embodiment includes a controller 8446 to control the respective functional units. The reception-side signal generating unit 8220A includes a direct-current component suppressor 8407 and an injection locking detector 8442 at the subsequent stages of a demodulation functional unit 8400.

Although the provision of the controller 8446 is not essential, this function often exists on a CMOS chip or a board in recent various systems similarly to the controller 8346. The controller 8446 has functions for setting of the gain and frequency characteristics of an amplifier 8224, setting of the phase and amplitude of the received reference carrier signal, setting of the oscillation frequency, setting of the modulation mode, setting of the filter and equalization, setting of coding and multiplexing, and so forth. The respective pieces of setting information are supplied to the corresponding functional units.

The demodulation functional unit 8400 includes a frequency mixer 8402 (demodulator circuit), a reception-side local oscillator 8404 (reception-side oscillator circuit), and a phase amplitude adjuster 8406.

It would also be possible to dispose a circuit to extract only the reference carrier signal component (band-pass filter circuit or the like) on the side of the injection signal to the reception-side local oscillator 8404 (e.g. at the previous stage of the phase amplitude adjuster 8406). By employing this configuration, the modulated signal component and the reference carrier signal component are separated from the received millimeter-wave signal, and only the reference carrier signal component is supplied to the reception-side local oscillator 8404, so that the injection locking is facilitated.

The phase amplitude adjuster 8406 sets the phase and amplitude of the received reference carrier signal based on setting information of the phase and the amplitude from the controller 8446. Although the diagram shows the configuration in which the phase amplitude adjuster 8406 is disposed on the side of the input terminal of the injection signal to the reception-side local oscillator 8404, a configuration in which the phase amplitude adjuster 8406 is disposed on the signal path between the reception-side local oscillator 8404 and the frequency mixer 8402 may be employed, or alternatively both of the configurations may be employed.

The direct-current component suppressor 8407 suppresses the unnecessary direct-current component (direct-current offset component) included in the synchronous detection signal output from the frequency mixer 8402. For example, in the case of transmitting also the reference carrier signal from the transmission side to the reception side together with the modulated signal, possibly a large direct-current offset component arises in the synchronous detection signal depending on the phase relationship between the modulated signal and the reference carrier signal. The direct-current component suppressor 8407 functions to remove the direct-current offset component.

The controller 8446 includes a functional part of an injection locking adjuster that carries out locking adjustment based on information indicating the state of the injection locking detected by the injection locking detector 8442 so that the demodulation carrier signal generated by the reception-side local oscillator 8404 may be locked with the modulation carrier signal. An injection locking controller 8440 is configured by the injection locking detector 8442 and the functional part (injection locking adjuster) relating to the injection locking adjustment in the controller 8446.

The injection locking detector 8442 determines the state of the injection locking based on the baseband signal acquired by the frequency mixer 8402, and notifies the controller 8446 of the determination result. Although the diagram shows the configuration in which the output signal of the direct-current component suppressor 8407 is detected, a configuration in which the input side of the direct-current component suppressor 8407 is detected may be employed.

The "state of the injection locking" refers to the state relating to whether or not the output signal (oscillator circuit output) output from the reception-side local oscillator 8404 is locked with the reference carrier signal of the transmission side. The state in which the oscillator circuit output and the reference carrier signal of the transmission side are locked with each other will be represented also as "the injection locking is achieved."

The reception-side signal generating unit 8220A controls at least one of the free-running oscillation frequency of the reception-side local oscillator 8404 and the amplitude (injection amplitude) and phase (injection phase) of the injection signal to the reception-side local oscillator 8404 so that the injection locking may be achieved. Which factor is to be controlled depends on the system configuration, and all of the factors do not necessarily need to be controlled.

For example, in order that the injection locking is achieved, the controller 8446 controls the free-running oscillation frequency of the reception-side local oscillator 8404 and controls the injection amplitude and injection phase of the injection signal to the reception-side local oscillator 8404 via the phase amplitude adjuster 8406 in linkage with the detection result by the injection locking detector 8442.

For example, first, the millimeter-wave signal (modulated signal and reference carrier signal) sent from the transmission side via the millimeter-wave signal transmission path 9 passes through the antenna 8236 and is amplified by the amplifier 8224. Part of the amplified millimeter-wave signal is injected to the reception-side local oscillator 8404 after the amplitude and phase thereof are adjusted by the phase amplitude adjuster 8406. The frequency mixer 8402 carries out frequency conversion of the millimeter-wave signal from the amplifier 8224 to the baseband signal by the output signal (reproduction carrier signal) from the reception-side local oscillator 8404. Part of the converted baseband signal is input to the injection locking detector 8442, and information for determining whether or not the reception-side local oscillator 8404 is locked with the reference carrier signal of the transmission side is acquired by the injection locking detector 8442 and informed to the controller 8446.

Based on the information on "the state of the injection locking" (referred to as the injection locking determination information) from the injection locking detector 8442, the controller 8446 determines whether or not the locking is achieved by using either one or both of the following two techniques.

1) The injection locking detector 8442 takes the correlation between the restored waveform and known signal waveforms and known data patterns and employs the correlation result as the injection locking determination information. It is determined by the controller 8446 that the locking is achieved when a strong correlation is obtained.

2) The injection locking detector 8442 monitors the direct-current component of the demodulated baseband signal and employs the monitoring result as the injection locking determination information. It is determined by the controller 8446 that the locking is achieved when the direct-current component is stable.

Various techniques would be available as the mechanism of the above-described techniques 1) and 2) although detailed description thereof is omitted here. Furthermore, other techniques besides the techniques 1) and 2) would also be possible as the technique for determining whether or not the locking is achieved, and these techniques can also be employed for the present embodiment.

If it is determined by the controller 8446 that the injection locking is not achieved, in accordance with the predetermined procedure, the controller 8446 changes the setting information of the oscillation frequency to the reception-side local oscillator 8404 and the setting information of the amplitude and the phase to the phase amplitude adjuster 8406 so that the carrier signal used for the modulation on the transmission side and the signal (oscillator circuit output) output from the reception-side local oscillator 8404 may be locked with each other (injection locking may be achieved). Thereafter, the controller 8446 repeats the procedure of determining the injection locking state again until favorable locking is achieved.

The baseband signal obtained as the result of correct injection locking of the reception-side local oscillator 8404 and frequency conversion (synchronous detection) by the frequency mixer 8402 is supplied to a filter processor 8410. In the filter processor 8410, an equalizer 8414 is provided besides a low-pass filter 8412. The equalizer 8414 has an equalizer (e.g. waveform equalizing) filter that adds the gain corresponding to the lowering to the high-frequency band of the received signal in order to reduce inter-code interference for example.

The high-frequency component of the baseband signal is removed by the low-pass filter 8412, and the high-frequency component thereof is corrected by the equalizer 8414.

A clock reproducer 8420 has a symbol synchronizer 8422, a decoder 8424, and a demultiplexer 8426. The decoder

8424 corresponds to the encoder 8322 and the demultiplexer 8426 corresponds to the multiplexer 8324. Each of them performs processing opposite to that of the transmission side. The clock reproducer 8420 carries out symbol synchronization by the symbol synchronizer 8422 and thereafter restores the original input signal based on setting information of the coding pattern and setting information of multiplexing from the controller 8446.

The microminiaturization of the CMOS will be further advanced in the future and the operating frequency thereof will be further raised. To realize a small-size transmission system in a higher band, using a high carrier frequency is desired. The injection locking system of the present example can relax the requirement specifications about the stability of the oscillation frequency, and thus allows the higher carrier frequency to be easily used. The reception-side local oscillator 8404, which oscillates by the injection locking, needs to have such a low quality factor as to be capable of following frequency variation on the transmission side as is apparent from expression (A). This is convenient for the case of forming the whole of the reception-side local oscillator 8404 including a tank circuit on a CMOS. Of course, an oscillator circuit having a circuit configuration similar to that of the reception-side local oscillator 8404 may be used as the transmission-side local oscillator 8304, and the whole of the transmission-side local oscillator 8304 including a tank circuit can be formed on the CMOS.

Injection Locking System: Second Embodiment

Figure 9B:
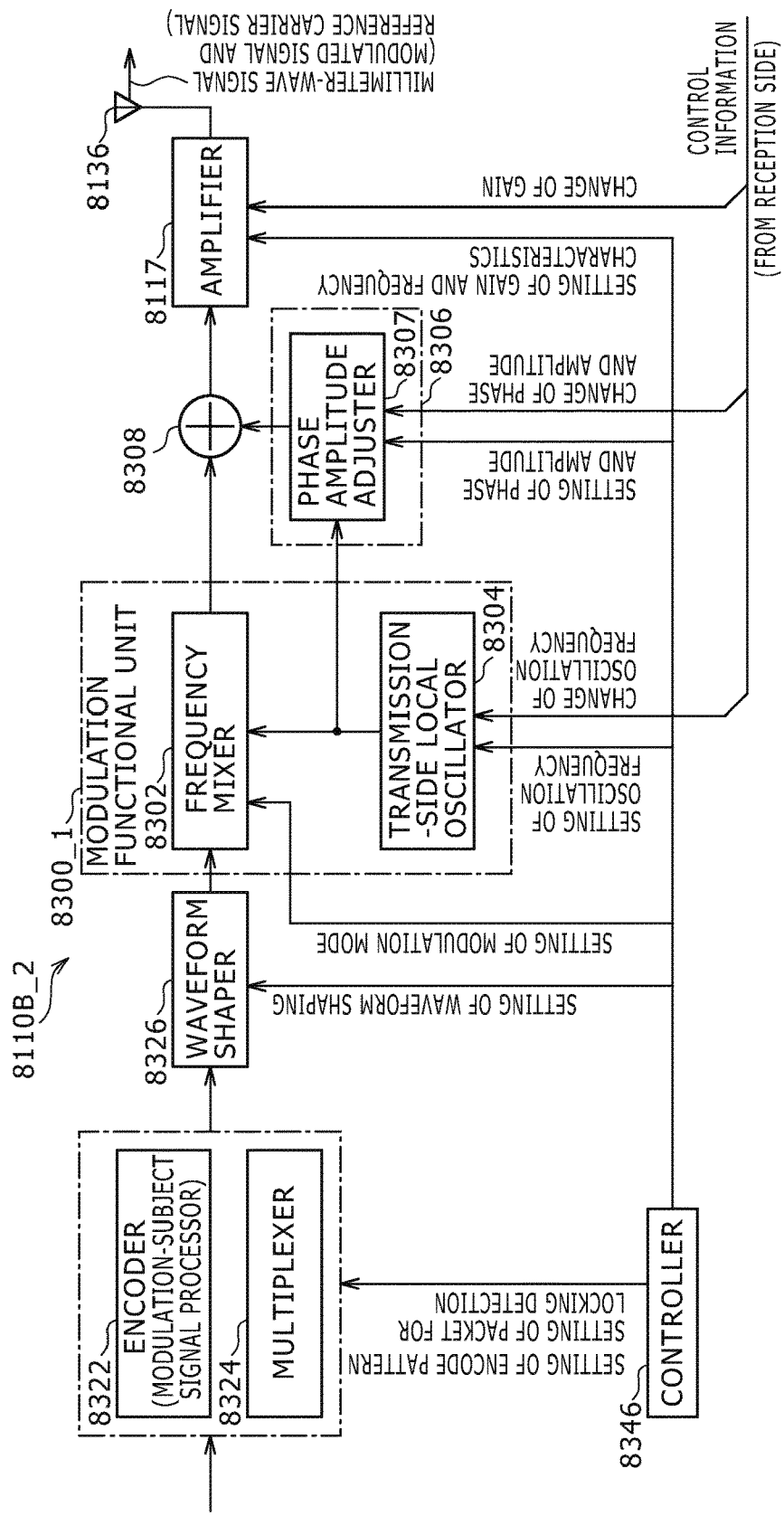
FIG. 9B is a diagram for explaining a configuration example of the transmitter side employing the injection locking system according to the second embodiment (second example)
Figure 10A:
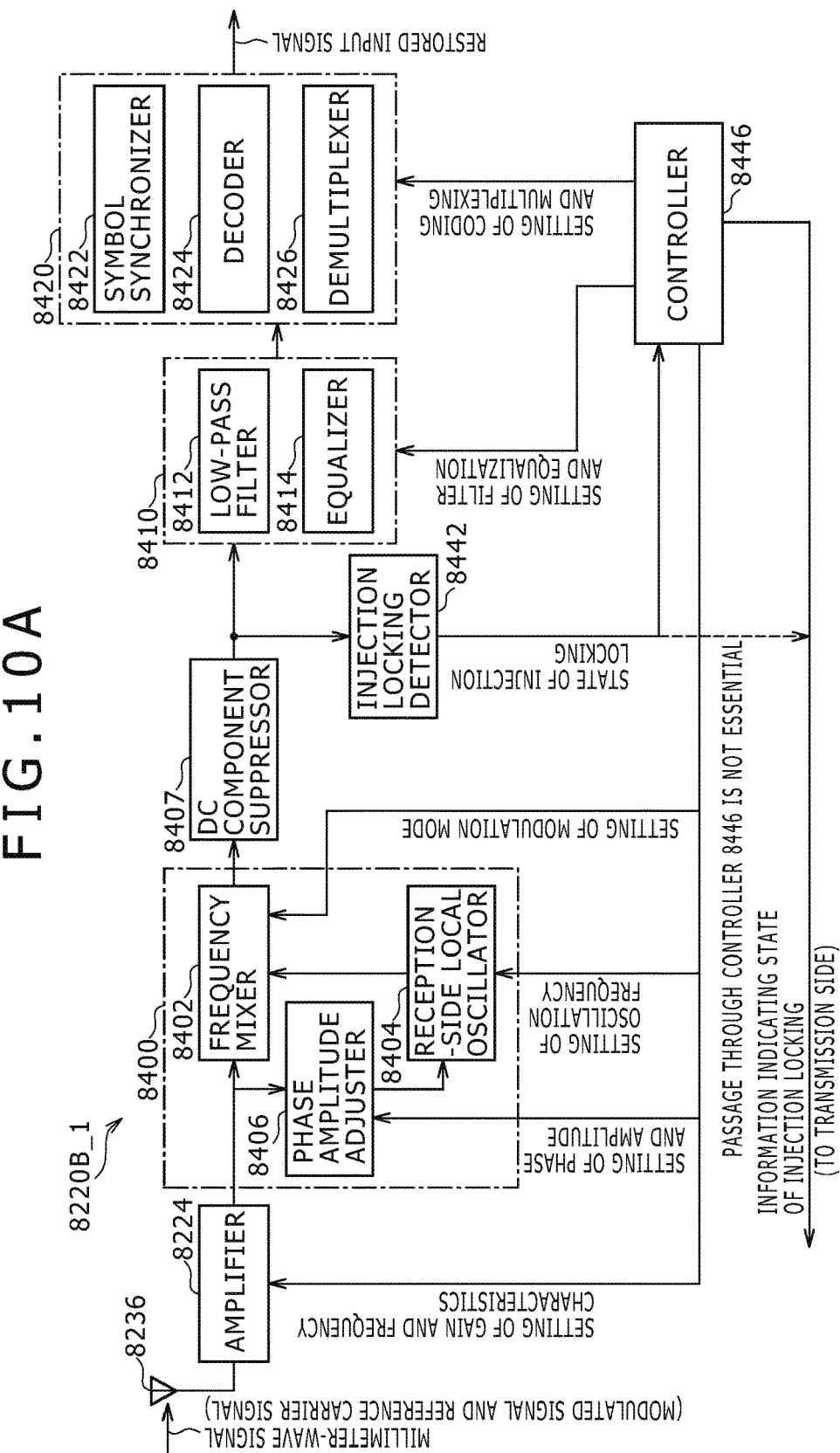
FIG. 10A is a diagram for explaining a configuration example of the receiver side employing the injection locking system according to the second embodiment (first example)
Figure 10B:
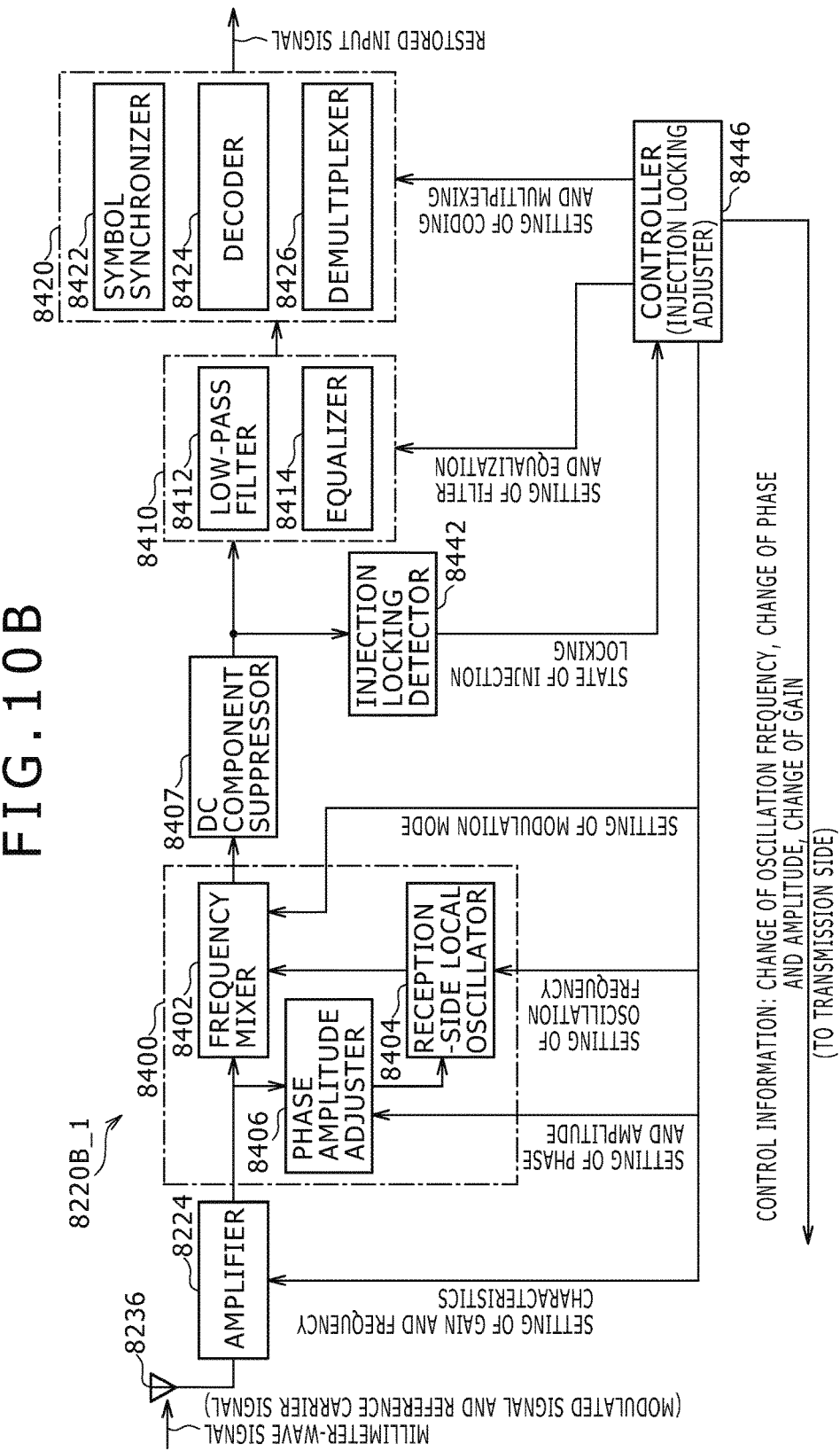
FIG. 10B is a diagram for explaining a configuration example of the receiver side employing the injection locking system according to the second embodiment (second example)

FIGS. 9A and 9B are diagrams for explaining configuration examples of the transmitter side employing the injection locking system according to a second embodiment of the present invention. FIGS. 10A and 10B are diagrams for explaining configuration examples of the receiver side employing the injection locking system according to the second embodiment.

The second embodiment relates to a configuration employing a system in which control to allow achievement of injection locking is carried out by adjusting the functional units on the transmission side. The second embodiment can employ various configurations depending on what information to be sent from the reception side to the transmission side for carrying out the control to allow achievement of injection locking by adjusting the functional units on the transmission side and whether the main controlling entity is disposed on the transmission side or on the reception side. In the following, regarding two representative examples among the various configurations, only the differences from the first embodiment will be described.

A wireless transmission system 1B 1 of the second embodiment (first example) is configured by the combination of a transmission-side signal generating unit 8110B_1 of the second embodiment (first example) shown in FIG. 9A and a reception-side signal generating unit 8220B_1 of the second embodiment (first example) shown in FIG. 10A. A wireless transmission system 1B 2 of the second embodiment (second example) is configured by the combination of a transmission-side signal generating unit 8110B_2 of the second embodiment (second example) shown in FIG. 9B and a reception-side signal generating unit 8220B_2 of the second embodiment (second example) shown in FIG. 10B.

The first example of the second embodiment relates to a configuration in which the injection locking determination information is sent to the transmission side and the main controlling entity is disposed on the transmission side. Specifically, a controller 8446 in the reception-side signal generating unit 8220B_1 sends the injection locking determination information acquired by an injection locking detector 8442 to a controller 8346 in the transmission-side signal generating unit 8110B_1. The controller 8446 only intervenes in the transmission of the injection locking determination information to the transmission side and does not serve as the main controlling entity in the actual condition. The injection locking detector 8442 may send the injection locking determination information directly to the controller 8346 in the transmission-side signal generating unit 8110B_1 without the intermediary of the controller 8446.

The controller 8346 includes a functional part of an injection locking adjuster that carries out locking adjustment based on information indicating the state of the injection locking detected by the injection locking detector 8442 on the reception side so that the demodulation carrier signal generated by a reception-side local oscillator 8404 may be locked with the modulation carrier signal. An injection locking controller similar to the injection locking controller 8440 is configured by the injection locking detector 8442 and the functional part (injection locking adjuster) relating to the injection locking adjustment in the controller 8346.

The controller 8346 controls the free-running oscillation frequency of a transmission-side local oscillator 8304 and the transmission amplitude (transmission power) of the millimeter-wave signal so that the injection locking may be achieved. A technique similar to that for the controller 8446 can be employed as the technique for determining whether or not the locking is achieved.

If it is determined by the controller 8346 that the injection locking is not achieved, in accordance with the predetermined procedure, the controller 8346 changes the setting information of the oscillation frequency to the transmission-side local oscillator 8304 and the setting information of the amplitude and the phase to a phase amplitude adjusting circuit 8307, and changes the setting information of the gain to an amplifier 8117. If amplitude modulation or the ASK system is employed, the amplitude of the non-modulated component of the carrier signal included in the millimeter-wave signal may be adjusted by controlling the modulation index. Thereafter, the controller 8346 repeats the procedure of determining the injection locking state again until favorable locking is achieved.

The second example of the second embodiment relates to a configuration in which the main controlling entity is disposed on the reception side and the transmission side is controlled from the reception side by sending a control command to the transmission side. Specifically, the controller 8446 determines whether or not the locking is achieved based on the injection locking determination information acquired by the injection locking detector 8442. If it is determined that the injection locking is not achieved, the controller 8446 sends a control command for controlling a modulation functional unit 8300 and the amplifier 8117 to the transmission side. That is, the controller 8446 directly controls the modulation functional unit 8300 and the amplifier 8117. In other words, the controller 8346 does not carry out control to change the pieces of setting information relating to the injection locking although it carries out the initial setting of the oscillation frequency and the phase and amplitude of the reference carrier signal for the modulation functional unit 8300 and carries out the initial setting of the gain for the amplifier 8117.

If it is determined by the controller 8446 that the injection locking is not achieved, in accordance with the predetermined procedure, the controller 8446 changes the setting information of the oscillation frequency to the transmission-side local oscillator 8304 and the setting information of the amplitude and the phase to the phase amplitude adjusting circuit 8307, and changes the setting information of the gain to the amplifier 8117 similarly to the controller 8346 of the first example. If amplitude modulation or the ASK system is employed, the amplitude of the non-modulated component of the carrier signal included in the millimeter-wave signal may be adjusted by controlling the modulation index. Thereafter, the controller 8446 repeats the procedure of determining the injection locking state again until favorable locking is achieved.

<Configuration Example of Oscillator Circuit>

FIGS. 11A to 11E are diagrams for explaining a configuration example of the oscillator circuit used as the transmission-side local oscillator 8304 and the reception-side local oscillator 8404. FIG. 11A shows a circuit configuration example of the oscillator circuit. FIG. 11B shows a layout pattern example of an inductor circuit on a CMOS. FIGS. 11C to 11E are diagrams for explaining the details of the layout pattern example of the inductor circuit on the CMOS.

The oscillator circuit shown here is the differential negative resistance oscillator circuit 8500 having a tank circuit (LC resonant circuit) composed of general inductors and capacitors, and all of the constituent elements (oscillating elements) including the tank circuit are formed on the same semiconductor substrate (silicon substrate).

The differential negative resistance oscillator circuit 8500 includes a current source 8510, a negative resistance circuit 8520 formed of a pair of cross-coupled differential transistors (transistors 8522_1 and 8522_2), and a tank circuit 8530 formed of an LC circuit (inductor circuit 8532 and capacitor circuit 8534).

The respective sources of the transistors 8522_1 and 8522_2 are connected to the output terminal of the current source 8510 in common. The gate of the transistor 8522_1 is connected to the drain of the transistor 8522_2 and the gate of the transistor 8522_2 is connected to the drain of the transistor 8522_1, so that a cross-coupled configuration is formed.

The inductor circuit 8532 is connected between the respective drains of the transistors 8522_1 and 8522_2 and a power supply Vdd.

The inductor circuit 8532 is represented by a series circuit of an inductance component 8532L_1 and a resistance component 8532R_1 on the side of the transistor 8522_1 and a series circuit of an inductance component 8532L_2 and a resistance component 8532R_2 on the side of the transistor 8522_2. The capacitor circuit 8534 is connected between the drains of the transistors 8522_1 and 8522_2. The inductance component 8532L is an inductive component generated by a winding, and the resistance component 8532R is equivalent to the loss thereof (series resistive component).

The inductor circuit 8532 is disposed on an insulating layer that insulates the oscillating elements such as the current source 8510, the negative resistance circuit 8520, and the capacitor circuit 8534 on the same chip as that of the CMOS on which the transmission-side signal generating unit 8110, the reception-side signal generating unit 8220, and so forth are formed. That is, the whole of the differential negative resistance oscillator circuit 8500 including the tank circuit 8530 is integrated into one chip with the transmission-side signal generating unit 8110 and the reception-side signal generating unit 8220.

The capacitor circuit 8534 is represented by a parallel circuit of a capacitor component 8534C_1 and a conductance component 8534R_1 on the side of the transistor 8522_1 and a parallel circuit of a capacitor component 8534C_2 and a conductance component 8534R_2 on the side of the transistor 8522_2. The capacitor component 8534C is e.g. an element utilizing a capacitive component generated between the terminals by applying a reverse bias voltage across a diode, and a varicap diode (variable-capacitance diode, varactor) or the like is used as the capacitor component 8534C. The conductance component 8534R is the loss component of the varicap diode.

Connecting nodes a and b between the negative resistance circuit 8520 and the tank circuit 8530 (inductor circuit 8532 and capacitor circuit 8534) serve as the signal output terminals of the differential negative resistance oscillator circuit 8500 and are connected to the frequency mixer 8402 by a differential signal. In addition, the connecting nodes a and b serve also as the input terminals of the injection signal. The input of the injection signal to the connecting nodes a and b is made via a current source.

If the center frequency of the injection signal is the same as the carrier frequency of the modulated signal, the output signal of the connecting nodes a and b is used as the reproduction carrier signal to the frequency mixer 8402 (via the phase amplitude adjuster 8406, depending on the configuration). If an N-th harmonic of the carrier signal used for the modulation is used as the reference carrier signal, the signal obtained by frequency division of the output signal of the connecting nodes a and b to 1/N is used as the reproduction carrier signal to the frequency mixer 8402 (via the phase amplitude adjuster 8406, depending on the configuration).

In the differential negative resistance oscillator circuit 8500, the transistors 8522_1 and 8522_2 are alternately turned on and off and thereby a current limited by the current source 8510 is made to flow to the drain side. Because the tank circuit 8530 (resonant circuit) is provided on the drain side, the differential negative resistance oscillator circuit 8500 carries out free-running oscillation at the resonant frequency defined by the element constant of the inductor circuit 8532 and the capacitor circuit 8534 included in the tank circuit 8530 even when the injection signal is not supplied thereto. For example, the free-running oscillation frequency of the differential negative resistance oscillator circuit 8500 can be adjusted by adjusting the reverse bias voltage of the varicap diode included in the capacitor circuit 8534.

In the layout pattern example of the inductor circuit 8532 shown in FIG. 11B, line ring patterns having a substantially octagonal shape are formed in a spiral manner in plural layers by metal layer patterns, and thereby one pair of substantially-circular coils whose number of turns is n is formed. For example, if the side of the power supply Vdd and the side of the connecting nodes a and b are disposed on the opposite sides across the circle, a coil whose number of turns is n is obtained by 2n layers. One of circular coils 8550 is represented by the series circuit of the inductance component 8532L_1 and the resistance component 8532R_1, and the other is represented by the series circuit of the inductance component 8532L_2 and the resistance component 8532R_2.

This diagram shows the case of n=1.5. Of the line layers for forming the coils 8550, the layer in which the lead-out pattern of the power supply Vdd is disposed is regarded as the uppermost layer (e.g. ninth line layer) and the layer in which the lead-out pattern of the connecting nodes a and b is disposed is regarded as the lowermost layer (e.g. seventh line layer). In addition, one layer between these layers (e.g. eighth line layer) is also used. Thereby, the 1.5-turn coil 8550_1 (series circuit of the inductance component 8532L_1 and the resistance component 8532R_1) and the 1.5-turn coil 8550_2 (series circuit of the inductance component 8532L_2 and the resistance component 8532R_2) are formed.

As shown in FIG. 11B, the coils 8550_1 and 8550_2 are in a double spiral state (state obtained by combining outside line ring patterns and an inside line ring pattern) as a whole. Specifically, the spiral of the coil 8550_1 on the side of the transistor 8522_1 is made as follows. The spiral line is started from the power supply lead-out pattern in the ninth line layer and continuously routed half round a circle anticlockwise by an outside line ring pattern 8552_91 in the ninth line layer to be led to the eighth line layer via a contact hole 8554 (FIG. 11C). Then the spiral line is routed half round a circle anticlockwise by an inside line ring pattern 8552_82 in the eighth line layer to be led to the seventh line layer via a contact hole 8555 (FIG. 11D). Then the spiral line is routed half round a circle anticlockwise by an outside line ring pattern 8552_71 (formed below the line ring pattern 8552_91) in the seventh line layer to be led to the connecting node a (FIG. 11E).

The spiral of the coil 8550_2 on the side of the transistor 8522_2 is made as follows. The spiral line is started from the power supply lead-out pattern in the ninth line layer and continuously routed half round a circle clockwise by an outside line ring pattern 8552_92 in the ninth line layer to be led to the eighth line layer via a contact hole 8556 (FIG. 11C). Then the spiral line is routed half round a circle clockwise by an inside line ring pattern 8552_81 in the eighth line layer to be led to the seventh line layer via a contact hole 8557 (FIG. 11D). Then the spiral line is routed half round a circle clockwise by an outside line ring pattern 8552_72 (formed below the line ring pattern 8552_92) in the seventh line layer to be led to the connecting node b (FIG. 11E).

If the magnetic permeability is defined as p, the number of turns is defined as n, and the radius is defined as r, the inductor value L of the inductance components 8532L_1 and 8532L_2 of the circular coils can be approximated to "$\mu \cdot (n^2) \cdot r$" as shown in Thomas Lee, "The Design of CMOS Radio-Frequency Integrated Circuits" (Particularly "4.5.1 SPIRAL INDUCTORS," pp. 136 to 137), ISBN 0-521-83539-9 (hereinafter, reference document F).

The resistance value R of the resistance components 8532R_1 and 8532R_2, which are connected in series to the inductance components 8532L_1 and 8532L_2 shown in FIGS. 11A and 11B, greatly depends on the line width W of the circular coil (metal layer pattern) shown in FIGS. 11C to 11E. Because the resistance value R of the line is substantially in inverse proportion to the line width W, the line width W needs to be set large to make the inductor having a high quality factor.

When the inductor whose quality factor is high (i.e. resistance value R of the resistance components 8532R_1 and 8532R_2 is small) is fabricated to make a carrier having high stability, the line width W is large and the number n of turns that can be provided with the same radius r is small. Conversely, if a large resistance value R can be permitted, the same inductance value L can be realized by the inductor having a small size (radius r) by setting the line width W small. A method based on the injection locking is effective to demodulate a signal transmitted by a carrier with relaxed stability by a small circuit having a low quality factor on the reception side.

The reason why a "small circuit" may be used is not only because the quality factor may be low but also because the carrier frequency is as high as several tens of GHz due to the use of the millimeter wave band and thus the inductor value L of the inductor circuit 8532 and the capacitance value C of the capacitor circuit 8534 for realizing the desired impedance can be decreased in proportion to the frequency. Furthermore, the factors in that a "small circuit" may be used include also the fact that, in the case of fabricating the tank circuit 8530 for resonance by using inductors and capacitors, the tank circuit 8530 can be realized with smaller inductor value and capacitance value if the frequency is enhanced.

For the above-described reasons, all of the oscillating elements including the tank circuit 8530 can be formed on a semiconductor chip having a CMOS configuration by using the differential negative resistance oscillator circuit 8500 described above as the transmission-side local oscillator 8304 and the reception-side local oscillator 8404. The transmission-side local oscillator 8304 and the reception-side local oscillator 8404 can be formed without the provision of a tank circuit outside the semiconductor chip. A one-chip oscillator circuit (semiconductor integrated circuit (IC)) having a built-in tank circuit is realized.

The transmission-side local oscillator 8304 can be integrated into one chip with other transmission-side functional units in the transmission-side signal generating units 110 and 210 including the frequency mixer 8302 and can be provided as a wireless communication device (semiconductor integrated circuit) for transmission. The reception-side local oscillator 8404 can be integrated into one chip with other reception-side functional units in the reception-side signal generating units 120 and 220 including the frequency mixer 8402 and can be provided as a wireless communication device (semiconductor integrated circuit) for reception. Furthermore, these wireless communication devices (integrated semiconductor circuits) for transmission and reception can be further integrated with each other into one chip and can be provided as a wireless communication device (semiconductor integrated circuit) for bidirectional communication. A one-chip communication circuit (IC) having a built-in tank circuit is realized.

<Relationship Between Multi-Channel Transmission and Injection Locking>

Figure 12A:
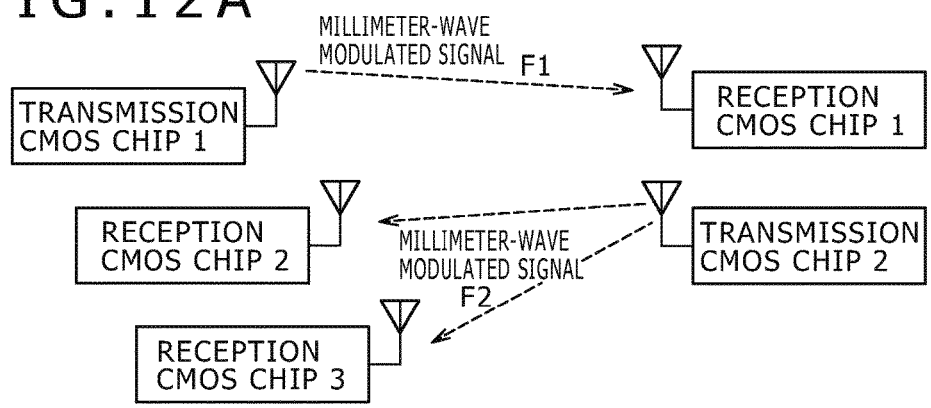
FIGS. 12A to 12D are diagrams for explaining the relationship between multi-channel transmission and the injection locking.

FIGS. 12A to 12D are diagrams for explaining the relationship between multi-channel transmission and the injection locking. As shown in FIG. 12A, for the multi-channel transmission, different carrier frequencies are used by different pairs of communication transmitter and receiver. That is, the multi-channel transmission is realized by frequency division multiplexing. Full-duplex bidirectional transmission can also be easily realized by using different carrier frequencies, and it is also possible to realize a situation in which plural semiconductor chips (i.e. transmission-side signal generating unit 110 and reception-side signal generating unit 220) communicate each other independently in the housing of an imaging device.

Figure 12B:
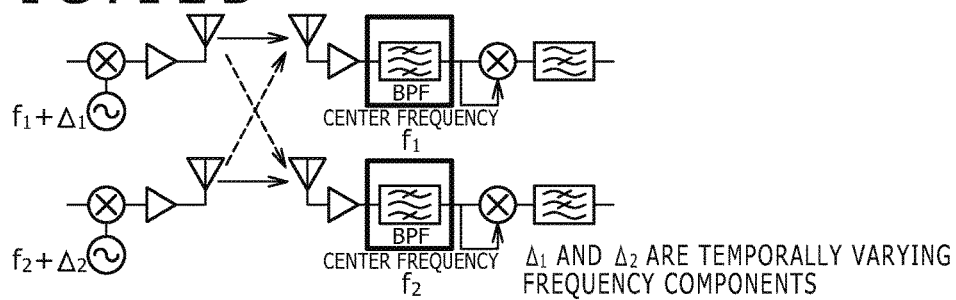
Figure 12C:
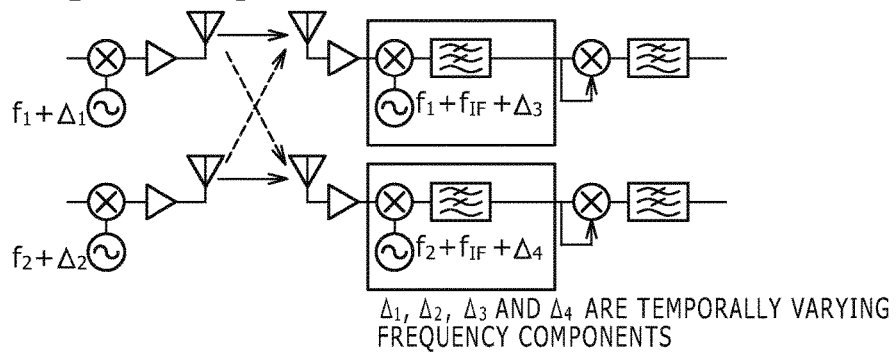
Figure 12D:
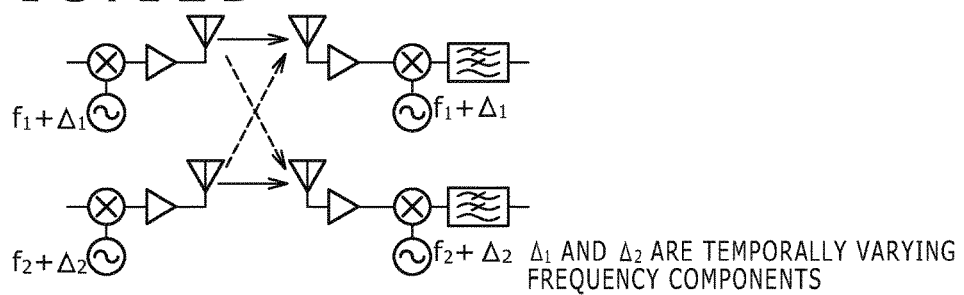

For example, a consideration will be made below about situations in which two pairs of transmitter and receiver simultaneously perform independent transmission as shown in FIGS. 12B to 12D. If a squared detection system is employed as shown in FIG. 12B, a band-pass filter (BPF) for frequency selection on the reception side is necessary for the multi-channel transmission by the frequency division multiplexing system also as described above. It is not easy to realize a sharp band-pass filter having a small size, and a variable band-pass filter is necessary to change the selected frequency. Because the transmission is affected by a temporally varying frequency component (frequency variation component Δ) on the transmission side, the modulation system is limited to one that allows ignorance of the influence of the frequency variation component Δ (e.g. OOK), and it is also difficult to make the modulated signal be in quadrature to enhance the data transmission rate.

If a PLL for carrier synchronization is not provided on the reception side for size reduction, it would be possible to carry out squared detection after down-conversion to the intermediate frequency (IF) as shown in FIG. 12C for example. In this case, by adding a block for the frequency conversion to a sufficiently-high IF, the signal to be received can be selected without a band-pass filter. However, the circuit becomes more complicated correspondingly. The transmission is affected not only by the frequency variation component Δ on the transmission side but also by a temporally varying frequency component (frequency variation component Δ) in the down-conversion on the reception side. Thus, the modulation system is limited to one in which amplitude information is extracted (e.g. ASK or OOK) so that the influence of the frequency variation component Δ can be ignored.

In contrast, if the injection locking system is employed as shown in FIG. 12D, the transmission-side local oscillator 8304 and the reception-side local oscillator 8404 are completely locked with each other, and therefore various modulation systems can be easily realized. The PLL for carrier synchronization is also unnecessary and the circuit scale may also be small, and the selection of the reception frequency is also easier. In addition, the oscillator circuit of the millimeter wave band can be realized by using a tank circuit whose time constant is smaller compared with a lower frequency, and thus the time required for the injection locking is also shorter compared with the lower frequency. Therefore, this system is suitable for high-speed transmission. As just described, by employing the injection locking system, the transmission speed can be easily enhanced and the number of input/output terminals can be reduced compared with inter-chip transmission by a normal baseband signal. It is also possible to form a small antenna for millimeter waves on the chip, and it is also possible to give significantly-large flexibility to the way of signal extraction from the chip. Moreover, because the frequency variation component Δ on the transmission side is cancelled by the injection locking, various modulation systems such as phase modulation (e.g. quadrature modulation) are permitted.

Even when the multi-channel transmission by the frequency division multiplexing is realized, the reception side can restore the transmission signal without suffering from the influence of the frequency variation A of the carrier signal (influence of so-called interference) by reproducing the signal locked with the carrier signal used for the modulation on the transmission side and carrying out frequency conversion by synchronous detection. As shown in FIG. 12D, a band-pass filter serving as the frequency selection filter does not have to be disposed at the previous stage of the frequency conversion circuit (down-converter).

<Transmission Path Structure>

First Example

FIGS. 13A1 to 13A5 are diagrams for explaining a first example of the wireless transmission path structure of the embodiments. The transmission path structure of the first example is an application example in which signal transmission is performed by millimeter waves in the housing of one piece of electronic apparatus. In this application example, an imaging device including a solid-state imaging device is employed as the electronic apparatus.

This imaging device has a system configuration in which the first communication device 100 is mounted on the main board on which a control circuit, an image processing circuit, and so forth are mounted and the second communication device 200 is mounted on an imaging board on which the solid-state imaging device is mounted. In FIGS. 13A1 to 13A5, a schematic sectional view of an imaging device 500 is shown with focus on millimeter-wave signal transmission between the boards, and diagrammatic representation of parts having no relation to the millimeter-wave signal transmission is accordingly omitted.

In a housing 590 of the imaging device 500, an imaging board 502 and a main board 602 are disposed. A solid-state imaging device 505 is disposed on the imaging board 502. For example, the solid-state imaging device 505 is a charge coupled device (CCD) and the driving part thereof (horizontal driver and vertical driver) is also mounted on the imaging board 502. Alternatively, the solid-state imaging device 505 is a complementary metal-oxide semiconductor (CMOS) sensor.

The first communication device 100 (semiconductor chip 103) is mounted on the main board 602 for performing signal transmission with the imaging board 502, on which the solid-state imaging device 505 is mounted. The second communication device 200 (semiconductor chip 203) is mounted on the imaging board 502. As described above, in the semiconductor chips 103 and 203, the signal generating units 107 and 207 and the transmission path couplers 108 and 208 are provided.

The solid-state imaging device 505 and an imaging driver are mounted on the imaging board 502 although not shown in the diagram. An image processing engine is mounted on the main board 602 although not shown in the diagram. An operating unit and various kinds of sensors (not shown) are connected to the main board 602. The main board 602 can be connected to a personal computer and peripheral apparatus such as a printer via an external interface (not shown). In the operating unit, e.g. a power supply switch, a setting dial, a jog dial, a decision switch, a zoom switch, a release switch, etc. are provided.

The solid-state imaging device 505 and the imaging driver are equivalent to the application functional part of the LSI functional unit 204 in the wireless transmission system 1. The signal generating unit 207 and the transmission path coupler 208 may be housed in the semiconductor chip 203 different from that of the solid-state imaging device 505, or may be fabricated integrally with the solid-state imaging device 505 and the imaging driver. If they are provided as separate units, signal transmission between these units and the solid-state imaging device 505 (e.g. between the semiconductor chips) would possibly involve a problem attributed to signal transmission by electrical lines. Therefore, it is preferable to integrally fabricate these units. This application example is based on the assumption that these units are in the semiconductor chip 203 different from that of the solid-state imaging device 505 and the imaging driver. The antenna 236 may be disposed as a patch antenna outside the chip, or may be formed as an inverted-F antenna in the chip. In millimeter wave communication, because the wavelength of millimeter waves is as short as several millimeters, the antenna also has a small size of several-mm-square order, and the patch antenna can be easily set even in a small place like an area in the imaging device 500.

The image processing engine is equivalent to the application functional part of the LSI functional unit 104 in the wireless transmission system 1. An image processor to process an imaging signal obtained by the solid-state imaging device 505 is housed in the image processing engine. The signal generating unit 107 and the transmission path coupler 108 may be housed in the semiconductor chip 103 different from that of the image processing engine, or may be fabricated integrally with the image processing engine. If they are provided as separate units, signal transmission between these units and the image processing engine (e.g. between the semiconductor chips) would possibly involve a problem attributed to signal transmission by electrical lines. Therefore, it is preferable to integrally fabricate these units. This application example is based on the assumption that these units are in the semiconductor chip 103 different from that of the image processing engine. The antenna 136 may be disposed as a patch antenna outside the chip, or may be formed as an inverted-F antenna in the chip.

Besides the image processor, a control circuit such as a camera controller including a central processing unit (CPU), a memory unit (work memory, program ROM, etc.), and so forth, a control signal generating unit, and so forth are also housed in the image processing engine. The camera controller reads out a program stored in the program ROM into the work memory and controls the respective units in the imaging device 500 in accordance with the program.

The camera controller controls the whole of the imaging device 500 based on a signal from the respective switches of the operating unit and supplies power to the respective units by controlling the power supply unit. Furthermore, the camera controller carries out communication such as transfer of image data with peripheral apparatus via the external interface.

The camera controller carries out sequence control relating to photographing. For example, the camera controller controls the imaging operation of the solid-state imaging device 505 via a synchronization signal generating unit and the imaging driver. The synchronization signal generating unit generates the basic synchronization signal necessary for signal processing. The imaging driver receives the synchronization signal generated by the synchronization signal generating unit and a control signal from the camera controller to generate a detailed timing signal for driving the solid-state imaging device 505.

The image signal (imaging signal) sent from the solid-state imaging device 505 to the image processing engine may be either an analog signal or a digital signal. In the case of a digital signal, an AD converter is mounted on the imaging substrate 502 if the solid-state imaging device 505 does not include an AD converter no matter whether it is a CCD or a CMOS.

Besides the solid-state imaging device 505, the signal generating unit 207 and the transmission path coupler 208 are mounted on the imaging board 502 to realize the wireless transmission system 1. Similarly, the signal generating unit 107 and the transmission path coupler 108 are mounted on the main board 602 to realize the wireless transmission system 1. The transmission path coupler 208 on the imaging board 502 and the transmission path coupler 108 on the main board 602 are coupled to each other by the millimeter-wave signal transmission path 9. Thereby, bidirectional signal transmission in the millimeter wave band is performed between the transmission path coupler 208 on the imaging board 502 and the transmission path coupler 108 on the main board 602.

If unidirectional communication is enough, the signal generating unit 107 and the transmission path coupler 108 are disposed on the transmission side, and the signal generating unit 207 and the transmission path coupler 208 are disposed on the reception side. For example, in the case of transmitting only the imaging signal acquired by the solid-state imaging device 505, the imaging board 502 is used as the transmission side and the main board 602 is used as the reception side. In the case of transmitting only the signals for controlling the solid-state imaging device 505 (e.g. high-speed master clock signal, control signal, synchronization signal), the main board 602 is used as the transmission side and the imaging board 502 is used as the reception side.

Due to the millimeter wave communication between two antennas 136 and 236, the image signal acquired by the solid-state imaging device 505 is carried on millimeter waves and transmitted to the main board 602 via the millimeter-wave signal transmission path 9 between the antennas 136 and 236. Various kinds of control signals to control the solid-state imaging device 505 are carried on millimeter waves and transmitted to the imaging board 502 via the millimeter-wave signal transmission path 9 between the antennas 136 and 236.

The millimeter-wave signal transmission path 9 may have either a form in which the antennas 136 and 236 are so disposed as to be opposed to each other or a form in which the antennas 136 and 236 are so disposed as to be shifted from each other along the planar direction of the boards. In the form in which the antennas 136 and 236 are so disposed as to be opposed to each other, e.g. a patch antenna, which has the directionality in the direction of the normal to the boards, is used. In the form in which the antennas 136 and 236 are so disposed as to be shifted from each other along the planar direction of the boards, e.g. a dipole antenna, a Yagi-Uda antenna, or an inversed-F antenna, which has the directionality in the planar direction of the boards, is used.

Each millimeter-wave signal transmission path 9 may be a free-space transmission path 9B as shown in FIG. 13A1. However, it is preferable that the millimeter-wave signal transmission path 9 be a dielectric transmission path 9A like those shown in FIGS. 13A2 and 13A3 or a hollow waveguide path 9L like those shown in FIGS. 13A4 and 13A5.

If the free-space transmission path 9B is employed and the millimeter-wave signal transmission paths 9 of plural channels are provided close to each other, it is preferable to dispose a structure inhibiting electrical wave propagation (millimeter wave blocking material MY) between the channels in order to suppress the interference between the pairs of antennas of the respective channels. The millimeter wave blocking material MY may be disposed on either one of the main board 602 and the imaging board 502, or may be disposed on both of them. Whether or not to dispose the millimeter wave blocking material MY may be decided depending on the spatial distance between the channels and the degree of interference. Because the degree of interference has relation also to the transmission power, the decision is made by comprehensively considering the spatial distance, the transmission power, and the degree of interference.

To provide the dielectric transmission path 9A, it would be possible to interconnect the antennas 136 and 236 by a soft (flexible) dielectric material such as a silicone resin as shown in FIG. 13A2 for example. The dielectric transmission path 9A may be surrounded by a blocking material (e.g. electrical conductor). To take advantage of the flexibility of the dielectric material, it is preferable that the blocking material also have flexibility. Although the antennas are connected by the dielectric transmission path 9A, the dielectric transmission path 9A can be routed like an electrical line because the material thereof is soft.

As another example of the dielectric transmission path 9A, as shown in FIG. 13A3, the dielectric transmission path 9A may be fixed on the antenna 136 on the main board 602 and the antenna 236 on the imaging board 502 may be disposed at such a position as to be in contact with the dielectric transmission path 9A. Conversely, the dielectric transmission path 9A may be fixed on the imaging board 502.

As the hollow waveguide path 9L, a structure that is surrounded by a blocking material and has a hollow inside is used. For example, as shown in FIG. 13A4, a structure that is surrounded by an electrical conductor MZ as one example of the blocking material and has a hollow inside is used. For example, an enclosure of the electrical conductor MZ is attached on the main board 602 in such a manner as to surround the antenna 136. The movement center of the antenna 236 on the imaging board 502 is disposed at the position opposed to the antenna 136. Because the inside of the electrical conductor MZ is hollow, a dielectric material does not need to be used and the millimeter-wave signal transmission path 9 can be simply formed at low cost.

The enclosure of the electrical conductor MZ may be provided on either the main board 602 or the imaging board 502. In either case, the distance L between the enclosure by the electrical conductor MZ and the imaging board 502 or the main board 602 (length of the gap from the end of the electrical conductor MZ to the opposing board) is set to a value sufficiently smaller than the wavelength of millimeter waves. The size and shape of the blocking material (enclosure: electrical conductor MZ) are set to such size and planar shape that the opposition range of the antennas 136 and 236 exists inside the enclosure (electrical conductor MZ). As long as this condition is satisfied, the planar shape of the electrical conductor MZ may be any shape such as a circle, a triangle, or a rectangle.

The hollow waveguide path 9L is not limited to one obtained by forming an enclosure by the electrical conductor MZ on the board. For example, as shown in FIG. 13A5, it may be obtained by providing a through-hole or a non-through-hole in a board having comparatively-large thickness and utilizing the wall of the hole as an enclosure. In this case, the board serves as the blocking material. The hole may be provided in either one of the imaging board 502 and the main board 602 or may be provided in both of them. The sidewall of the hole may be covered by an electrical conductor or may be uncovered. In the latter case, due to the ratio of the relative dielectric constants between the board and the air, millimeter waves are reflected to be intensely distributed in the hole. If the board is completely penetrated by the hole, the antennas 136 and 236 are disposed (attached) on the back surfaces of the semiconductor chips 103 and 203. If the board is not completely penetrated but the forming of the hole is stopped in the middle (non-through-hole is made), the antennas 136 and 236 are provided at the bottom of the hole.

The size and shape of the section of the hole are set to such size and planar shape that the opposition range of the antennas 136 and 236 exists inside the board sidewall serving as the enclosure. As long as this condition is satisfied, the sectional shape of the hole may be any shape such as a circle, a triangle, or a rectangle.

If the free-space transmission path 9B is employed as the millimeter-wave signal transmission path 9 when the first communication device 100 and the second communication device 200 are disposed in the housing of one piece of electronic apparatus (in this example, the imaging device 500) and millimeter-wave signal transmission is performed therebetween, the influence of reflection by a member in the housing is feared. In particular, if the injection locking system is employed, generally the transmission power is higher compared with the case in which this system is not employed, and thus it is expected that problems of interference and multipath attributed to the reflection become obvious. In contrast, if the millimeter-wave signal transmission path 9 having a millimeter wave confining structure (waveguide path structure), such as the dielectric transmission path 9A or the hollow waveguide path 9L, is employed, the transmission is not affected by the reflection by a member in the housing. In addition, because a millimeter-wave signal discharged from one antenna 136 can be confined in the millimeter-wave signal transmission path 9 and be transmitted to the other antenna 236, the wastefulness of discharged electrical waves is small and thus the transmission power can be set low even when the injection locking system is employed.

Second Example

FIGS. 13B1 to 13B3 are diagrams for explaining a second example of the wireless transmission path structure of the embodiments. The transmission path structure of the second example is an application example in which signal transmission is performed between pieces of electronic apparatus by millimeter waves in the state in which the plural pieces of electronic apparatus are integrated with each other. For example, this second example is application to signal transmission between two pieces of electronic apparatus when one piece of electronic apparatus is mounted on the other piece of electronic apparatus (e.g. on the main body side).

For example, there is a system in which a card-type information processing device typified by so-called IC card and memory card in which a central processing unit (CPU), a nonvolatile memory device (e.g. flash memory), and so forth are incorporated is allowed to be (detachably) mounted in electronic apparatus on the main body side. The card-type information processing device as one example of one piece of (first) electronic apparatus will be referred to also as "the card device" hereinafter. The other piece of (second) electronic apparatus on the main body side will be referred to also simply as the electronic apparatus hereinafter.

A slot structure 4A between electronic apparatus 101A and a memory card 201A is a structure for allowing the memory card 201A to be attached and detached to and from the electronic apparatus 101A, and has a function of a fixer for the electronic apparatus 101A and the memory card 201A.

As shown in FIG. 13B2, the slot structure 4A has such a configuration as to allow the memory card 201A (housing 290 thereof) to be inserted and removed in and from a housing 190 of the electronic apparatus 101A via an opening 192 and be fixed to the housing 190. The board 102 is attached to one surface of the housing 190 on the opposite side of the opening 192 (on the outside) with the intermediary of a supporter 191.

A connector of the reception side is provided at the position in contact with the terminal of the memory card 201A in the slot structure 4A. A connector terminal (connector pin) is unnecessary for a signal replaced by millimeter wave transmission.

It would be possible to provide the connector terminal also for the signal replaced by millimeter wave transmission in the electronic apparatus 101A (slot structure 4A). In this case, signal transmission can be performed by electrical lines as with existing techniques if the memory card 201A inserted in the slot structure 4A is an existing card to which the millimeter wave transmission path structure of the second example is not applied.

The electronic apparatus 101A and the memory card 201A have a concave-and-convex shape configuration as a fitting structure. In this example, as shown in FIG. 13B2, a convex shape configuration 198A (protrusion) having a circular cylindrical shape is provided in the housing 190 of the electronic apparatus 101A. Furthermore, as shown in FIG. 13B1, a concave shape configuration 298A (recess) having a circular cylindrical shape is provided in the housing 290 of the memory card 201A. That is, as shown in FIG. 13B3, in the housing 190, the convex shape configuration 198A is provided at the part that corresponds to the position of the concave shape configuration 298A when the memory card 201A is inserted in the housing 190.

Based on this configuration, fixing and aligning of the memory card 201A are simultaneously carried out when the memory card 201A is mounted in the slot structure 4A. The sizes of the concave and convex shapes are set to such sizes that the antennas 136 and 236 never get out of the blocking material (enclosure: conductor 144) even when the fitting between the concave and convex shapes involves a backlash. It is not essential that the planar shape of the concave-and-convex shape configuration is a circle as shown in the diagram, but the planar shape may be any shape such as a triangle or a rectangle.

For example, a structural example of the memory card 201A (plan perspective and section perspective) is shown in FIG. 13B1. The memory card 201A has the semiconductor chip 203 including the signal generating unit 207 (millimeter-wave signal converter) on one surface of the board 202. The semiconductor chip 203 is provided with a millimeter wave transmitting/receiving terminal 232 for coupling with the millimeter-wave signal transmission path 9. On one surface of the board 202, a millimeter wave transmission path 234 by a board pattern connected to the millimeter wave transmitting/receiving terminal 232 and the antenna 236 (patch antenna, in the diagram) are formed. The transmission path coupler 208 is configured by the millimeter wave transmitting/receiving terminal 232, the millimeter wave transmission path 234, and the antenna 236.

The patch antenna does not have sharp directionality in the normal direction. Thus, no influence is exerted on the reception sensitivity of the antennas 136 and 236 even when they are disposed with some misalignment, as long as a somewhat-large area is ensured as the area of the overlapping part between the antennas 136 and 236. In millimeter wave communication, because the wavelength of millimeter waves is as short as several millimeters, the antenna also has a small size of several-mm-square order, and the patch antenna can be easily set even in a small place like an area in the small memory card 201A.

If the antennas 136 and 236 are formed in the semiconductor chips 103 and 203, a further-smaller antenna such as an inversed-F antenna is required. The inversed-F antenna is non-directional. In other words, it has directionality not only in the direction of thickness of (normal to) the board but also in the planar direction of the board. Therefore, it is preferable to enhance the transmission efficiency by making an improvement such as provision of a reflective plate for the transmission path couplers 108 and 208 for coupling with the millimeter-wave signal transmission path 9.

The housing 290 serves as a cover to protect the board 202, and at least the part of the concave shape configuration 298A is composed of a dielectric resin containing a dielectric material having such a relative dielectric constant as to allow the millimeter-wave signal transmission. As the dielectric material of the concave shape configuration 298A, e.g. a member composed of an acrylic resin, an urethane resin, or an epoxy resin is used. The dielectric material of at least the part of the concave shape configuration 298A of the housing 290 also serves as the millimeter wave dielectric transmission path.

In the housing 290, the concave shape configuration 298A is formed on the same surface side as that of the antenna 236. The concave shape configuration 298A fixes the memory card 201A to the slot structure 4A and carries out alignment for coupling of millimeter wave transmission with the millimeter-wave signal transmission path 9 included in the slot structure 4A.

Along one side of the board 202, connection terminals 280 (signal pins) for connection to the electronic apparatus 101A through the predetermined places on the housing 290 are provided at predetermined positions on the housing 290. In the case of the first embodiment, the memory card 201A partially has an existing terminal structure for low-speed, small-size signals and power supply. Because the clock signal and plural data signals are treated as the subject of signal transmission by millimeter waves, the terminals for these signals are removed as shown by the dotted lines in the diagram.

A structural example of the electronic apparatus 101A (plan perspective and section perspective) is shown in FIG. 13B2. The electronic apparatus 101A has the semiconductor chip 103 including the signal generating unit 107 (millimeter-wave signal converter) on one surface of the board 102 (on the side of the opening 192). The semiconductor chip 103 is provided with a millimeter wave transmitting/receiving terminal 132 for coupling with the millimeter-wave signal transmission path 9. On one surface of the board 102, a millimeter wave transmission path 134 by a board pattern connected to the millimeter wave transmitting/receiving terminal 132 and the antenna 136 (patch antenna, in the diagram) are formed. The transmission path coupler 108 is configured by the millimeter wave transmitting/receiving terminal 132, the millimeter wave transmission path 134, and the antenna 136.

In the housing 190, the opening 192 into and from which the memory card 201A is inserted and removed is formed as the slot structure 4A.

The convex shape configuration 198A is formed in the housing 190 so that the millimeter-wave signal transmission path 9 having a millimeter wave confining structure (waveguide path structure) may be formed at the part corresponding to the position of the concave shape configuration 298A when the memory card 201A is inserted in the opening 192. In the present example, the convex shape configuration 198A is so formed as to serve as the dielectric transmission path 9A by forming a dielectric waveguide tube 142 whose inside is filled with a dielectric material in the conductor 144 having a cylindrical shape. The convex shape configuration 198A is so fixedly disposed that the center of the dielectric waveguide tube 142 corresponds with the antenna 136 of the transmission path coupler 108. As the fitting structure between the concave and convex shapes, the dielectric waveguide tube 142 is provided as a structure to strengthen the coupling between the antennas 136 and 236.

It is not essential to provide the dielectric waveguide tube 142. The millimeter-wave signal transmission path 9 may be formed of the dielectric material itself of the housings 190 and 290. Furthermore, the dielectric transmission path 9A may be replaced by the hollow waveguide path 9L, which is surrounded by a blocking material and has a hollow inside. For example, the hollow waveguide path 9L is provided by forming the cylindrical conductor 144 whose inside is a void (hollow) state. Also with the hollow waveguide path 9L having such a structure, millimeter waves are confined in the hollow waveguide path 9L by the conductor 144 having an enclosure function, which provides advantages that the transmission loss of the millimeter waves is small and the millimeter waves can be efficiently transmitted, external radiation of the millimeter waves is suppressed, and EMC countermeasures are facilitated.

The parameters of the dielectric waveguide tube 142, such as the diameter, the length, and the material, are so decided as to allow efficient transmission of a millimeter-wave signal. It is preferable that the material be a dielectric material whose relative dielectric constant is about 2 to 10 (preferably 3 to 6) and whose dielectric loss tangent is about 0.00001 to 0.01 (preferably 0.00001 to 0.001), such as a material composed of an acrylic resin, an urethane resin, an epoxy resin, a silicone resin, a polyimide resin, or a cyanoacrylate resin as described above. By confining the millimeter-wave signal in the dielectric transmission path 9A, the transmission efficiency can be enhanced and the signal transmission by millimeter waves can be performed without inconvenience. The need to provide the conductor 144 is eliminated by properly selecting the material in some cases.

The diameter of the conductor 144 is so designed as to match the diameter of the concave shape configuration 298A of the memory card 201A. The conductor 144 serves also as a blocking material to suppress the external radiation of millimeter waves transmitted into the dielectric waveguide tube 142.

A structural example (section perspective) when the memory card 201A is inserted in the slot structure 4A (particularly, opening 192) of the electronic apparatus 101A is shown in FIG. 13B3. As shown in the diagram, the housing 190 with the slot structure 4A has such a mechanical structure that the convex shape configuration 198A (dielectric transmission path 9A) and the concave shape configuration 298A get contact with each other in a concave-and-convex manner in response to the insertion of the memory card 201A from the opening 192. When the concave and convex structures are fitted with each other, the antennas 136 and 236 are opposed to each other and the dielectric transmission path 9A is disposed as the millimeter-wave signal transmission path 9 between the antennas 136 and 236.

By the above-described configuration, the fixing of the memory card 201A and the slot structure 4A is achieved. Furthermore, alignment of the dielectric transmission path 9A for coupling of the millimeter wave transmission is realized so that a millimeter-wave signal may be efficiently transmitted between the antennas 136 and 236.

Specifically, the transmission path coupler 108 (particularly, antenna coupler) is disposed at the part of the convex shape configuration 198A in the electronic apparatus 101A, and the transmission path coupler 208 (particularly, antenna coupler) is disposed at the part of the concave shape configuration 298A in the memory card 201A. These couplers are so disposed that the millimeter wave transmission characteristics of the transmission path couplers 108 and 208 become high when the concave and convex parts are fitted with each other.

Due to such a configuration, the fixing of the memory card 201A and the alignment for millimeter-wave signal transmission can be simultaneously carried out when the memory card 201A is mounted in the slot structure 4A. In the memory card 201A, the housing 290 intervenes between the dielectric transmission path 9A and the antenna 236. However, this does not have a large influence on the millimeter wave transmission because the material of the part of the concave shape configuration 298A is a dielectric material. This point applies also to the case in which the dielectric waveguide tube 142 is not provided at the part of the convex shape configuration 198A but the dielectric material of the housing 190 is left at this part. The millimeter-wave signal transmission path 9 (dielectric transmission path 9A) is configured between the antennas 136 and 236 by the dielectric material of the respective housings 190 and 290.

The millimeter wave transmission path structure of the second example employs a configuration in which the dielectric transmission path 9A including the dielectric waveguide tube 142 is made to intervene between the transmission path couplers 108 and 208 (particularly, antennas 136 and 236) when the memory card 201A is mounted in the slot structure 4A. The efficiency of the high-speed signal transmission can be enhanced by confining the millimeter-wave signal in the dielectric transmission path 9A.

As another way of thinking, it is also possible that the millimeter-wave signal transmission path 9 is so formed that the antenna 136 and the antenna 236 are made to be opposed to each other at a place other than the part of the fitting structure (convex shape configuration 198 and concave shape configuration 298) of the slot structure 4A for card mounting. However, this case involves the influence of the positional misalignment. In contrast, by providing the millimeter-wave signal transmission path 9 in the fitting structure of the slot structure 4A for card mounting, the influence of the positional misalignment can be surely eliminated.

In particular, the millimeter-wave signal transmission path 9 (in this example, dielectric transmission path 9A) having a millimeter wave confining structure (waveguide path structure) is constructed by utilizing the fitting structure (slot structure 4A) in the present configuration example. Thus, the millimeter wave transmission is not affected by reflection by the housing and other members, and a millimeter-wave signal discharged from one antenna 136 can be confined in the dielectric transmission path 9A and be transmitted to the other antenna 236. Thus, the wastefulness of discharged electrical waves is small and thus the transmission power can be set low even when the injection locking system is employed.

Third Example

FIGS. 13C1 to 13C3 are diagrams for explaining a third example of the wireless transmission path structure of the embodiments, and particularly is to explain a modification example of the electronic apparatus. The wireless transmission system 1 includes a portable image reproduction device 201K as one example of the first electronic apparatus, and includes an image acquisition device 101K as one example of the second (main body side) electronic apparatus on which the image reproduction device 201K is mounted. In the image acquisition device 101K, a placement platform 5K on which the image reproduction device 201K is mounted is provided in part of the housing 190. Instead of the placement platform 5K, the slot structure 4A may be employed as with the second example. The third example is the same as the transmission path structure of the second example in that signal transmission is performed based on wireless transmission in the millimeter wave band between two pieces of electronic apparatus when one piece of electronic apparatus is mounted on the other piece of electronic apparatus. In the following, a description will be made with focus on the differences from the second example.

The image acquisition device 101K has a substantially rectangular solid (box) shape and is not a card device. The image acquisition device 101K is e.g. a device that acquires moving image data, such as a digital recording/reproduction device and a terrestrial television receiver. In the image reproduction device 201K, a memory device that stores moving image data transmitted from the image acquisition device 101K and a functional unit that reads out moving image data from the memory device and reproduces a moving image on a display unit (e.g. liquid crystal display device or organic EL display device) are provided as the application functional unit 205. In terms of the structure, it can be considered that the memory card 201A is replaced by the image reproduction device 201K and the electronic apparatus 101A is replaced by the image acquisition device 101K.

In the housing 190 under the placement platform 5K, the semiconductor chip 103 is housed and the antenna 136 is provided at a certain position, similarly to the second example of the millimeter wave transmission path structure (FIGS. 13B1 to 13B3). At the part of the housing 190 opposed to the antenna 136, the dielectric waveguide tube 142 that has the dielectric transmission path 9A composed of a dielectric material as its inside transmission path and the conductor 144 surrounding the dielectric transmission path 9A is provided. It is not essential to provide the dielectric waveguide tube 142 (dielectric transmission path 9A), but the millimeter-wave signal transmission path 9 may be formed of the dielectric material itself of the housing 190. These points are the same as those of the above-described other structural examples. The following configuration may be employed. The plural antennas 136 are juxtaposed in a planar manner. Furthermore, prior to the actual signal transmission, a millimeter-wave signal for test is sent out from the antenna 236 of the image reproduction device 201K and the antenna 136 having the highest reception sensitivity is selected.

In the housing 290 of the image reproduction device 201K mounted on the placement platform 5K, the semiconductor chip 203 is housed and the antenna 236 is provided at a certain position, similarly to the second example of the millimeter wave transmission path structure (FIGS. 13B1 to 13B3). At the part of the housing 290 opposed to the antenna 236, the millimeter-wave signal transmission path 9 (dielectric transmission path 9A) is configured by a dielectric material. These points are the same as those of the millimeter wave transmission path structure of the above-described second example.

Based on such a configuration, alignment for millimeter-wave signal transmission of the image reproduction device 201K can be carried out when the image reproduction device 201K is mounted (loaded) on the placement platform 5K. Although the housings 190 and 290 intervene between the antennas 136 and 236, this does not have a large influence on millimeter wave transmission because the housings 190 and 290 are composed of a dielectric material.

The millimeter wave transmission path structure of the third example employs not the concept of the fitting structure but a wall-abutting system. Specifically, the antenna 136 and the antenna 236 are made to be opposed to each other when the image reproduction device 201K is so disposed as to be made to abut against a corner 101a of the placement platform 5K. This can surely eliminate the influence of positional misalignment.

The millimeter wave transmission path structure of the third example employs a configuration in which the dielectric transmission path 9A is made to intervene between the transmission path couplers 108 and 208 (particularly, antennas 136 and 236) when the image reproduction device 201K is mounted at the prescribed position on the placement platform 5K. The efficiency of the high-speed signal transmission can be enhanced by confining a millimeter-wave signal in the dielectric transmission path 9A. The millimeter wave transmission is not affected by reflection by the housing and other members. In addition, a millimeter-wave signal discharged from one antenna 136 can be confined in the dielectric transmission path 9A and be transmitted to the other antenna 236. Thus, the wastefulness of discharged electrical waves is small and thus the transmission power can be set low even when the injection locking system is employed.

System Configuration: First Application Example

Figure 14:
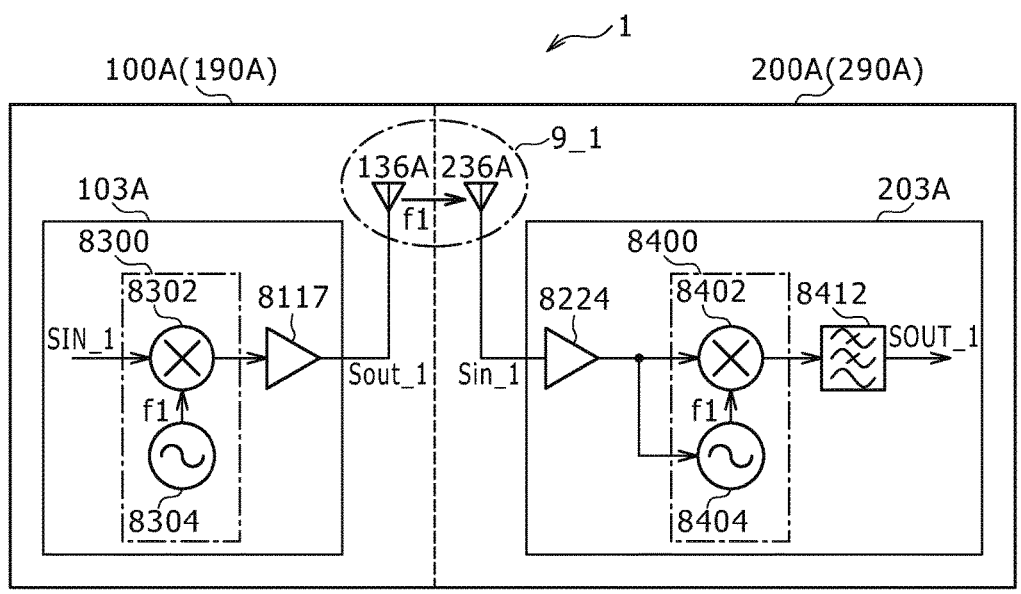
FIG. 14 is a diagram for explaining a first application example of the wireless transmission system of the embodiments.

FIG. 14 is a diagram for explaining a first application example of the wireless transmission system 1 of the embodiments. The first application example is an example in which signal transmission is performed in the millimeter wave band by employing the above-described injection locking system between two semiconductor chips 103A and 203A formed by a CMOS process in the housing of one piece of electronic apparatus or between plural pieces of electronic apparatus.

The exterior shapes of a housing 190A of a first communication device 100A and a housing 290A of a second communication device 200A are not limited to a cube (rectangular solid) but may be a sphere, a circular column, a semicircular column, or an elliptic column. In the case of signal transmission in one housing, for example it can be considered that the semiconductor chip 103A and the semiconductor chip 203A are mounted on the same board. Alternatively, it can be considered that the housing 190A of the first communication device 100A is used also as the housing 290A of the second communication device 200A. In the case of inter-apparatus signal transmission in the state in which the electronic apparatus including the second communication device 200A is placed on the electronic apparatus including the first communication device 100A, it can be considered that the housing 190A of the first communication device 100A and the housing 290A of the second communication device 200A are in contact with each other at the dotted-line part in the diagram.

The housings 190A and 290A are equivalent to the armoring (exterior) case of e.g. a digital recording/reproduction device, a terrestrial television receiver, a camera, a hard disc device, a game machine, a computer, and a wireless communication device.

For example, in the wireless transmission system 1, in order to transmit a signal for which high-speed, large-size transmission is required, such as a cinema video signal or a computer image signal, this signal is turned to a transmission signal Sout_1 in the millimeter wave band with a carrier frequency f1 of 30 GHz to 300 GHz and the transmission signal Sout_1 is transmitted in a millimeter-wave signal transmission path 9_1.

The millimeter-wave signal transmission path 9_1 is formed of a free space inside the housings 190A and 290A, a dielectric transmission path constructed inside the free space, or waveguide tube and/or waveguide path. The waveguide path encompasses slot line and/or microstrip line. The millimeter-wave signal transmission path 9_1 may be any as long as it can transmit the millimeter-wave transmission signal Sout_1. The dielectric substance itself, such as a resin member, packed inside the housings 190A and 290A also serves as the millimeter-wave signal transmission path 9_1.

Because the millimeter waves can be easily blocked and do not easily leak to the outside, the carrier signal having the carrier frequency f1 whose stability is low can be used. This leads also to increase in the flexibility of the design of the propagation channel between the semiconductor chips 103A and 203A. For example, by designing the sealing member (package) structure that seals the semiconductor chips 103A and 203A in conjunction with the propagation channel by using a dielectric material, favorable signal transmission with higher reliability compared with millimeter-wave signal transmission in the free space can be performed.

For example, a free-space transmission path may be formed between antennas 136A and 236A by employing a free space as the environment of the inside of the housings 190A and 290A. Alternatively, the whole of the inside of the housings 190A and 290A may be filled with a dielectric material such as a resin member. In these cases, it is preferable that the housings 190A and 290A be e.g. a shield case whose outside six surfaces are surrounded by a metal plate or a case obtained by coating the inside of this shield case by a resin member in order to prevent the transmission signal Sout_1 in the millimeter wave band from leaking to the outside. Alternatively, the housings 190A and 290A may be a case whose outside six surfaces are surrounded by a resin member or a case obtained by shielding the inside of this case by a metal member. At any rate, there is a tendency that the transmission amplitude is set larger when the injection locking system is employed than when it is not employed. Thus, it is preferable to take the shielding technique in consideration of this point.

It is preferable to employ a free space as the environment of the inside of the housings 190A and 290A and provide a dielectric transmission path, a hollow waveguide path, a waveguide tube structure, or the like between the antennas 136A and 236A to thereby form a millimeter wave confining structure (waveguide path structure) that transmits a millimeter-wave signal while confining it in the transmission path. If the millimeter wave confining structure is employed, a signal in the millimeter wave band can be surely transmitted between the antennas 136A and 236A without being affected by reflection by the housings 190A and 290A. In addition, a millimeter-wave signal (transmission signal Sout_1) discharged from the antenna 136A can be confined in the millimeter-wave signal transmission path 9_1 and be transmitted to the antenna 236A. Thus, the wastefulness can be reduced (eliminated) and therefore the transmission power can be suppressed. Even when the injection locking system is employed, the transmission power can be set extremely low and thus electromagnetic induction interference (EMI) is not given to the outside. This allows omission of the provision of the metal shield structure for the housings 190A and 290A.

The semiconductor chip 103A includes the modulation functional unit 8300 (the frequency mixer 8302 and the transmission-side local oscillator 8304) and the amplifier 8117. The amplifier 8117 is connected to the antenna 136A serving as part of the transmission path coupler 108. The semiconductor chip 103A converts (modulates) a transmission-subject signal SIN_1 to a millimeter-wave signal and discharges the transmission signal Sout_1 from the antenna 136A.

The semiconductor chip 203A includes the amplifier 8224, the demodulation functional unit 8400 (frequency mixer 8402 and reception-side local oscillator 8404), and the low-pass filter 8412. The amplifier 8224 is connected to the antenna 236A serving as part of the transmission path coupler 208. The semiconductor chip 203A restores (demodulates) a transmission-subject signal SOUT_1 (corresponding to SIN_1) from a received signal Sin_1 (corresponding to Sout_1) received by the antenna 236A. That is, the semiconductor chips 103A and 203A perform signal transmission in the millimeter wave band via the millimeter-wave signal transmission path 9_1 between the antennas 136A and 236A.

As the antennas 136A and 236A for millimeter waves, ultra-small antenna elements can be formed on the semiconductor chips 103A and 203A because the wavelength of the millimeter wave is short. Because the size of the antennas 136A and 236A can be reduced, significantly-large flexibility can be given also to the way of radiation of the transmission signal Sout_1 from the antenna 136A and the way of extraction of the received signal Sin_1 from the antenna 236A.

For both of the transmission-side semiconductor chip 103A and the reception-side semiconductor chip 203A, the whole of the transmission-side local oscillator 8304 and the reception-side local oscillator 8404 including a tank circuit is formed on the same chip as described above without use of an external tank circuit like one in the related-art system. For example, the transmission-side semiconductor chip 103A modulates a carrier signal with the carrier frequency f1 generated by the transmission-side local oscillator 8304 by the ASK system based on the transmission-subject signal SIN_1 to thereby carry out frequency conversion to the millimeter-wave transmission signal Sout_1.

For example, the reception-side semiconductor chip 203A uses the millimeter-wave signal (transmission signal Sout_1=received signal Sin_1) sent from the transmission-side semiconductor chip 103A as the injection signal to the reception-side local oscillator 8404, and the reception-side local oscillator 8404 acquires the reproduction carrier signal based on the injection signal. The frequency mixer 8402 demodulates the received signal Sin_1 by using the reproduction carrier signal. The demodulated signal is made to pass through the low-pass filter 8412, and thereby the transmission-subject signal SOUT_1 corresponding to the transmission-subject signal SIN_1 is restored.

The placement positions of the semiconductor chip 103A in the housing 190A and the semiconductor chip 203A in the housing 290A are specified (typically, fixed), and therefore the positional relationship between both semiconductor chips and the environmental conditions (e.g. reflection condition) of the transmission channel between both semiconductor chips can be specified in advance. Thus, the design of the propagation channel between the transmission side and the reception side is easy. Furthermore, if the sealing structure to seal the transmission side and the reception side is designed in conjunction with the propagation channel by using a dielectric material, favorable transmission having higher reliability compared with free-space transmission can be performed.

The environment of the propagation channel does not frequently change, and the control to allow the achievement of the injection locking by the above-described controllers 8346 and 8446 also does not need to be frequently carried out dynamically and adaptively differently from general wireless communication. Thus, the overhead due to the control can be decreased compared with general wireless communication. This contributes to realization of the wireless transmission system 1, which performs high-speed, large-size signal transmission, with small size and low power consumption.

If the wireless transmission environment is calibrated at the time of the manufacturing or design and individual variation and so forth is grasped, the controllers 8346 and 8446 can make various kinds of setting with reference to the data of the individual variation so that the injection locking can be achieved. Repeating determination of the injection locking state and change of various kinds of setting values in response to the determination is unnecessary, and various kinds of setting for allowing achievement of the injection locking is easy.

System Configuration: Second Application Example

Figure 15:
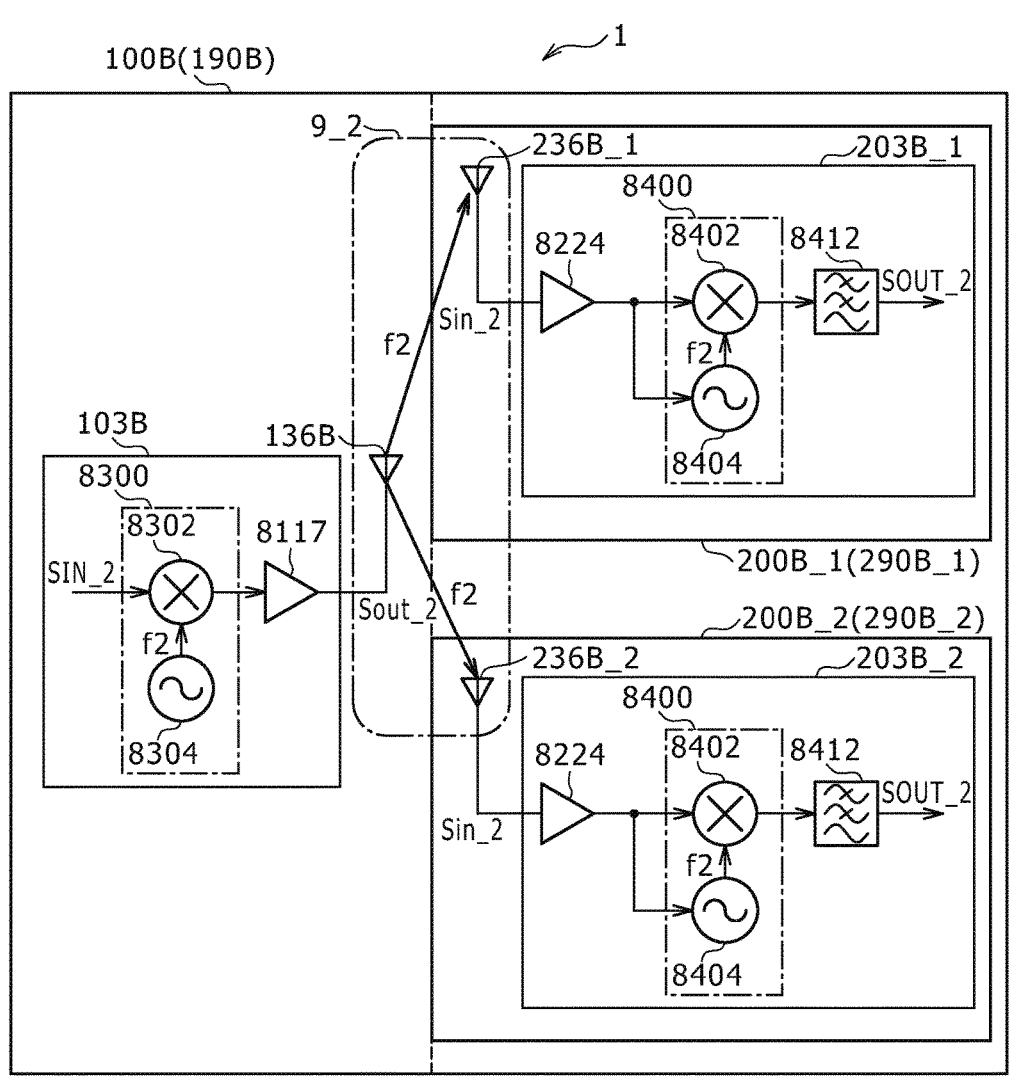
FIG. 15 is a diagram for explaining a second application example of the wireless transmission system of the embodiments.

FIG. 15 is a diagram for explaining a second application example of the wireless transmission system 1 of the embodiments. The second application example is an example in which signal transmission is performed in the millimeter wave band by employing the above-described injection locking system among three semiconductor chips 103B, and 203B_1, and 203B_2 formed by a CMOS process in the housing of one piece of electronic apparatus or among plural pieces of electronic apparatus. The difference of the second application example from the first application example is that one-to-two signal transmission is performed. Typically, the difference is that broadcast (multicast) communication is performed from one transmission-side semiconductor chip 103B to two reception-side semiconductor chips 203B_1 and 203B_2. Although the number of reception-side semiconductor chips is two in the diagram, the number of reception-side semiconductor chips may be three or more. A carrier frequency f2 used is in the millimeter wave band of 30 GHz to 300 GHz. The differences from the first application example will be described below.

In the case of signal transmission in one housing, it can be considered that the semiconductor chip 103B and the semiconductor chips 203B_1 and 203B_2 are mounted on the same board for example. Alternatively, it can be considered that a housing 190B of a first communication device 100B is used also as housings 290B_1 and 290B_2 of second communication devices 200B_1 and 200B_2. In the case of inter-apparatus signal transmission in the state in which the electronic apparatus including two second communication devices 200B_1 and 200B_2 is placed on the electronic apparatus including the first communication device 100B, it can be considered that the housing 190B of the first communication device 100B and the housings 290B_1 and 290B_2 of the second communication devices 200B_1 and 200B_2 are in contact with each other at the dotted-line part in the diagram.

For example, the transmission-side semiconductor chip 103B modulates a carrier signal with the carrier frequency f2 generated by the transmission-side local oscillator 8304 by the ASK system based on a transmission-subject signal SIN_2 to thereby carry out frequency conversion to a millimeter-wave transmission signal Sout_2. The transmission signal Sout_2 is supplied to a millimeter-wave signal transmission path 9_2 via an antenna 136B and reaches two reception-side antennas 236B_1 and 236B_2. For example, the reception-side semiconductor chips 203B_1 and 203B_2 use the millimeter-wave signal (transmission signal Sout_2=received signal Sin_2) sent from the transmission-side semiconductor chip 103B as the injection signal to the reception-side local oscillator 8404, and the reception-side local oscillator 8404 acquires the reproduction carrier signal based on the injection signal. The frequency mixer 8402 demodulates the received signal Sin_2 by using the reproduction carrier signal. The demodulated signal is made to pass through the low-pass filter 8412, and thereby a transmission-subject signal SOUT_2 corresponding to the transmission-subject signal SIN_2 is restored.

In this manner, in the second application example, broadcast communication is realized among the transmission-side semiconductor chip 103B and the reception-side semiconductor chips 203B_1 and 203B_2 by the millimeter-wave signal transmission path 9_2 serving as the one-to-two transmission channel.

System Configuration: Third Application Example

Figure 16A:
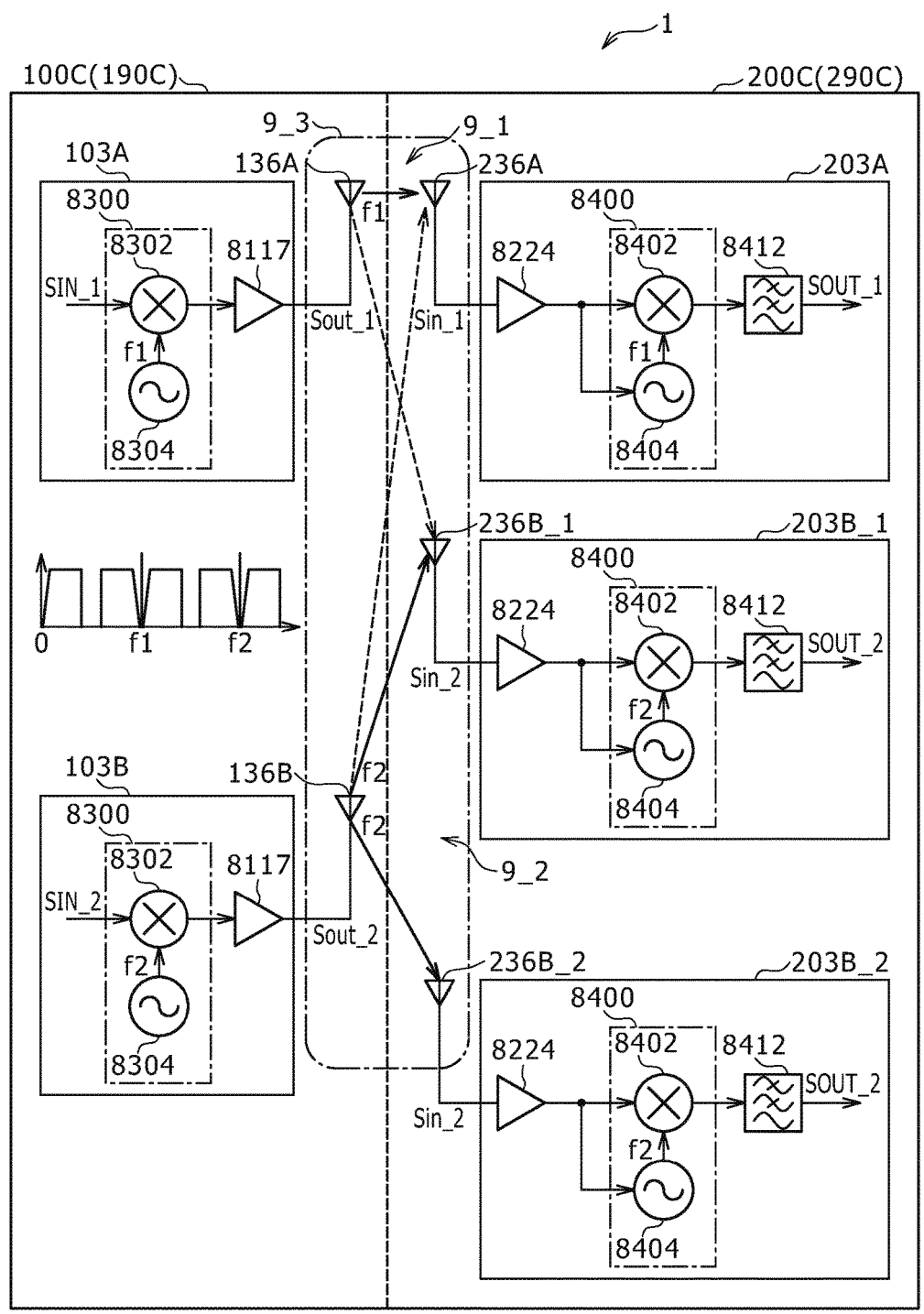
FIG. 16A is a diagram for explaining a third application example (configuration 1-1) of the wireless transmission system of the embodiments.
Figure 16B:
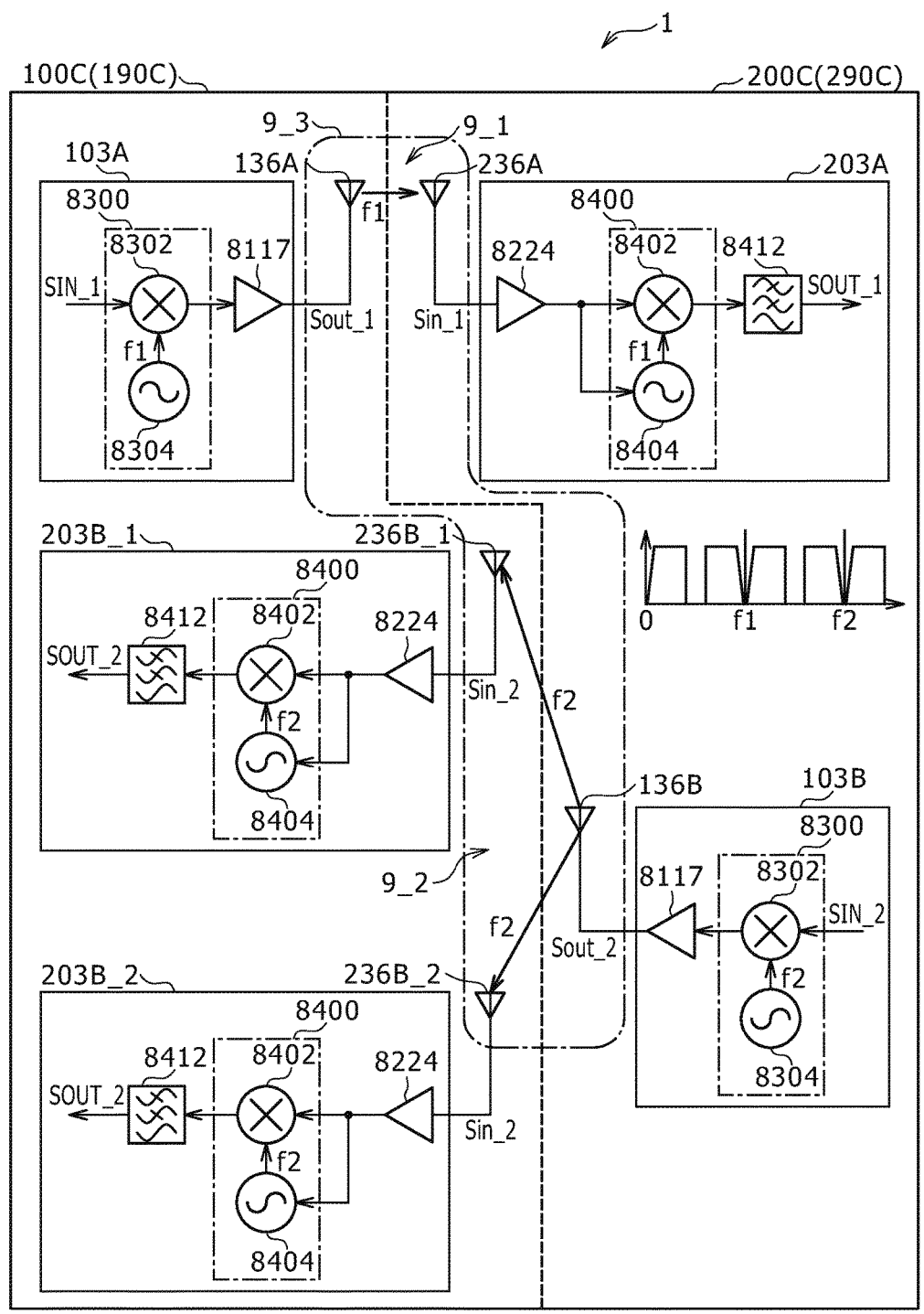
FIG. 16B is a diagram for explaining the third application example (configuration 1-2) of the wireless transmission system of the embodiments.
Figure 16C:
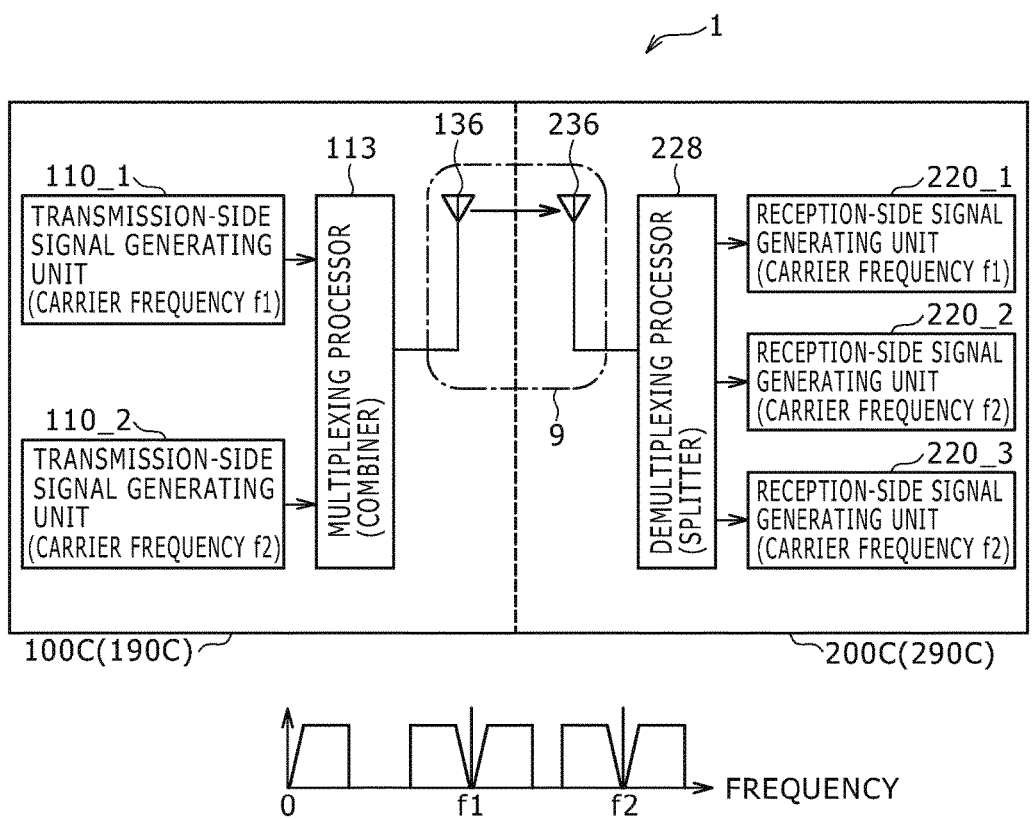
FIG. 16C is a diagram for explaining the third application example (configuration 2) of the wireless transmission system of the embodiments.

FIGS. 16A to 16C are diagrams for explaining a third application example of the wireless transmission system 1 of the embodiments. The third application example relates to a configuration in which N (N is a positive integer equal to or larger than 2) transmitting units are disposed on the transmission side and M (M is a positive integer equal to or larger than 2) receiving units are disposed on the reception side and sets of the transmitting unit and the receiving unit perform transmission by using the respective different carrier frequencies. That is, frequency division multiplexing transmission to transmit signals different from each other by using plural carrier frequencies is performed. The following description will deal with two-channel communication in which the carrier frequencies f1 and f2 are used for simple description.

The third application example (configurations 1-1 and 1-2) shown in FIGS. 16A and 16B is an example in which all of the transmission sides and the reception sides use the respective different antennas and the wireless transmission system 1 is constructed by combining the configurations of the above-described first application example and second application example. These configurations have a form in which each of the semiconductor chips can be regarded as the semiconductor chip on either the transmission side or the reception side and there is no restriction on the place of each of the semiconductor chips basically. In contrast, in the third application example (configuration 2) shown in FIG. 16C, both of the transmission side and the reception side use a common antenna.

In the third application example (configurations 1-1 and 1-2), the carrier frequency f1 used in the part employing the configuration of the first application example is in the millimeter wave band of 30 GHz to 300 GHz, and the carrier frequency f2 used in the part employing the configuration of the second application example is also in the millimeter wave band of 30 GHz to 300 GHz. However, the carrier frequencies f1 and f2 are far from each other to such an extent that the respective modulated signals do not interfere with each other. The differences from the first and second application examples will be described below.

In the case of signal transmission in one housing, it can be considered that the semiconductor chips 103A and 103B and the semiconductor chips 203A, 203B_1, and 203B_2 are mounted on the same board for example.

In the case of inter-apparatus signal transmission, it can be considered that, like in the third application example (configuration 1-1) shown in FIG. 16A, the electronic apparatus including a second communication device 200C in which the semiconductor chips 203A, 203B_1, and 203B_2 are housed is placed on the electronic apparatus including a first communication device 100C in which the semiconductor chips 103A and 103B are housed and a housing 190C of the first communication device 100C and a housing 290C of the second communication device 200C are in contact with each other at the dotted-line part in the diagram for example.

Furthermore, it can be considered that, like in the third application example (configuration 1-2) shown in FIG. 16B, the electronic apparatus including the second communication device 200C in which the semiconductor chips 103B and 203A are housed is placed on the electronic apparatus including the first communication device 100C in which the semiconductor chips 103A, 203B_1, and 203B_2 are housed and the housing 190C of the first communication device 100C and the housing 290C of the second communication device 200C are in contact with each other at the dotted-line part in the diagram. The same way of thinking can be applied also to the third application example (configuration 2) although description thereof is not particularly made.

In the third application example (configurations 1-1 and 1-2), the antennas between the transmission and reception sides are coupled by a single millimeter-wave signal transmission path 9_3. In terms of the function, a first communication channel is formed by the millimeter-wave signal transmission path 9_1 in the part employing the configuration of the first application example, and a second communication channel is formed by the millimeter-wave signal transmission path 9_2 in the part employing the configuration of the second application example. Because of the single millimeter-wave signal transmission path 9_3, for example electrical waves of the carrier frequency f1 in the millimeter-wave signal transmission path 9_1 are possibly transmitted to the millimeter-wave signal transmission path 9_2 and electrical waves of the carrier frequency f2 in the millimeter-wave signal transmission path 9_2 are possibly transmitted to the millimeter-wave signal transmission path 9_1.

In the part employing the configuration of the first application example, signal transmission in the millimeter wave band is performed by using the carrier frequency f1 between the semiconductor chips 103A and 203A via the millimeter-wave signal transmission path 9_1. In the part employing the configuration of the second application example, broadcast communication in the millimeter wave band is performed by using the carrier frequency f2 (≠f1) between the semiconductor chip 103B and the semiconductor chips 203B_1 and 203B_2 via the millimeter-wave signal transmission path 9_2. That is, in the third application example, one-to-one and one-to-two transmission systems exist in a mixed manner. In this case, each signal transmission is realized without being affected by interference by setting the carrier frequencies f1 and f2 different for each of the communication channels.

For example, suppose that, as shown by the dotted line in FIG. 16A, the transmission signal Sout_1 of the carrier frequency f1 also reaches the semiconductor chip 203B_1 when the semiconductor chip 203B_1 receives the transmission signal Sout_2 (=received signal Sin_2) of the carrier frequency f2 and is injection-locked with the carrier frequency f2. In this case, the semiconductor chip 203B_1 is not injection-locked with the carrier frequency f1. Thus, the component of the transmission-subject signal SIN_1 is never restored even if the transmission signal Sout_1 of the carrier frequency f1 is demodulation-processed in the semiconductor chip 203B_1 by carrying out synchronous detection by using the reproduction carrier signal and making the resulting signal pass through the low-pass filter 8412. That is, the semiconductor chip 203B_1 is not affected by the interference of the component of the carrier frequency f1 even if the semiconductor chip 203B_1 receives the modulated signal of the carrier frequency f1 when it is injection-locked with the carrier frequency f2.

Furthermore, suppose that, as shown by the dotted line in FIG. 16A, the transmission signal Sout_2 of the carrier frequency f2 also reaches the semiconductor chip 203A when the semiconductor chip 203A receives the transmission signal Sout_1 (=received signal Sin_1) of the carrier frequency f1 and is injection-locked with the carrier frequency f1. In this case, the semiconductor chip 203A is not injection-locked with the carrier frequency f2. Thus, the component of the transmission-subject signal SIN_2 is never restored even if the transmission signal Sout_2 of the carrier frequency f2 is demodulation-processed in the semiconductor chip 203A by carrying out synchronous detection by using the reproduction carrier signal and making the resulting signal pass through the low-pass filter 8412. That is, the semiconductor chip 203A is not affected by the interference of the component of the carrier frequency f2 even if the semiconductor chip 203A receives the modulated signal of the carrier frequency f2 when it is injection-locked with the carrier frequency f1.

In the third application example (configuration 2), N transmission-side signal generating units 110 are housed in one (transmission-side) semiconductor chip 103, and M reception-side signal generating units 220 are housed in the other (reception-side) semiconductor chip 203. This configuration has a form in which simultaneous signal transmission in the same direction from the respective transmission-side signal generating units 110 to the respective reception-side signal generating units 220 is enabled by employing frequency division multiplexing. Each of the transmitting units and the receiving units employs the above-described injection locking system.

For example, first and second transmission-side signal generating units 110_1 and 110_2 are disposed in the first communication device 100C, and first, second, and third reception-side signal generating units 220_1, 220_2, and 220_3 are disposed in the second communication device 200C. The first carrier frequency f1 is used by the set of the first transmission-side signal generating unit 110_1 and the first reception-side signal generating unit 220_1, and the second carrier frequency f2 (≠f1) is used by the set of the second transmission-side signal generating unit 110_2 and the second and third reception-side signal generating units 220_2 and 220_3.

The millimeter-wave signals of the carrier frequencies f1 and f2 generated by the respective transmission-side signal generating units 110_1 and 110_2 are put together into a signal on one channel by a combiner as one example of the multiplexing processor 113. This signal is transmitted in the millimeter-wave signal transmission path 9 via the antenna 136 of the transmission path coupler 108. The antenna 236 of the reception side receives the millimeter-wave signal transmitted in the millimeter-wave signal transmission path 9, and the received signal is separated into signals on three channels by a splitter as one example of the demultiplexing processor 228. These signals are supplied to the respective reception-side signal generating units 220_1, 220_2, and 220_3.

The reception-side signal generating unit 220_1 generates the reproduction carrier signal injection-locked with the carrier signal of the carrier frequency f1 used for the modulation by the transmission-side signal generating unit 110_1, and demodulates the received millimeter-wave signal of the carrier frequency f1. The reception-side signal generating units 220_2 and 220_3 generate the reproduction carrier signal injection-locked with the carrier signal of the carrier frequency f2 used for the modulation by the transmission-side signal generating unit 110_2, and demodulate the received millimeter-wave signal of the carrier frequency f2.

In the third application example (configuration 2), by such a mechanism, frequency division multiplexing transmission to transmit signals different from each other in the same direction can be realized by using two carrier frequencies f1 and f2 without the occurrence of the interference problem, similarly to the third application example (configurations 1-1 and 1-2).

System Configuration: Fourth Application Example

Figure 17A:
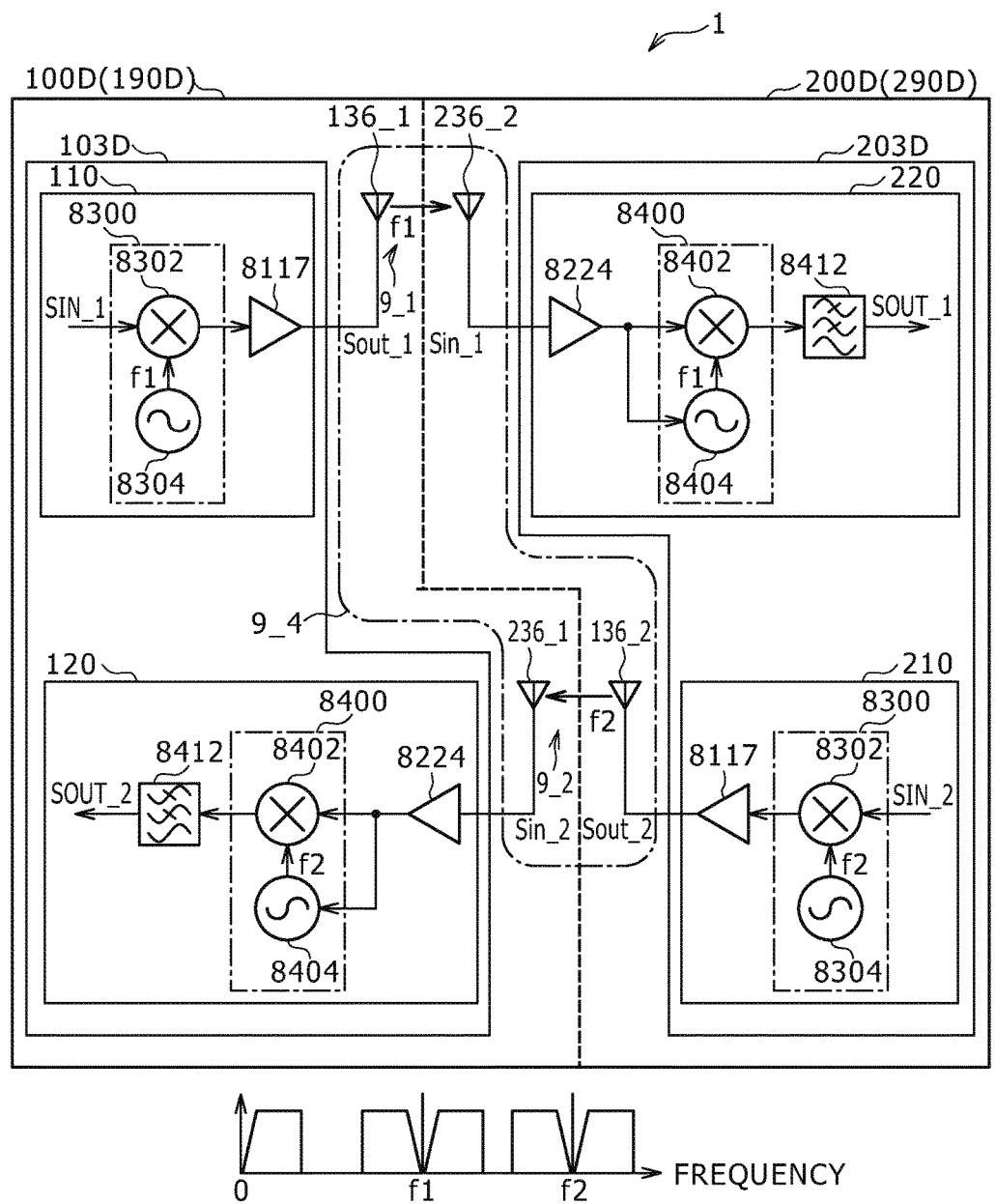
FIG. 17A is a diagram for explaining a fourth application example (configuration 1) of the wireless transmission system of the embodiments.
Figure 17B:
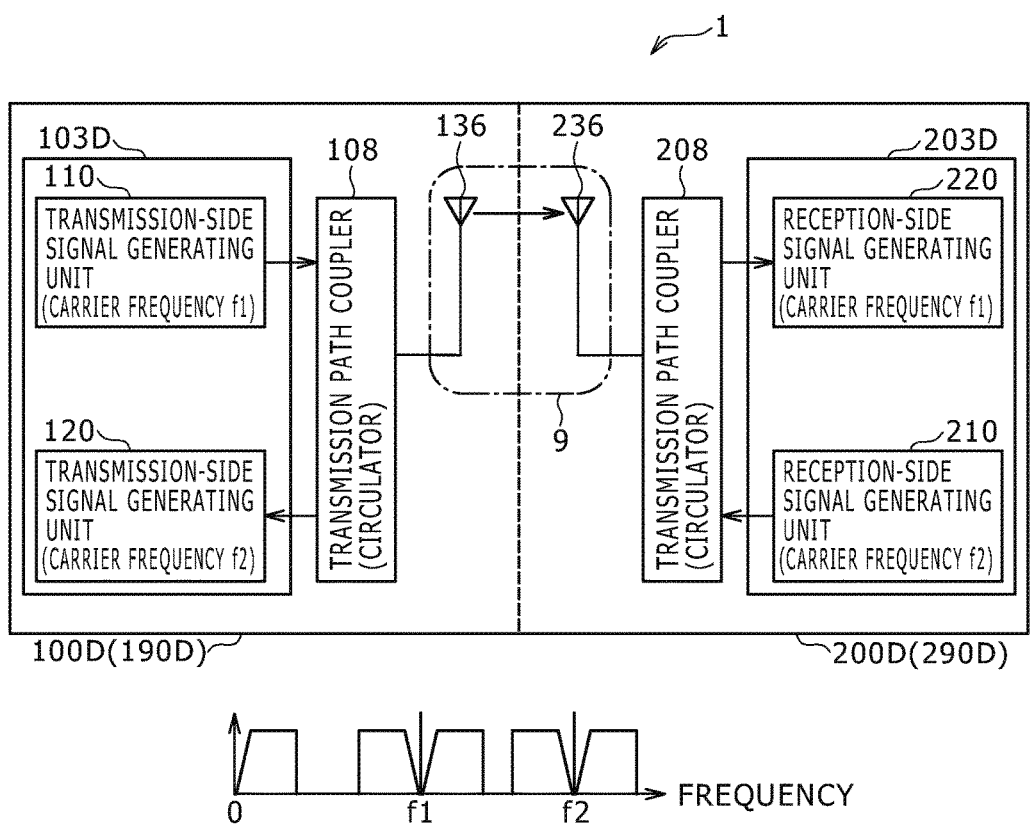
FIG. 17B is a diagram for explaining the fourth application example (configuration 2) of the wireless transmission system of the embodiments.

FIGS. 17A and 17B are diagrams for explaining a fourth application example of the wireless transmission system 1 of the embodiments. The fourth application example relates to a configuration in which transmitting units and the same number of receiving units as the transmitting units are disposed in one pair of semiconductor chips for bidirectional communication and the sets of the transmitting unit and the receiving unit use the respective different carrier frequencies to thereby carry out full-duplex bidirectional communication. The following description will deal with two-channel communication in which the carrier frequency f1 is used for communication in one direction and the carrier frequency f2 is used for communication in the opposite direction of this one direction, for simple description. The carrier frequency f1 is in the millimeter wave band of 30 GHz to 300 GHz, and the carrier frequency f2 is also in the millimeter wave band of 30 GHz to 300 GHz. However, the carrier frequencies f1 and f2 are so far from each other that the respective modulated signals do not interfere with each other.

In the fourth application example (configuration 1) shown in FIG. 17A, all of the transmission sides and the reception sides use the respective different antennas. In contrast, in the fourth application example (configuration 2) shown in FIG. 17B, each of the semiconductor chips for the bidirectional communication uses a common antenna.

In the case of signal transmission in one housing, it can be considered that semiconductor chips 103D and 203D are mounted on the same board for example. In the case of inter-apparatus signal transmission, it can be considered that, as shown in FIG. 17A, the electronic apparatus including a second communication device 200D in which the semiconductor chip 203D is housed is placed on the electronic apparatus including a first communication device 100D in which the semiconductor chip 103D is housed and a housing 190D of the first communication device 100D and a housing 290D of the second communication device 200D are in contact with each other at the dotted-line part in the diagram for example. The same way of thinking can be applied also to the fourth application example (configuration 2) although description thereof is not particularly made.

In the fourth application example (configuration 1), the antennas between the transmission and reception sides on two channels are coupled by a single millimeter-wave signal transmission path 9_4. In terms of the function, a first communication channel is formed by the millimeter-wave signal transmission path 9_1, and a second communication channel for transmission in the opposite direction of the communication direction of the first communication channel is formed by the millimeter-wave signal transmission path 9_2. Because of the single millimeter-wave signal transmission path 9_4, for example electrical waves of the carrier frequency f1 in the millimeter-wave signal transmission path 9_1 are possibly transmitted to the millimeter-wave signal transmission path 9_2 and electrical waves of the carrier frequency f2 in the millimeter-wave signal transmission path 9_2 are possibly transmitted to the millimeter-wave signal transmission path 9_1.

For example, the transmission-side signal generating unit 110 and the reception-side signal generating unit 120 are provided in the semiconductor chip 103D of the first communication device 100D, and the transmission-side signal generating unit 210 and the reception-side signal generating unit 220 are provided in the semiconductor chip 203D of the second communication device 200D.

The transmission-side signal generating unit 110 includes the modulation functional unit 8300 (frequency mixer 8302 and transmission-side local oscillator 8304) and the amplifier 8117. The amplifier 8117 is connected to an antenna 136_1 serving as part of the transmission path coupler 108. The semiconductor chip 103D (transmission-side signal generating unit 110) converts (modulates) the transmission-subject signal SIN_1 to a millimeter-wave signal and discharges the transmission signal Sout_1 from the antenna 136_1.

The reception-side signal generating unit 220 includes the amplifier 8224, the demodulation functional unit 8400 (frequency mixer 8402 and reception-side local oscillator 8404), and the low-pass filter 8412. The amplifier 8224 is connected to an antenna 236_2 serving as part of the transmission path coupler 208. The semiconductor chip 203D (reception-side signal generating unit 220) restores (demodulates) the transmission-subject signal SOUT_1 (corresponding to SIN_1) from the received signal Sin_1 (corresponding to Sout_1) received by the antenna 236_2. That is, the semiconductor chips 103D and 203D perform signal transmission in the millimeter wave band via the millimeter-wave signal transmission path 9_4 (millimeter-wave signal transmission path 9_1 therein) between the antennas 136_1 and 236_2.

The transmission-side signal generating unit 210 includes the modulation functional unit 8300 (frequency mixer 8302 and transmission-side local oscillator 8304) and the amplifier 8117. The amplifier 8117 is connected to an antenna 136_2 serving as part of the transmission path coupler 108. The semiconductor chip 203D (transmission-side signal generating unit 210) converts (modulates) the transmission-subject signal SIN_2 to a millimeter-wave signal and discharges the transmission signal Sout_2 from the antenna 136_2.

The reception-side signal generating unit 120 includes the amplifier 8224, the demodulation functional unit 8400 (frequency mixer 8402 and reception-side local oscillator 8404), and the low-pass filter 8412. The amplifier 8224 is connected to an antenna 236_1 serving as part of the transmission path coupler 208. The semiconductor chip 103D (reception-side signal generating unit 120) restores (demodulates) the transmission-subject signal SOUT_2 (corresponding to SIN_2) from the received signal Sin_2 (corresponding to Sout_2) received by the antenna 236_1. That is, the semiconductor chips 103D and 203D perform signal transmission in the millimeter wave band via the millimeter-wave signal transmission path 9_4 (millimeter-wave signal transmission path 9_2 therein) between the antennas 136_2 and 236_1.

To enable full-duplex bidirectional transmission, frequencies different for each of the sets of the transmitting unit and the receiving unit for signal transmission are allocated as the carrier frequencies. For example, the first carrier frequency f1 is used by the set of the transmission-side signal generating unit 110 and the reception-side signal generating unit 220, and the second carrier frequency f2 ($\neq$f1) is used by the set of the transmission-side signal generating unit 210 and the reception-side signal generating unit 120. By setting the carrier frequencies f1 and f2 different for each of the communication channels, full-duplex bidirectional transmission is realized without being affected by interference.

For example, suppose that the transmission signal Sout_1 of the carrier frequency f1 also reaches the reception-side signal generating unit 120 in the semiconductor chip 103D from the transmission-side signal generating unit 110 when the reception-side signal generating unit 120 receives the transmission signal Sout_2 (=received signal Sin_2) of the carrier frequency f2 and is injection-locked with the carrier frequency f2. In this case, the reception-side signal generating unit 120 is not injection-locked with the carrier frequency f1. Thus, the component of the transmission-subject signal SIN_1 is never restored even if the transmission signal Sout_1 of the carrier frequency f1 is demodulation-processed in the reception-side signal generating unit 120 by carrying out synchronous detection by using the reproduction carrier signal and making the resulting signal pass through the low-pass filter 8412. That is, the reception-side signal generating unit 120 is not affected by the interference of the component of the carrier frequency f1 even if the reception-side signal generating unit 120 receives the modulated signal of the carrier frequency f1 when it is injection-locked with the carrier frequency f2.

Furthermore, suppose that the transmission signal Sout_2 of the carrier frequency f2 also reaches the reception-side signal generating unit 220 from the transmission-side signal generating unit 210 when the reception-side signal generating unit 220 receives the transmission signal Sout_1 (=received signal Sin_1) of the carrier frequency f1 and is injection-locked with the carrier frequency f1. In this case, the reception-side signal generating unit 220 is not injection-locked with the carrier frequency f2. Thus, the component of the transmission-subject signal SIN_2 is never restored even if the transmission signal Sout_2 of the carrier frequency f2 is demodulation-processed in the reception-side signal generating unit 220 by carrying out synchronous detection by using the reproduction carrier signal and making the resulting signal pass through the low-pass filter 8412. That is, the reception-side signal generating unit 220 is not affected by the interference of the component of the carrier frequency f2 even if the reception-side signal generating unit 220 receives the modulated signal of the carrier frequency f2 when it is injection-locked with the carrier frequency f1.

Also in the fourth application example (configuration 2), one transmitting unit and one receiving unit are disposed in each of semiconductor chips for bidirectional communication. Each of the transmitting units and the receiving units employs the above-described injection locking system. For example, the transmission-side signal generating unit 110 and the reception-side signal generating unit 120 are provided in the semiconductor chip 103D of the first communication device 100D, and the transmission-side signal generating unit 210 and the reception-side signal generating unit 220 are provided in the semiconductor chip 203D of the second communication device 200D.

To enable full-duplex bidirectional transmission, frequencies different for each of the sets of the transmitting unit and the receiving unit for signal transmission are allocated as the carrier frequencies. For example, the first carrier frequency f1 is used by the set of the transmission-side signal generating unit 110 and the reception-side signal generating unit 220, and the second carrier frequency f2 (≠f1) is used by the set of the transmission-side signal generating unit 210 and the reception-side signal generating unit 120.

The millimeter-wave signal of the carrier frequency f1 generated by the transmission-side signal generating unit 110 in the semiconductor chip 103D is transferred to the antenna 136 via a circulator as one example of the antenna changeover part of the transmission path coupler 108, and is transmitted to the millimeter-wave signal transmission path 9_4. The semiconductor chip 203D receives the millimeter-wave signal transmitted via the millimeter-wave signal transmission path 9_4 by the antenna 236, and supplies the millimeter-wave signal to the reception-side signal generating unit 220 via a circulator as one example of the antenna changeover part of the transmission path coupler 208. The reception-side signal generating unit 220 generates the reproduction carrier signal injection-locked with the carrier frequency f1 used for the modulation by the transmission-side signal generating unit 110, and demodulates the received millimeter-wave signal.

Conversely, the millimeter-wave signal of the carrier frequency f2 generated by the transmission-side signal generating unit 210 in the semiconductor chip 203D is transferred to the antenna 236 via the circulator as one example of the antenna changeover part of the transmission path coupler 208, and is transmitted to the millimeter-wave signal transmission path 9_4. The semiconductor chip 103D receives the millimeter-wave signal transmitted via the millimeter-wave signal transmission path 9_4 by the antenna 136, and supplies the millimeter-wave signal to the reception-side signal generating unit 120 via the circulator as one example of the antenna changeover part of the transmission path coupler 108. The reception-side signal generating unit 120 generates the reproduction carrier signal injection-locked with the carrier frequency f2 used for the modulation by the transmission-side signal generating unit 210, and demodulates the received millimeter-wave signal.

In the fourth application example (configuration 2), by such a mechanism, full-duplex bidirectional communication to transmit signals different from each other in directions opposite to each other can be realized without the occurrence of the interference problem by employing the frequency division multiplexing with use of two carrier frequencies f1 and f2, similarly to the fourth application example (configuration 1).

The present application contains subject matter related to that disclosed in Japanese Priority Patent Applications JP 2009-200118, JP 2009-199403 and JP 2009-199404 each filed in the Japan Patent Office on Aug. 31, 2009, the entire contents of which are hereby incorporated by reference.

While preferred embodiments of the present invention have been described using specific terms, such description is for illustrative purposes only, and it is to be understood that changes and variations may be made without departing from the spirit or scope of the following claims.

What is claimed is:

1. A wireless transmission system comprising:
a transmission unit; and
a reception unit,
wherein the transmission unit includes a first carrier signal generating circuitry configured to generate a modulation carrier signal, and a first frequency converter configured to carry out frequency conversion of a transmission-subject signal by the modulation carrier signal generated by the first carrier signal generating circuitry to generate a modulated signal,
wherein the transmission unit is configured to transmit the modulated signal using a wireless signal transmission path configured for wireless information transmission between the transmission unit and the reception unit, and wherein the reception unit includes a second carrier signal generating circuitry configured to generate a demodulation carrier signal locked with the modulation carrier signal generated by the first carrier signal generating circuitry through injection of a signal received through the wireless signal transmission path, and a second frequency converter configured to carry out frequency conversion of the modulated signal using the demodulation carrier signal generated by the second carrier signal generating circuitry.

2. The wireless transmission system according to claim 1, wherein the transmission unit includes a reference carrier signal processor configured to acquire a reference carrier signal, and is configured to transmit the reference carrier signal to the reception unit using the wireless signal transmission path, and wherein the reception unit uses the second carrier signal generating circuitry to generate the demodulation carrier signal through injection of the reference carrier signal.

3. The wireless transmission system according to claim 2, wherein the reference carrier signal generating circuitry carries the reference carrier signal on a phase axis different from a modulation axis on which a transmission-subject signal of the modulated signal output from the first frequency converter is carried.

4. The wireless transmission system according to claim 2, wherein the second carrier signal generating circuitry includes:
a reception-side local oscillator configured to generate an output signal locked with the reference carrier signal injected to the reception-side local oscillator; and
a phase adjuster configured to carry out phase adjustment so that a phase of the demodulation carrier signal that is based on the output signal generated by the reception-side local oscillator and that is input to the second frequency converter corresponds with a phase of the modulated signal input to the second frequency converter.

5. The wireless transmission system according to claim 4, wherein the phase adjuster adjusts a phase of an injection-locked output signal of the reception-side local oscillator in such a way that a phase difference between an injection signal to the reception-side local oscillator and the injection-locked output signal is cancelled, when the reception-side local oscillator is operating in an injection locking mode.

6. The wireless transmission system according to claim 4, wherein the phase adjuster adjusts a phase of a component of the reference carrier signal in an output signal of the reception-side local oscillator in such a way that a phase difference between a modulation axis on which the transmission-subject signal is carried and an axis on which the reference carrier signal is carried is cancelled, when the reception-side local oscillator is operating in an amplifier mode.

7. The wireless transmission system according to claim 1, wherein the second carrier signal generating circuitry generates the demodulation carrier signal through injection of the modulated signal received via the wireless signal transmission path to the second carrier signal generating circuitry.

8. The wireless transmission system according to claim 7, wherein the reception unit includes:
a direct-current component suppressor configured to suppress a direct-current component that is included in a demodulated signal output from the second frequency converter and is attributed to the reference carrier signal.

9. The wireless transmission system according to claim 7, wherein the second carrier signal generating circuitry includes:
a reception-side local oscillator configured to generate an output signal locked with the modulated signal injected to the reception-side local oscillator; and
a phase adjuster configured to adjust a phase of an injection-locked output signal of the reception-side local oscillator in such a way that a phase difference between the injection-locked output signal and an injection signal to the reception-side local oscillator is cancelled, when the reception-side local oscillator is operating in an injection locking mode.

10. The wireless transmission system according to claim 1, wherein the transmission unit includes:
a modulation-subject signal processor configured to suppress a near-direct-current component in the transmission-subject signal to be modulated, and the first frequency converter carries out frequency conversion of a processed signal resulting from processing by the modulation-subject signal processor by the modulation carrier signal generated by the first carrier signal generating circuitry to generate the modulated signal.

11. The wireless transmission system according to claim 10, wherein the modulation-subject signal processor carries out direct-current free coding for the transmission-subject signal that is a digital signal.

12. The wireless transmission system according to claim 1, wherein the reception unit includes:
an injection locking detector configured to detect information indicating a state of injection locking in the second carrier signal generating circuitry, and at least one of the transmission unit or the reception unit includes an injection locking adjuster configured to carry out locking adjustment based on the information that is detected by the injection locking detector and indicates the state of injection locking so that the demodulation carrier signal generated by the second carrier signal generating circuitry is locked with the modulation carrier signal generated by the first carrier signal generating circuitry.

13. The wireless transmission system according to claim 1, wherein the injection locking adjuster carries out the locking adjustment by changing an amplitude of a signal to be injected to at least one of the second carrier signal generating circuitry unit or a frequency of an output signal of the second carrier signal generating circuitry in free-running oscillation of the second carrier signal generating circuitry.

14. The wireless transmission system according to claim 1, wherein the injection locking adjuster carries out the locking adjustment by changing at least one of a frequency of the modulation carrier signal generated by the first carrier signal generating circuitry or an amplitude of a signal to be transmitted over the wireless signal transmission path.

15. The wireless transmission system according to claim 1, wherein the wireless signal transmission path has a structure for transmitting a wireless signal while confining the wireless signal in a transmission path.

16. The wireless transmission system according to claim 1, wherein the carrier signal generating circuitry includes an oscillator circuit including a tank circuit, and both the oscillator circuit and the tank circuit are formed on a same semiconductor substrate.

17. The wireless transmission system according to claim 1, wherein the second frequency converter restores the transmission-subject signal by carrying out the frequency conversion by synchronous detection.

18. A wireless communication device comprising:
a carrier signal generating circuitry configured to generate a demodulation millimeter-wave-band carrier signal locked with a modulation millimeter-wave-band carrier signal through injection of a wireless signal received via a wireless signal transmission path; and
a frequency converter configured to carry out frequency conversion of a millimeter-wave-band modulated signal received via the wireless signal transmission path, wherein the carrier signal generating circuitry includes an oscillator circuit including a tank circuit, and the oscillator circuit and the tank circuit are formed on a same semiconductor substrate.

* * * * *